United States Patent
Mori et al.

(10) Patent No.: US 6,381,254 B1
(45) Date of Patent: Apr. 30, 2002

(54) MOVING IMAGE ENCODING DEVICE/METHOD, MOVING IMAGE MULTIPLEXING DEVICE/METHOD, AND IMAGE TRANSMISSION DEVICE

(75) Inventors: Toshiaki Mori, Minoo; Noboru Katta, Itami; Toshihiko Kurosaki, Kobe, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/967,351

(22) Filed: Nov. 7, 1997

(30) Foreign Application Priority Data

| Nov. 8, 1996 | (JP) | 8-296102 |
| Dec. 26, 1996 | (JP) | 8-347283 |
| Jun. 13, 1997 | (JP) | 9-156289 |
| Jul. 23, 1997 | (JP) | 9-196716 |

(51) Int. Cl.[7] .................................. H04J 3/02
(52) U.S. Cl. ........................ 370/537; 375/240.03
(58) Field of Search ........................ 370/369, 372, 370/375, 537, 538; 348/419, 405, 465, 473, 8–10; 375/240, 240.01, 240.1, 240.15, 240.03

(56) References Cited

U.S. PATENT DOCUMENTS

| 5,253,075 A | * 10/1993 | Sugiyama | 358/261.2 |
| 5,478,119 A | * 12/1995 | Dye | 285/26 |
| 5,517,250 A | * 5/1996 | Hoogenboom et al. | 348/845.1 |
| 5,566,208 A | * 10/1996 | Balakrishnan | 375/240 |
| 5,598,415 A | * 1/1997 | Nuber et al. | 370/474 |
| 5,650,825 A | * 7/1997 | Naimpally et al. | 348/465 |
| 5,691,986 A | * 11/1997 | Pearlstein | 370/477 |
| 5,748,249 A | * 5/1998 | Fujiwara | 348/419 |
| 5,835,493 A | * 11/1998 | Magee et al. | 370/394 |
| 5,886,731 A | * 3/1999 | Ebisawa | 348/9 |

FOREIGN PATENT DOCUMENTS

| JP | 6-6777 | 1/1994 |
| JP | 6-86253 | 3/1994 |
| JP | 8-23540 | 1/1996 |
| WO | WO 95/32565 | 11/1995 |

* cited by examiner

Primary Examiner—Chau Nguyen
Assistant Examiner—Andy Lee
(74) Attorney, Agent, or Firm—Ratner & Prestia

(57) ABSTRACT

The moving image encoding device for encoding a plurality of moving image signals of this invention includes: a plurality of encoding sections for encoding the plurality of moving image signals, the encoding sections being provided with a plurality of quantization sub-sections for quantizing the plurality of moving image signals with predetermined quantization widths; and a quantization control section for controlling the quantization widths used by the quantization sections simultaneously.

10 Claims, 37 Drawing Sheets

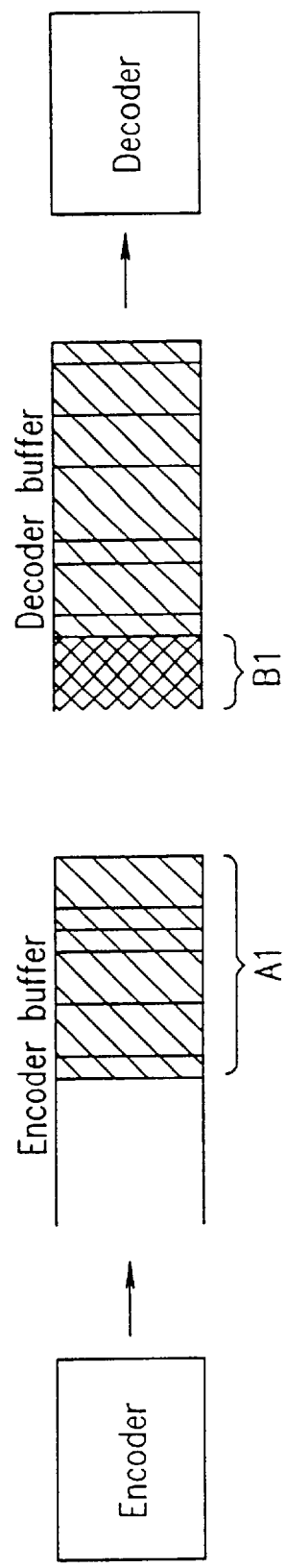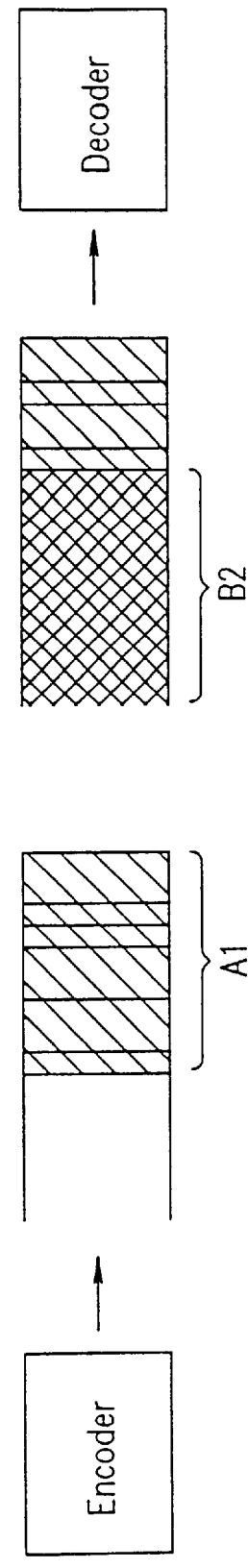
FIG. 14A
FIG. 14B

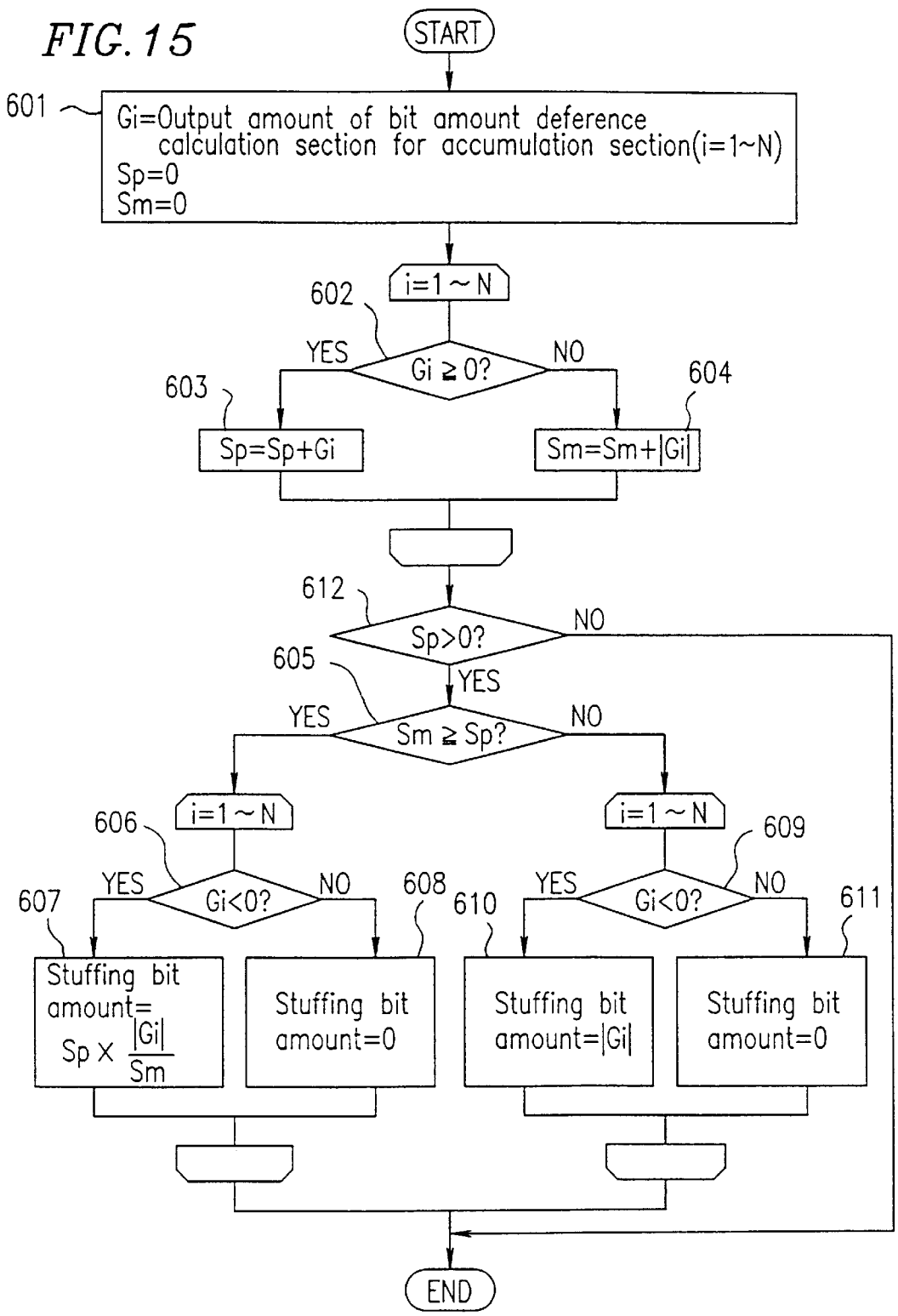

FIG.29

| Sender address | Receiver address | Image packet flag | Transmission period No. |
|---|---|---|---|
| Multiplex virtual buffer size | | Relative delay parameter | |
| Transmission data | | | |

MOVING IMAGE ENCODING DEVICE/ METHOD, MOVING IMAGE MULTIPLEXING DEVICE/METHOD, AND IMAGE TRANSMISSION DEVICE

BACKGROUND OF THE INVENTION

1. Field of the Invention

The present invention relates to moving image encoding device/method for encoding a plurality of moving images in such a manner that the quality of moving images reproduced by a decoding device is enhanced after the process of compressing/encoding the plurality of moving images and multiplexing the encoded signals to generate moving image encoded signals at a constant bit rate.

The present invention also relates to moving image multiplexing device/method for multiplexing moving image encoded signals obtained after the process of compressing/ encoding a plurality of moving images or moving image segments obtained by dividing a high-precision moving image.

The present invention further relates to an image transmission device which compresses/encodes a plurality of moving images and transmits the resultant moving image encoded signals at a limited bit rate, used in the moving image transmission for satellite communications or network communications such as a LAN, for example.

2. Description of the Related Art

In one of the methods for compressing/encoding and multiplexing a plurality of moving images to transmit the resultant moving images as a bit stream at a constant bit rate, a predetermined fixed bit rate is allocated for each of the moving images so that the sum of the bit amounts representing the plurality of moving images after the compression/encoding constitutes a constant bit rate. In such a method, when moving images with high complexity are input, the allocated bit rate is insufficient, resulting in great degradation in the image quality. Conversely, when moving images with low complexity are input, stuffing increases, resulting in wasteful use of the bit rate. As a result, two opposite problems arise. That is, when an effective use of the bit rate is attempted, the image quality lowers. Conversely, when high image quality is attempted, the bit rate is not effectively used, decreasing the number of moving images which can be multiplexed.

In order to solve the above problems, Japanese Laid-Open Publication No. 8-23540 discloses an encoding control device in which the bit rate at the encoding of respective moving image signals is made variable to improve the quality of moving images reproduced by a decoding device. In this encoding control device, the moving images reproduced from moving image encoded signals are compared with the original moving images. The bit rate is increased when a reproduced moving image is largely distorted from the original one, while it is decreased when a reproduced moving image is little distorted, so that the quality of the moving images is made uniform and thus the entire image quality improves.

According to the above method, however, the bit rate is changed after the amount of distortion is determined. Therefore, in the case where the moving images become complicated suddenly due to a scene change and the like, the quality of the moving image immediately after the scene change is low.

Moreover, in this conventional device in which the bit rate at the encoding of the moving images is variable, when a simple multiplexing operation is conducted such as changing the bit rate in proportion to the bit amount generated during a predetermined time period, an input buffer of a decoding device may cause overflow or underflow.

An encoding device which encodes moving images with different resolutions is disclosed in Japanese Laid-Open Publication No. 6-6777, for example. FIG. 37 shows the configuration of such an encoding device, where high-quality HDTV moving images are divided into a plurality of blocks by a frame synthesization blocking section 1101, and the resultant blocks are sent to a block distribution section 1102. When a signal switch 1107 which operates in response to an operation mode signal is switched to one terminal connecting with the block distribution section 1102, the block distribution section 1102 distributes the respective blocks received from the frame synthesization blocking section 1101 to moving image encoding sections 1103 to 1106. The moving image encoding sections 1103 to 1106 encode the respective blocks and output resultant encoded signals. When the signal switch 1107 is switched to the other terminal, TV moving images with a normal quality are supplied to the moving image encoding section 1103 via the signal switch 1107. The moving image encoding section 1103 encodes the TV moving images and outputs resultant encoded signals.

Thus, in this conventional device, both low-resolution moving image signals and high-resolution moving image signals can be encoded by switching the signal switch 1107.

However, the conventional device with the above configuration provides no conception of encoding and multiplexing moving images with different resolutions simultaneously. This device is therefore not applicable to the simultaneous transmission of moving images with different resolutions which is employed in broadcasting and the like.

In one conventional technique of multiplexing a plurality of moving images for transmission, a fixed bit rate is allocated for each encoding device, so that moving images are encoded by each encoding device at the allocated bit rate and resultant moving image encoded signals are multiplexed. However, this technique has the following problem. The complexity of moving images changes with time. Accordingly, in order to encode and transmit the moving images so that the degradation in the image quality is always inconspicuous, the respective bit rates are required to be set so that the degradation in the image quality of the reproduced moving image is inconspicuous even when a moving image with highest complexity is encoded. This lowers the transmission efficiency.

In order to solve the above problem, a method in which the bit rate is changed depending on the complexity of the encoding of moving images has been attempted. According to this method, the bit rate is lowered for simple moving images to realize efficient transmission, and multi-channel communication using more channels is possible f or the same transmission bit rate. This method is described in WO 95/32565, for example.

FIG. 38 shows a device implementing the above method. Referring to FIG. 38, moving image encoding sections 2101, 2102, and 2103 encode input moving images in accordance with respective target rates specified by a multiplexing section 2104, and output resultant encoded signals to the multiplexing section 2104. The multiplexing section 2104 multiplexes the received encoded signals and outputs multiplexed signals to a transmission route. The multiplexing section 2104 also adjusts the target rates based on a transmission rate for the encoded signals and supplies the new target rates to the moving image encoding sections 2101 to 2103.

The target rates are set so that a total of the target rates is equal to the transmission rate. More specifically, each of the moving image encoding sections 2101 to 2103 sends the amount of encoding distortion at the encoding to the multiplexing section 2104 every fixed period. The multiplexing section 2104 adjusts the target rate depending on the amount of encoding distortion sent from each of the moving image encoding sections 2101 to 2103 while the total of the target rates is kept equal to the transmission rate. That is, the target rate is increased for the moving image encoding section which has sent a large distortion amount, while it is lowered for the moving image encoding section which has sent a small distortion amount. In this way, moving images encoded by the moving image encoding sections 2101 to 2103 are provided with bit rates allocated depending on the complexity of the encoding.

In the above conventional method, however, the target rates are corrected so as to reduce the amount of distortion after the distortion is generated. Accordingly, the image quality tends to be low at an instance immediately after the scene change to a scene of which encoding is difficult, for example. Moreover, in this conventional method, the multiplexing section calculates the target rates to be allocated to the moving image encoding sections based on the amounts of encoding distortion in the moving image encoding sections. Therefore, when the number of moving image encoding sections connected to the multiplexing section is large, the amount of calculation required to allocate the target rates increases. Furthermore, if the moving image encoding sections are dispersed on a network and moving images are transmitted on the network, processings of collecting information on the encoding distortion from the respective moving image encoding sections and allocating the target rates to the respective moving image encoding sections are required. It is difficult to achieve these processings real time.

SUMMARY OF THE INVENTION

The moving image encoding device for encoding a plurality of moving image signals of this invention includes: a plurality of encoding sections for encoding the plurality of moving image signals, the encoding sections being provided with a plurality of quantization sub-sections for quantizing the plurality of moving image signals with predetermined quantization widths; and a quantization control section for controlling the quantization widths used by the quantization sub-sections simultaneously.

With the above configuration, the quality of the output moving images can be made uniform.

In one embodiment of the invention, the quantization widths used by the quantization sub-sections are the same.

In another embodiment of the invention, the moving image encoding device further includes a plurality of accumulation sections for temporarily accumulating a plurality of moving image encoded signals output from the plurality of encoding sections, wherein the quantization control section determines the quantization widths used by the quantization sub-sections based on a sum of bit amounts of the plurality of moving image encoded signals accumulated in the accumulation sections.

In still another embodiment of the invention, the moving image encoding device further includes a screen division section disposed upstream of the plurality of encoding sections for dividing an input moving image signal into a plurality of moving image signals.

According to another aspect of the invention, a moving image multiplexing device for multiplexing a plurality of moving image encoded signals obtained by encoding a plurality of moving image signals is provided. The device includes: a plurality of accumulation sections for temporarily accumulating the plurality of moving image encoded signals; a multiplexing section for multiplexing the plurality of moving image encoded signals accumulated in the plurality of accumulation sections and outputting the multiplexed signals at a constant bit rate; a decoding delay time calculation section for calculating a time period from when a specific bit of each of the plurality of moving image encoded signals is input into a decoding device until when the specific bit is decoded by the decoding device; a frame bit amount calculation section for calculating a bit amount of a frame including the specific bit of each of the plurality of moving image encoded signals accumulated in the plurality of accumulation sections; and a multiplexing control section for controlling a plurality of first input bit amount which are the bit amounts of the plurality of moving image encoded signals input from the plurality of accumulation sections to the multiplexing section based on calculation results of the decoding delay time calculation section and the frame bit amount calculation section.

With the above configuration, the multiplexing is conducted in constant consideration of the decoding delay time in the decoding device. Accordingly, the occurrence of overflow or underflow can be prevented at the decoding of the moving image encoded signals by the decoding device.

In one embodiment, the multiplexing control section includes: a first parameter generation sub-section for determining a plurality of first parameters each of which is a ratio of the bit amount calculated by the frame bit amount calculation section to the time calculated by the decoding delay time calculation section; a second parameter generation sub-section for determining a second parameter which is a sum of the plurality of first parameters; a third parameter generation sub-section for determining a plurality of third parameters each of which is a ratio of each of the plurality of first parameters to the second parameter for the plurality of moving image encoded signals accumulated in the plurality of accumulation sections; and a multiplex bit amount calculation section for calculating the plurality of first input bit amounts based on the plurality of third parameters.

In one embodiment of the invention, the moving image multiplexing device further includes: an accumulated bit amount calculation section for calculating the bit amounts of the plurality of moving image encoded signals accumulated in the plurality of accumulation sections; and an empty capacity calculation section for calculating an empty capacity of an input buffer of a decoding device immediately before a specific bit of each of the plurality of moving image encoded signals is input into the decoding device, wherein the multiplex bit amount calculation section sets for each of a plurality of second input bit amounts a minimum value among (1) the first input bit amount determined based on the third parameter, (2) the bit amount of the moving image encoded signal calculated by the accumulated bit amount calculation section, and (3) the empty capacity of the input buffer of the decoding device calculated by the empty capacity calculation section, and the multiplex bit amount calculation section controls the bit amounts of the moving image encoded signals sent from the accumulation sections to the multiplexing section based on the plurality of second input bit amounts.

In another embodiment of the invention, when the plurality of second input bit amounts calculated by the multiplex bit amount calculation section are different from the corresponding first input bit amounts, the multiplex bit amount calculation section increases the second input bit amounts.

According to still another aspect of the invention, a moving image encoding method for encoding a plurality of moving image signals simultaneously is provided. The method includes encoding all the plurality of moving image signals with the same quantization width.

Alternatively, the moving image encoding method for encoding a plurality of moving image signals simultaneously of this invention includes encoding the plurality of moving image signals with a quantization width obtained based on a difference between a sum of bit amounts of a plurality of moving image encoded signals generated by encoding the plurality of moving image signals and output bit amounts of the plurality of moving image encoded signals output after being temporarily accumulated.

According to still another aspect of the invention, a moving image multiplexing method for multiplexing a plurality of moving image encoded signals after being accumulated in a plurality of accumulation sections is provided. The method includes the steps of: (1) calculating a time period from when a specific bit of each of the plurality of moving image encoded signals is input into a decoding device having an input buffer until when the specific bit is decoded; (2) calculating a bit amount of a frame including the specific bit of each of the plurality of moving image encoded signals accumulated in the plurality of accumulation sections; and (3) determining a plurality of multiplex bit amounts to be multiplexed from the plurality of moving image coded signals based on calculation results from steps (1) and (2).

In one embodiment of the invention, step (3) includes the steps of: (4) determining a plurality of first parameters each of which is a ratio of the bit amount obtained in step (2) to the time obtained in step (1); (5) determining a second parameter which is a sum of the plurality of first parameters; (6) determining a plurality of third parameters each of which is a ratio of each of the plurality of first parameters to the second parameter for the plurality of moving image encoded signals; and (7) determining the plurality of multiplex bit amounts based on the plurality of third parameters.

In still another embodiment of the invention, an input multiplex bit amount used for multiplexing each of the plurality of moving image encoded signals is set at a minimum value among (1) the multiplex bit amount determined based on the third parameter, (2) the bit amount of the moving image encoded signal accumulated in the accumulation section, and (3) an empty capacity of the input buffer of the decoding device, and each of the bit amounts to be multiplexed is controlled using the input multiplex bit amount.

In still another embodiment of the invention, when at least one of the input multiplex bit amounts is different from the corresponding multiplex bit amount, the input multiplex bit amount is increased.

Alternatively, in the moving image multiplexing method for multiplexing a plurality of moving image encoded signals of this invention, a plurality of multiplex bit amounts corresponding to the plurality of moving image encoded signals is preset at zero. The method includes the steps of: (1) calculating a frame bit amount of a frame including a specific bit of each of the plurality of moving image encoded signals; (2) calculating a time period until each of the plurality of moving image encoded signals is decoded; (3) selecting the moving image encoded signal where the time period obtained in step (2) is shorter than a predetermined time value; (4) determining a plurality of primary multiplex bit amounts based on the frame bit amount of the moving image encoded signal selected in step (3); (5) calculating a sum of the plurality of primary multiplex bit amounts; (6) adding the plurality of primary multiplex bit amounts to the plurality of multiplex bit amounts; and (7) renewing the predetermined time value, wherein steps (1) to (7) are repeated, and, if the sum of the plurality of primary multiplex bit amounts is larger than a predetermined bit amount, a plurality of secondary multiplex bit amounts are determined and added to the plurality of multiplex bit amounts, to multiplex the moving image encoded signals of the plurality of multiplex bit amounts.

Thus, since the moving image encoded signals are multiplexed in such a manner that the encoded signal of the frame which will be decoded earlier is multiplexed earlier, the occurrence of overflow or underflow is prevented at the decoding of the moving image encoded signals by the decoding device.

Alternatively, the moving image multiplexing method for multiplexing a plurality of moving image encoded signals of this invention includes the steps of: determining a plurality of minimum transmission amounts required for preventing underflow of a plurality of input buffers of decoding devices based on bit amounts of frames of the plurality of moving image encoded signals which have not been transmitted to the decoding devices and times required until the frames of the plurality of moving image encoded signals are decoded; determining a plurality of transmission bit amount lower limits based on the plurality of minimum transmission amounts; and multiplexing the plurality of transmission bit amount lower limits before multiplexing the plurality of moving image encoded signals.

Alternatively, the moving image encoding device for encoding a plurality of moving image signals of this invention includes: a plurality of encoding sections for encoding the plurality of moving image signals, each of the plurality of encoding sections including a quantization sub-section for quantizing the moving image signals with a predetermined parameter and a stuffing sub-section for stuffing the quantized moving image signals with a predetermined stuffing amount; a quantization control section for controlling the parameters used by the quantization sub-sections simultaneously; a plurality of accumulation sections for temporarily accumulating a plurality of moving image encoded signals output from the plurality of encoding sections; a multiplexing section for multiplexing the plurality of moving image encoded signals accumulated in the plurality of accumulation sections and outputting the multiplexed signals at a constant bit rate; a stuffing control section for controlling the stuffing amounts used by the stuffing sections; and a virtual empty capacity calculation section for calculating an empty capacity of each of a plurality of input buffers of decoding devices after a lapse of a predetermined time period when the plurality of moving image encoded signals are not input into the input buffers for the predetermined time period, wherein the quantization control section determines the parameters used by the quantization sub-sections based on a sum of the bit amounts of the plurality of moving image encoded signals, and the stuffing control section controls each of the stuffing sections based on a sum of the bit amounts of the moving image encoded signals accumulated in the plurality of accumulation sections, the constant bit rate, and a difference between the bit amount of each of the moving image encoded signals accumulated in the accumulation section and the empty capacity of the input buffer obtained by the virtual empty capacity calculation section.

Alternatively, the moving image encoding method of this invention encodes a plurality of moving image signals simultaneously using predetermined quantization widths each based on a difference between a sum of bit amounts of a plurality of moving image encoded signals generated by encoding the plurality of moving image signals and an output bit amount of each of the plurality of moving image encoded signals output after being temporarily accumulated, wherein a plurality of encoded buffer occupations of the moving image encoded signals temporarily accumulated are calculated, an empty capacity of each of a plurality of input buffers of decoding devices after a lapse of a predetermined time period when the moving image encoded signals are not input into the input buffers for the predetermined time period is calculated; and for each of the moving image encoded signals where a buffer differential value obtained by subtracting the empty capacity of the input buffer from the encoded buffer occupation is smaller than a predetermined value, a signal of a bit amount obtained by adding the buffer differential value larger than the predetermined value which does not influence the encoding is distributed to the moving image encoded signals where the buffer differential value is smaller than the predetermined value to effect stuffing.

In one embodiment, the predetermined value is 0.

Alternatively, the moving image encoding device for encoding a plurality of moving image signals of this invention includes: a plurality of encoding sections for encoding the plurality of moving image signals, each of the plurality of encoding sections including a quantization sub-section for quantizing the moving image signals with a predetermined parameter; a quantization control section for controlling the parameters used by the quantization sub-sections simultaneously; a plurality of accumulation sections for temporarily accumulating a plurality of moving image encoded signals output from the plurality of encoding sections; a multiplexing section for multiplexing the plurality of moving image encoded signals accumulated in the plurality of accumulation sections and outputting the multiplexed signals at a constant bit rate; a virtual empty capacity calculation section for calculating an empty capacity of each of a plurality of input buffers of decoding devices after a lapse of a predetermined time period when the plurality of moving image encoded signals are not input into the input buffers for the predetermined time period, wherein the quantization control section determines each of the parameters used by the quantization sub-sections based on a sum of the bit amounts of the moving image encoded signals accumulated in the plurality of accumulation sections, the constant bit rate, and a difference between the bit amount of the moving image encoded signal accumulated in the accumulation section and the empty capacity of the input buffer obtained by the virtual empty capacity calculation section.

Alternatively, the moving image encoding method of this invention encodes a plurality of moving image signals simultaneously using predetermined quantization widths each based on a difference between a sum of bit amounts of a plurality of moving image encoded signals generated by encoding the plurality of moving image signals and an output bit amount of each the plurality of moving image encoded signals output after being temporarily accumulated. The method includes the steps of: calculating a plurality of encoded buffer occupations of the moving image encoded signals temporarily accumulated, calculating an empty capacity of each of a plurality of input buffers of decoding devices after a lapse of a predetermined time period when the moving image encoded signals are not input into the input buffers for the predetermined time period; and encoding each of the moving image encoded signals where a buffer differential value obtained by subtracting the empty capacity of the input buffer from the encoded buffer occupation is smaller than a predetermined value using a quantization width smaller than the corresponding predetermined quantization width.

Thus, even when the generated bit amount of the moving image signal suddenly increases because a corresponding portion of an image is extremely complicated, the occurrence of underflow in the input buffer at the decoding of the moving image encoded signals by the decoding device is prevented.

In one embodiment of the invention, the predetermined value is 0.

Alternatively, the moving image encoding method of this invention encodes a plurality of moving image signals simultaneously using predetermined quantization widths each based on a difference between a sum of bit amounts of a plurality of moving image encoded signals generated by encoding the plurality of moving image signals and an output bit amount of each the plurality of moving image encoded signals output after being temporarily accumulated. The method includes the steps of: calculating a plurality of encoded buffer occupations of the moving image encoded signals temporarily accumulated, calculating an empty capacity of each of a plurality of input buffers of decoding devices after a lapse of a predetermined time period when the moving image encoded signals are not input into the input buffers for the predetermined time period; and encoding each of the moving image encoded signals where a buffer differential value obtained by subtracting the empty capacity of the input buffer from the encoded buffer occupation is larger than a predetermined value using a quantization width larger than the corresponding predetermined quantization width.

In one embodiment of the invention, the predetermined value is 0.

Alternatively, the moving image encoding method of this invention encodes a plurality of moving image signals simultaneously using predetermined quantization widths each based on a difference between a sum of bit amounts of a plurality of moving image encoded signals generated by encoding the plurality of moving image signals and an output bit amount of each the plurality of moving image encoded signals output after being temporarily accumulated, comprising the steps of: calculating a plurality of encoded buffer occupations of the moving image encoded signals temporarily accumulated, calculating an empty capacity of each of a plurality of input buffers of decoding devices after a lapse of a predetermined time period when the moving image encoded signals are not input into the input buffers for the predetermined time period; and calculating a buffer differential value obtained by subtracting the empty capacity of the input buffer from the encoded buffer occupation for each of the moving image encoded signals, and adding a sum of the buffer differential values which are larger than a predetermined value to the sum of the bit amounts.

In one embodiment of the invention, the predetermined value is 0.

According to still another aspect of the invention, the moving image encoding and multiplexing device for encoding a plurality of moving image signals and multiplexing the encoded signals is provided. The device includes: a moving image switch section for switching a destination of a plurality of input moving images; a plurality of encoding sections for encoding the plurality of input moving images output from the moving image switch section; a multiplexing section for multiplexing the encoded signals output from the plurality of encoding sections; and a control section for switching a switching state of the moving image switch section, an encoding mode of the encoding sections, and a multiplexing mode of the multiplexing sections; wherein the control section switches the encoding mode of the encoding sections and the multiplexing mode of the multiplexing sections depending on the switching state of the moving image switch section.

With the above configuration, the plurality of moving image signals with different precisions can be simultaneously encoded, multiplexed, and output. At this time, the combination of the numbers of input moving image signals for respective levels of precision is not restricted. The simultaneous encoding and multiplexing is also applicable to the cases where all the input moving image signals are independent from one another or all the input moving image signals are generated by screen division. Also, even when the output bit rate after the multiplexing is constant, it is possible to simultaneously encode, multiplex, and output the plurality of individual moving image signals and the plurality of moving image signals generated from one moving image signal by screen division.

In one embodiment of the invention, the control section comprises: a switch control sub-section for switching the switching state of the moving image switch section; an encoding control sub-section for switching the encoding mode of the encoding section; and a multiplexing control sub-section for switching the multiplexing mode of the multiplexing section, and the encoding control sub-section switches the encoding mode depending on the switching state of the moving image switch section, and the multiplexing control sub-section switches the multiplexing mode depending on the switching state of the moving image switch section.

In still another embodiment of the invention, the moving image encoding and multiplexing device further includes a screen division section upstream of the moving image switch section.

In still another embodiment of the invention, the moving image encoding and multiplexing device further includes a moving image time-division section upstream of the moving image switch section.

In still another embodiment of the invention, the moving image encoding and multiplexing device further includes accumulation sections for temporarily accumulating moving image encoded signals output from the encoding sections, wherein the encoding control sub-section determines a parameter for controlling each of the encoding sections based on a sum of bit amounts of the moving image encoded signals accumulated in the accumulation sections.

In still another embodiment of the invention, the multiplexing section comprises: a moving image multiplexing sub-section for multiplexing the plurality of moving image encoded signals and outputting a moving image encoded signal; a channel multiplexing sub-section for multiplexing a plurality of input signals input into the multiplexing section and the output signal output from the moving image multiplexing sub-section; and a switch sub-section for switching the destination of the moving image encoded signals input into the multiplexing section between the moving image multiplexing sub-section and the channel multiplexing sub-section.

According to still another aspect of the invention, an image transmission device is provided. The device includes a plurality of image encoding sections and a transmission processing section, wherein the transmission processing section multiplexes encoded data specified by the image encoding sections every multiplexing timing, transmits the encoded data to a predetermined route, and sends to the image encoding sections multiplexing information which is calculated based on encoded data amount in the image encoding sections and can be used for calculation of a delay amount taken until the encoded data is transmitted to a decoding device, and the plurality of image encoding sections determine quantization widths used at quantization in an image encoding processing based on the multiplexing information sent from the transmission processing section, encode the images, and transmit the encoded data to the transmission processing section every multiplexing timing to specify the encoded data.

In one embodiment of the invention, the transmission processing section comprises a transmission buffer, and the transmission processing section takes the encoded data specified by the image encoding sections in the transmission buffer every multiplexing timing, and outputs the encoded data at a predetermined transmission rate in the order of the taking-in of the encoded data, as well as outputting an occupation of the encoded data in the transmission buffer as multiplexing information.

In one embodiment of the invention, each of the image encoding sections includes: a quantization width determination sub-section; and a basic encoding processing sub-section for encoding images by quantizing the images with a quantization width specified by the quantization width determination sub-section, and the quantization width determination sub-section calculates a buffer occupation in each of a plurality of decoding devices which receive the encoded data transmitted from each of the image encoding sections via the transmission processing section based on the multiplexing information, and sets the quantization width based on the calculated buffer occupation in the decoding device and an amount of encoded data which has not been transmitted.

In another embodiment of the invention, each of the image encoding sections further includes an encoded data memory sub-section for temporarily storing the encoded data, and the encoded data memory sub-section temporarily stores non-transmitted data which has not been transmitted to the transmission processing section among the encoded data every transmission timing, and transmits the encoded data to the transmission processing section using as an upper limit a value preset by each of the image encoding sections or a value obtained by subtracting the buffer occupation in the decoding device calculated based on the multiplexing information from a buffer size of the decoding device predicted by the receiver side.

Alternatively, the image transmission device of this invention includes a transmission processing section for receiving encoded data from a plurality of image encoding sections, wherein the transmission processing section comprises a transmission buffer, takes the encoded data specified by the image encoding sections in the transmission buffer every multiplexing timing, and outputs the encoded data at a predetermined transmission rate in the order of the taking-in of the encoded data, as well as outputting an occupation of the encoded data in the transmission buffer as multiplexing information.

Alternatively, the image encoding device of this invention includes a quantization width determination section and a basic encoding processing section for encoding images by quantizing the images with a quantization width specified by the quantization width determination section, wherein the quantization width determination section determines the quantization width based on multiplexing information which can be used for calculation of a delay amount taken until encoded data is transmitted to a virtual decoding device, a buffer occupation in the virtual decoding device calculated based on the multiplexing information, and an amount of encoded data which has not been transmitted.

In one embodiment of the invention, the image encoding device further includes an encoded data memory section for temporarily storing the encoded data, wherein the encoded data memory section temporarily stores non-transmitted data which has not been transmitted among the encoded data every transmission timing, and outputs the encoded data using as an upper limit a value preset by each of the image encoding sections or a value obtained by subtracting the buffer occupation in the virtual decoding device calculated based on the multiplexing information from a buffer size of the decoding device predicted by the receiver side.

Alternatively, the image transmission device of this invention includes a bit rate management section for managing a bit rate at a transmission route and one or more image encoding sections; wherein the bit rate management section determines a bit rate representing a total of transmission rates at the one or more image encoding sections on the transmission route, allows for transmission of encoded data requested to be transmitted by any of the image encoding sections every transmission timing, and sends transmission information regarding a transmission delay which varies with the allowance to another image encoding section on the transmission route, and the one or more image encoding sections encode images by quantizing the images with a quantization width determined based on the transmission information, non-transmitted encoded data, and a predicted buffer size on the receiver side.

With the above configuration, the image quality of the image signals transmitted on a network can be made substantially uniform.

Alternatively, the image transmission device of this invention includes a bit rate management section for managing transmission rates of a plurality of image encoding sections, wherein the bit rate management section determines a bit rate representing a total of transmission rates at all the image encoding sections on a transmission route, allows for transmission of encoded data requested to be transmitted by any of the image encoding sections every transmission timing, and sends transmission information regarding a transmission delay which varies with the allowance to another one of the image encoding sections on the transmission route.

Alternatively, the image encoding device of this invention sets a quantization width used for quantization based on transmission information regarding a transmission delay which varies with an allowable transmission amount, non-transmitted encoded data, and a predicted buffer size on the receiver side.

Alternatively, the image encoding method of this invention includes the steps of: (1) determining a quantization width; and (2) encoding images by quantizing the images with the quantization width specified in step (1), wherein in step (1) the quantization width is set based on multiplexing information which can be used to calculate a delay amount taken until encoded data is transmitted to a virtual decoding device, a buffer occupation in the virtual decoding device calculated based on the multiplexing information, and an amount of encoded data which has not been transmitted.

In one embodiment of the invention, non-transmitted data which has not been transmitted among the encoded data is temporarily stored every transmission timing, and the encoded data is output using as an upper limit a value preset by each of the image encoding sections or a value obtained by subtracting the buffer occupation in the decoding device calculated based on the multiplexing information from the buffer size of the decoding device predicted by the receiver side.

Alternatively, the image encoding method of this invention includes encoding images by setting a quantization width used for quantization based on transmission information regarding a transmission delay which varies with an allowable transmission amount, non-transmitted encoded data, and a predicted buffer size on the receiver side.

Thus, the invention described herein makes possible the advantages of: (1) providing moving image encoding device/method which output moving images with a uniform quality and prevent the image quality from largely lowering even immediately after a scene change at which the images suddenly become complicated; (2) providing moving image multiplexing device/method which multiplex moving image signals and output the results so that each input buffer of a decoding device does not overflow or underflow; (3) providing moving image encoding and multiplexing device/method which encode moving image signals with different resolutions simultaneously, multiplex the encoded signals, and output the results; and (4) providing an image transmission device in which the quality of images encoded by encoding sections is kept uniform even at a scene change, and, in an application of having encoders dispersed in a network, bit rates are allocated for the encoders depending on the images input therein within the range of an allowable entire bit rate and a uniform image quality is obtained.

These and other advantages of the present invention will become apparent to those skilled in the art upon reading and understanding the following detailed description with reference to the accompanying figures.

BRIEF DESCRIPTION OF THE DRAWINGS

FIGS. 14A and 14B are views for illustrating the calculation by a decoder buffer empty capacity calculation section of the device of FIG. 12.

FIG. 15 is a flowchart showing the operation of a stuffing control section of the device of FIG. 12.

FIG. 29 shows a header format of a packet used in the device of FIG. 28.

DESCRIPTION OF THE PREFERRED EMBODIMENTS

The present invention will be described by way of examples with reference to the accompanying drawings.

EXAMPLE 1

Figure 1:
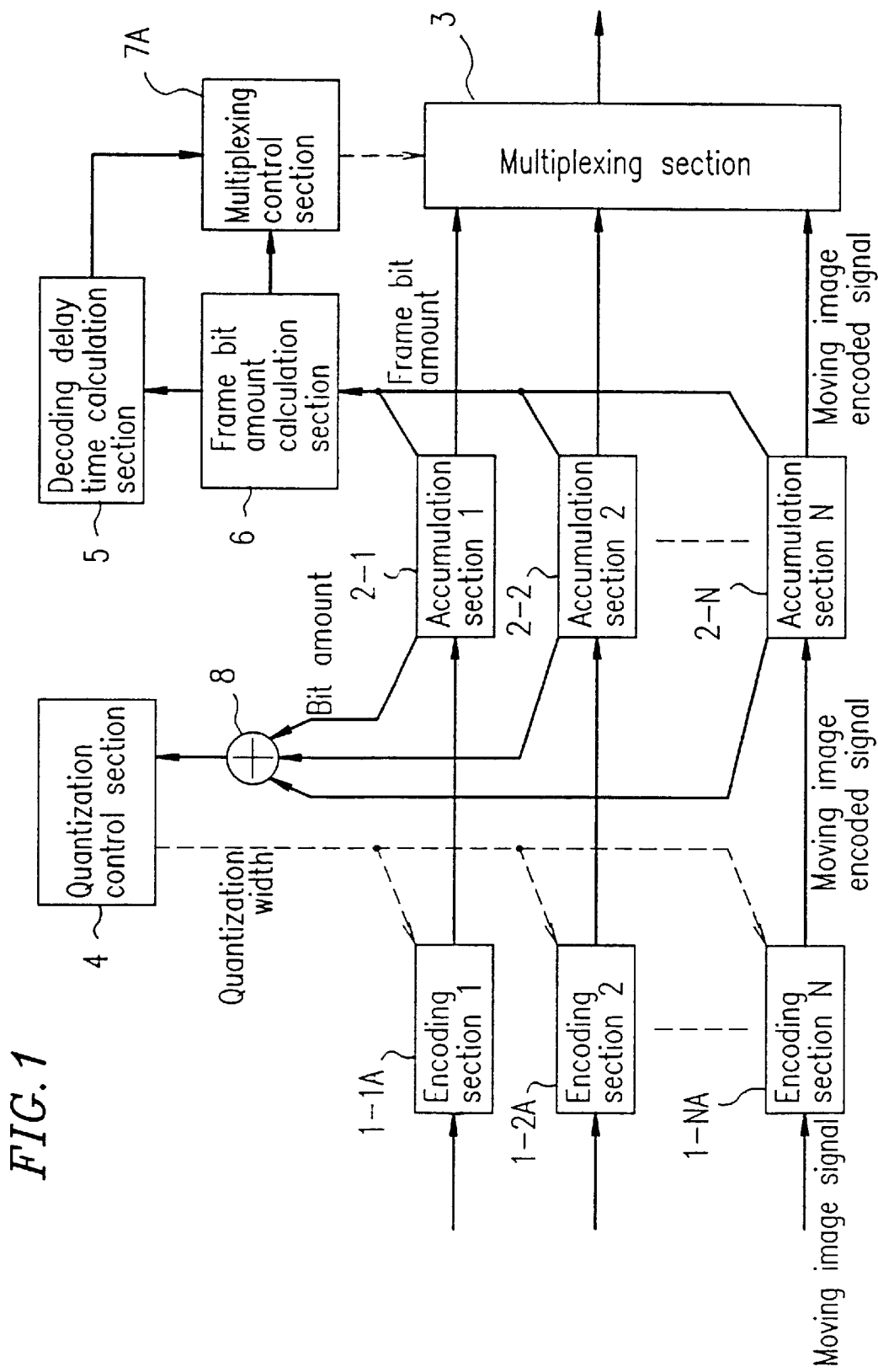
FIG. 1 is a block diagram of a moving image encoding and multiplexing device of Example 1 according to the present invention.

FIG. 1 is a block diagram of a moving image encoding and multiplexing device of Example 1 according to the present invention.

The moving image encoding and multiplexing device of this example includes: encoding sections 1-1A to 1-NA (where N is an integer) which compress/encode input moving images by signal transformation and quantization; accumulation sections 2-1 to 2-N which accumulate moving image encoded signals output from the encoding sections 1-1A to 1-NA; a multiplexing section 3 which multiplexes the moving image encoded signals and outputs resultant multiplexed signals at a constant bit rate; a quantization control section 4 which controls a quantization width used at the quantization by the encoding sections 1-1A to 1-NA; a decoding delay time calculation section 5 which calculates the time period from the input of one bit of each of the moving image encoding signals into a decoding device until the decoding of the bit (decoding delay time); a frame bit amount calculation section 6 which calculates the bit amount in each of frames composed of the moving image encoded signals accumulated in the accumulation sections 2-1 to 2-N; a multiplexing control section 7A which controls the multiplexing section 3; and an adder 8 which sums up the number of bit amounts of the moving image encoded signals accumulated in the accumulation sections 2-1 to 2-N.

Figure 2:
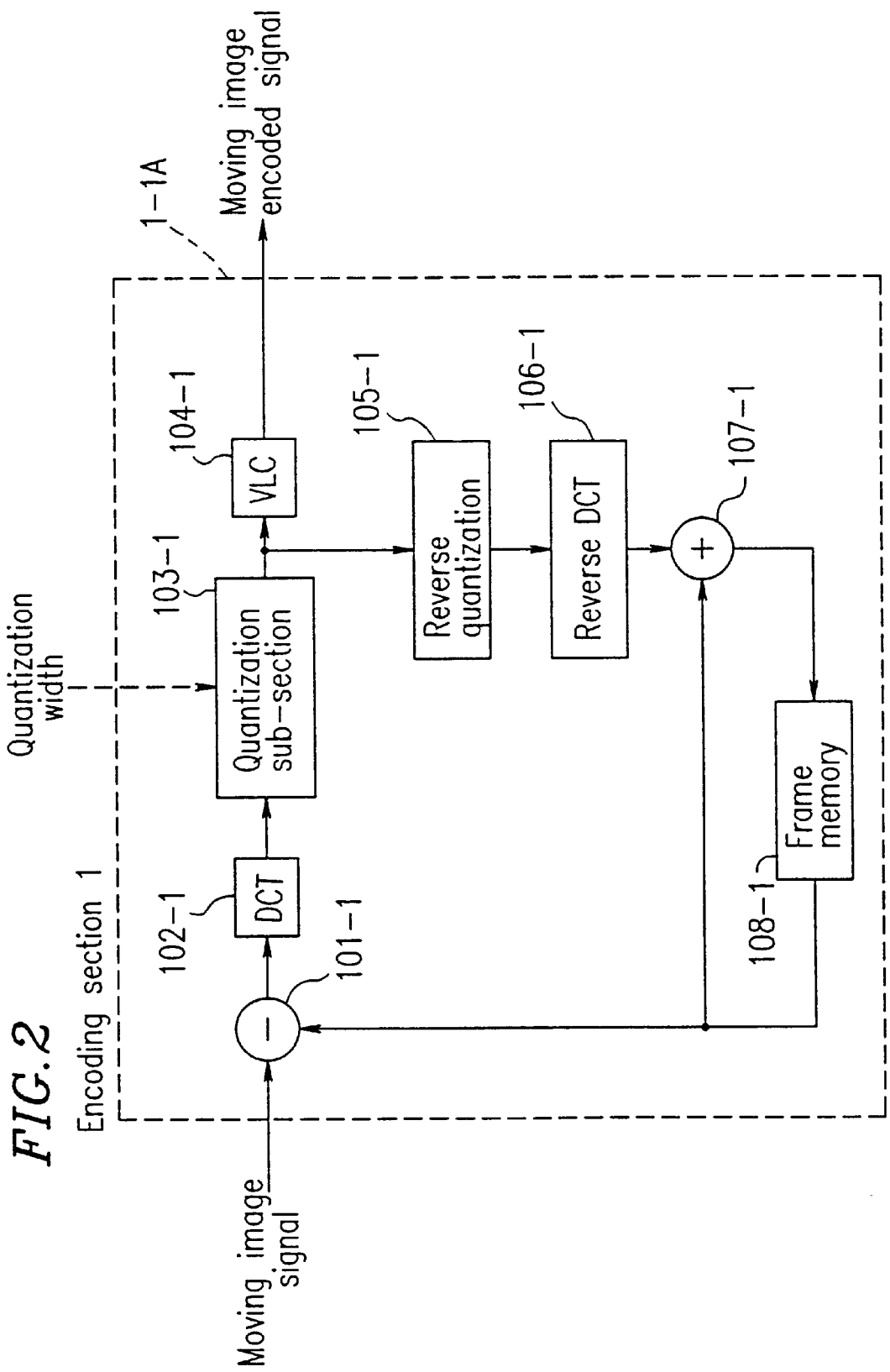
FIG. 2 is a block diagram of an encoding section of the device of FIG. 1.

FIG. 2 is an exemplified configuration of the encoding section 1-1A shown in FIG. 1. When a moving image signal representing a moving image is input into the encoding section 1-1A, a differentiator 101-1 calculates the difference between the input moving image and the moving image of one frame accumulated of a frame memory 108-1, and outputs a differential moving image. The differential moving image is then transformed into a DCT (discrete cosine transformation) coefficient by a DCT sub-section 102-1. The DCT coefficient is then quantified with the quantization width specified by the quantization control section 4 by a quantization sub-section 103-1 and transformed into the moving image encoded signal by a variable length encoding sub-section 104-1. The resultant moving image encoded signal is output from the encoding section 1-1A. The output signal from the quantization sub-section 103-1 is also supplied to a reverse quantization sub-section 105-1, where the input signal is reverse-quantified. The reverse-quantified signal is transformed into a decoding differential moving image by a reverse DCT sub-section 106-1. The decoding differential moving image is added with the moving image of one frame accumulated in the frame memory 108-1, to be transformed into a moving image which is to be decoded by the decoding device. The resultant moving image is accumulated in the frame memory 108-1.

The decoding delay time calculation section 5 calculates the decoding delay time of the bit of the moving image encoded signal accumulated in each of the accumulation sections 2-1 to 2-N which is initially sent to the multiplexing section 3. The decoding delay time of the bit which is initially output from each of the encoding sections 1-1A to 1-NA is used as the initial value. This is predetermined based on the size of an input buffer of the decoding device, the output bit rate at the multiplexing section 3, and the like. Thereafter, the value is renewed in accordance with the decoding procedure in the decoding device.

The frame bit amount calculation section 6 calculates the bit amount of a frame including the bit of the moving image encoded signal accumulated in each of the accumulation sections 2-1 to 2-N which is initially sent to the multiplexing section 3.

The multiplexing control section 7A repeats the calculation of the bit amount of the moving image encoded signal output from each of the accumulation sections 2-1 to 2-N to the multiplexing section 3 at a predetermined period.

The multiplexing section 3 multiplexes the moving image encoded signals based on the bit amounts calculated by the multiplexing control section 7A, and outputs the multiplexed signals at a constant bit rate.

Figure 3:
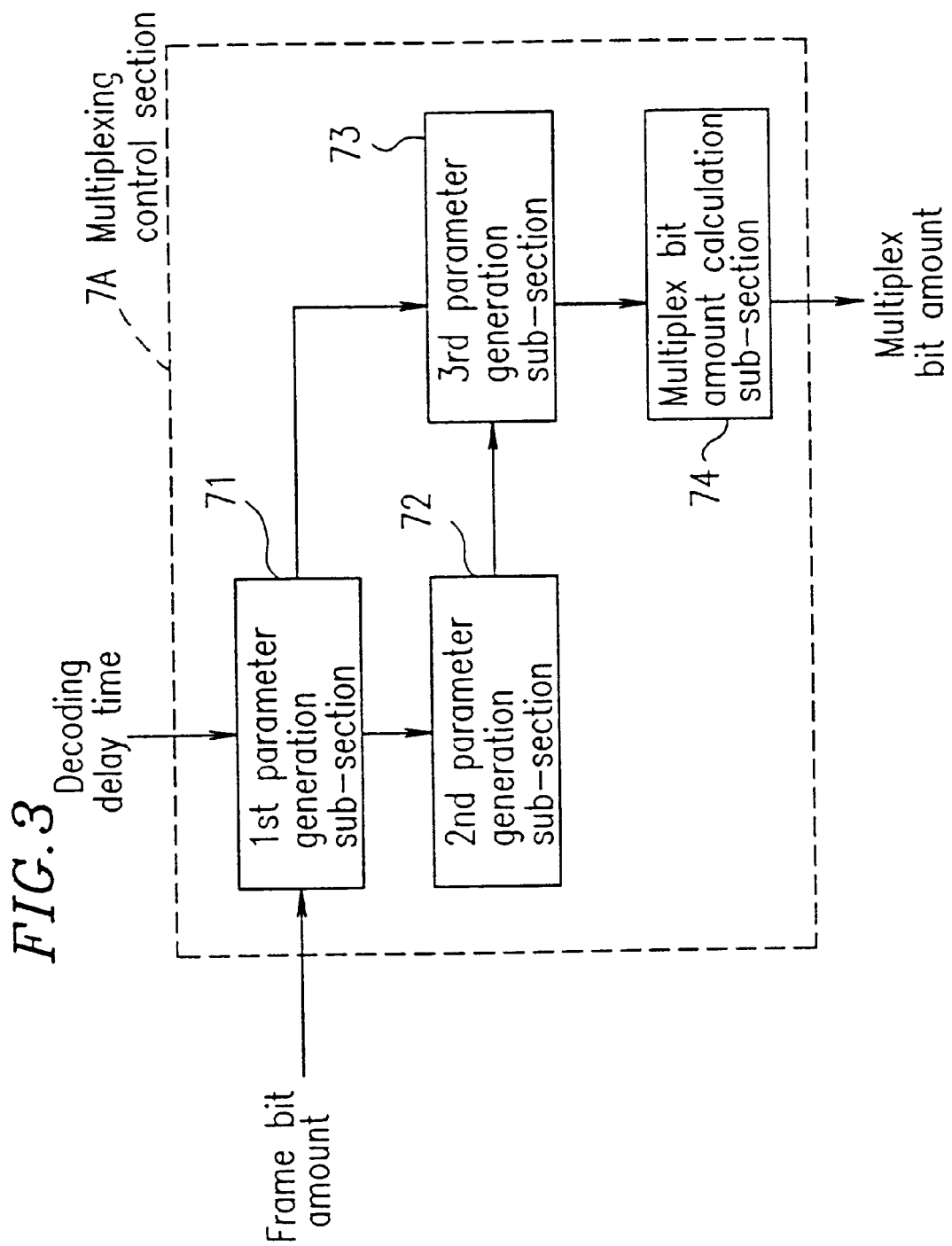
FIG. 3 is a block diagram of a multiplexing control section of the device of FIG. 1.

FIG. 3 is an exemplified configuration of the multiplexing control section 7A in FIG. 1. A first parameter generation sub-section 71 receives the bit amount of a frame including the bit of the accumulated moving image encoded signal which is initially sent to the multiplexing section 3, together with the decoding delay time, for each of the accumulation sections 2-1 to 2-N, and divides the bit amount of the frame by the decoding delay time. A second parameter generation sub-section 72 sums up the values obtained by the first parameter generation sub-section 71 for the accumulation sections 2-1 to 2-N. A third parameter generation sub-section 73 divides the respective values obtained by the first parameter generation sub-section 71 by the value obtained by the second parameter generation sub-section 72 for the accumulation section 2-1 to 2-N. A multiplex bit amount calculation sub-section 74 receives the bit amount of the moving image encoded signals output from the multiplexing section 3 during the period when the bit amounts output from the accumulation sections 2-1 to 2-N to the multiplexing section 3 are calculated, multiplies the received bit amount by the value obtained by the third parameter generation sub-section 73 for each of the accumulation sections 2-1 to 2-N, and notifies the multiplexing section 3 of the resultant value as the bit amount to be output from each of the accumulation section 2-1 to 2-N to the multiplexing section 3.

The operation of the device of Example 1 described above can be summarized as follows. The moving image encoded signals output from the encoding sections 1-1A to 1-NA are temporarily accumulated in the accumulation sections 2-1 to 2-N. The bit amounts of the moving image encoded signals accumulated in the accumulation sections 2-1 to 2-N are summed up by the adder 8, and the resultant value is sent to the quantization control section 4. The quantization control section 4 calculates the quantization width based on the received value, i.e., the sum of the bit amounts of the moving image encoded signals, and the moving images are quantified based on the quantization width. The multiplexing control section 7A calculates the bit amounts to be output from the accumulation sections 2-1 to 2-N to the multiplexing section 3 using the values obtained by the decoding delay time calculation section 5 and the frame bit amount calculation section 6. The multiplexing section 3 multiplexes the moving image encoded signals using the bit amounts obtained by the multiplexing control section 7A, and outputs the resultant moving image encoded signals at a constant bit rate.

Figure 4:
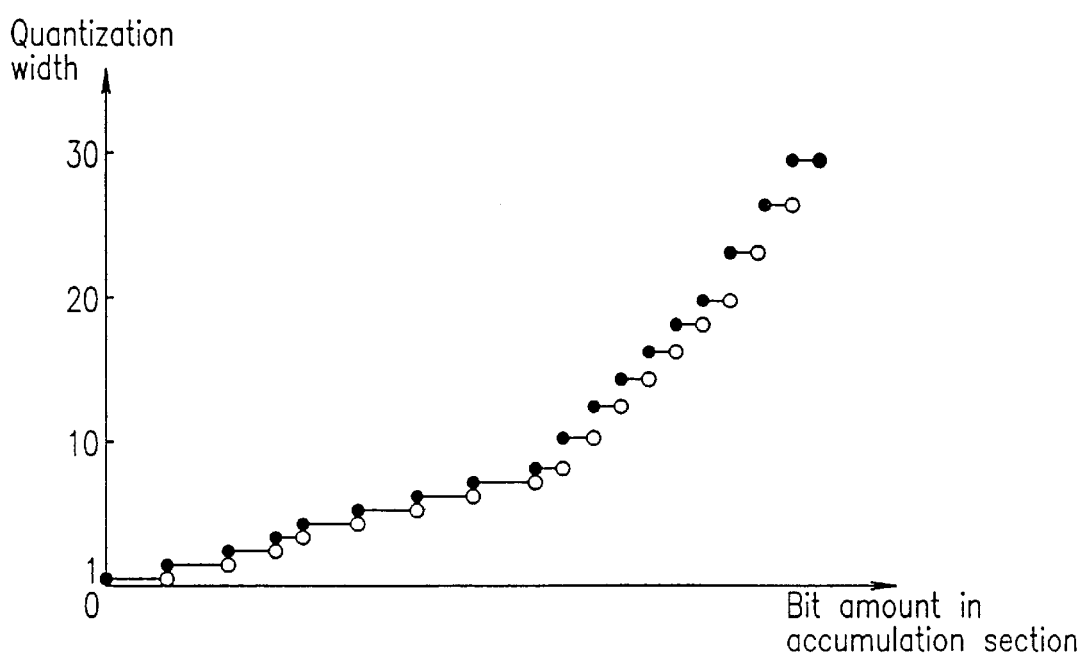
FIG. 4 is a graph showing the quantization width with respect to the bit amount in accumulation sections.

In the above operation, the quantization control section 4 transforms the sum of the bit amounts of the moving image encoded signals into the quantization width. FIG. 4 is a graph showing an example of this transformation. The x-axis of this graph represents the sum of the bit amounts of the moving image encoded signals accumulated in the accumulation sections 2-1 to 2-N, which is equal to the difference between the sum of the bit amounts of the moving image encoded signals generated by the encoding and the bit amounts of the moving image encoded signals output from the accumulation sections 2-1 to 2-N calculated from the bit rates. The y-axis of the graph represents the quantization width. In this example, it is set so that the quantization width is larger as the bit amount is larger, and it is smaller as the bit amount is smaller.

The quantization control section 4 calculates the quantization width based on the characteristics shown in the graph of FIG. 4, and supplies the quantization width to all the encoding sections 1-1A to 1-NA. In other words, all the encoding sections 1-1A to 1-NA have the same value as the quantization width and conducts the quantization based on this quantization width.

As described above, in Example 1, since a plurality of input moving images are compressed/encoded using the same quantization width, the quality of a plurality of output moving images can be made uniform. Moreover, since the quantization control is conducted based on the sum of the bit amounts of the moving image encoded signals accumulated in the accumulation sections 2-1 to 2-N, the bit rate can be effectively used.

Each of the moving images input into the encoding sections 1-1A to 1-NA may constitute one independent moving image or one block composed of segments obtained by dividing one moving image. In the latter case, each block is considered as one frame unit.

In Example 1, all the encoding sections 1-1A to 1-NA are controlled with the same quantization width. Alternatively, different quantization widths may be used by providing a restriction, such as setting the priority for the encoding sections 1-1A to 1-NA and setting an upper limit for the output bit rate for the moving image encoded signals output from the accumulation sections 2-1 to 2-N.

EXAMPLE 2

Figure 5:
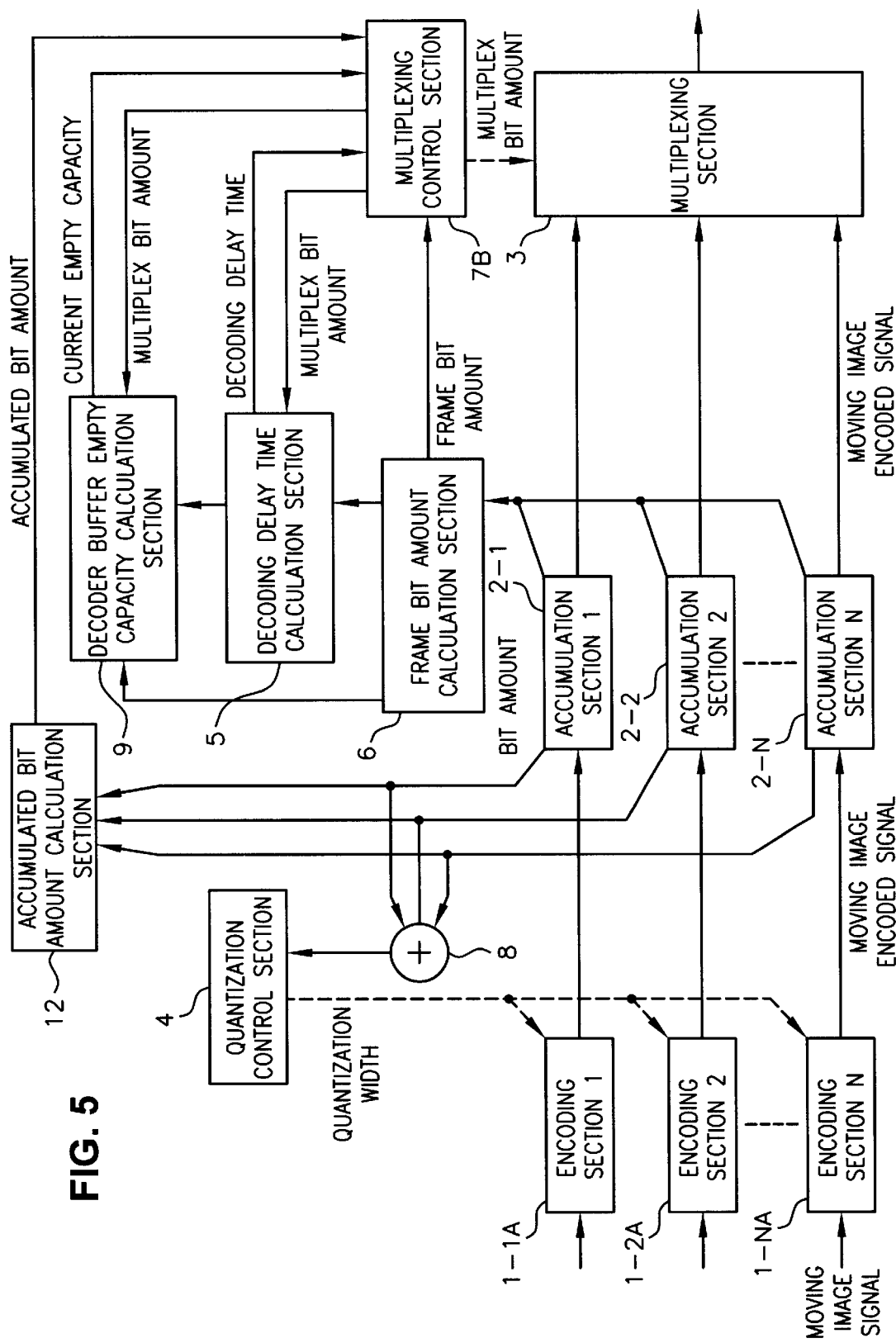
FIG. 5 is a block diagram of a moving image encoding and multiplexing device of Example 2 according to the present invention.

FIG. 5 is a block diagram of a moving image encoding and multiplexing device of Example 2 according to the present invention.

In Example 2, two sections are additionally provided to the device of Example 1 shown in FIG. 1: that is, a decoder buffer empty capacity calculation section 9 which determines the current empty capacity of an input buffer of a decoding device, and an accumulated bit amount calculation section 12 which calculates the respective bit amounts accumulated in the accumulation sections 2-1 to 2-N.

The decoder buffer empty capacity calculation section 9 includes a timer, and receives the bit amount output from each of the accumulation sections 2-1 to 2-N to the multiplexing section 3 from a multiplexing control section 7B, to add the received bit amount to the occupation amount in the input buffer of a virtual decoding device for each of the accumulation sections 2-1 to 2-N. The decoder buffer empty capacity calculation section 9 also receives the bit amount in each frame input into the input buffer of the decoding device from the frame bit amount calculation section 6 and receives the decoding delay time of each frame from the decoding delay time calculation section 5. The time at which the decoding of the frame is started is determined based on the decoding delay time for the frame. When the timer indicates that the decoding time is up, the decoder buffer empty capacity calculation section 9 subtracts the bit amount of the frame to be decoded from the occupation amount in the input buffer of the decoding device, subtracts the resultant occupation amount in the input buffer from the capacity of the input buffer, and outputs the resultant value to the multiplexing control section 7B as the current empty capacity of the input buffer of the decoding device.

Figure 6:
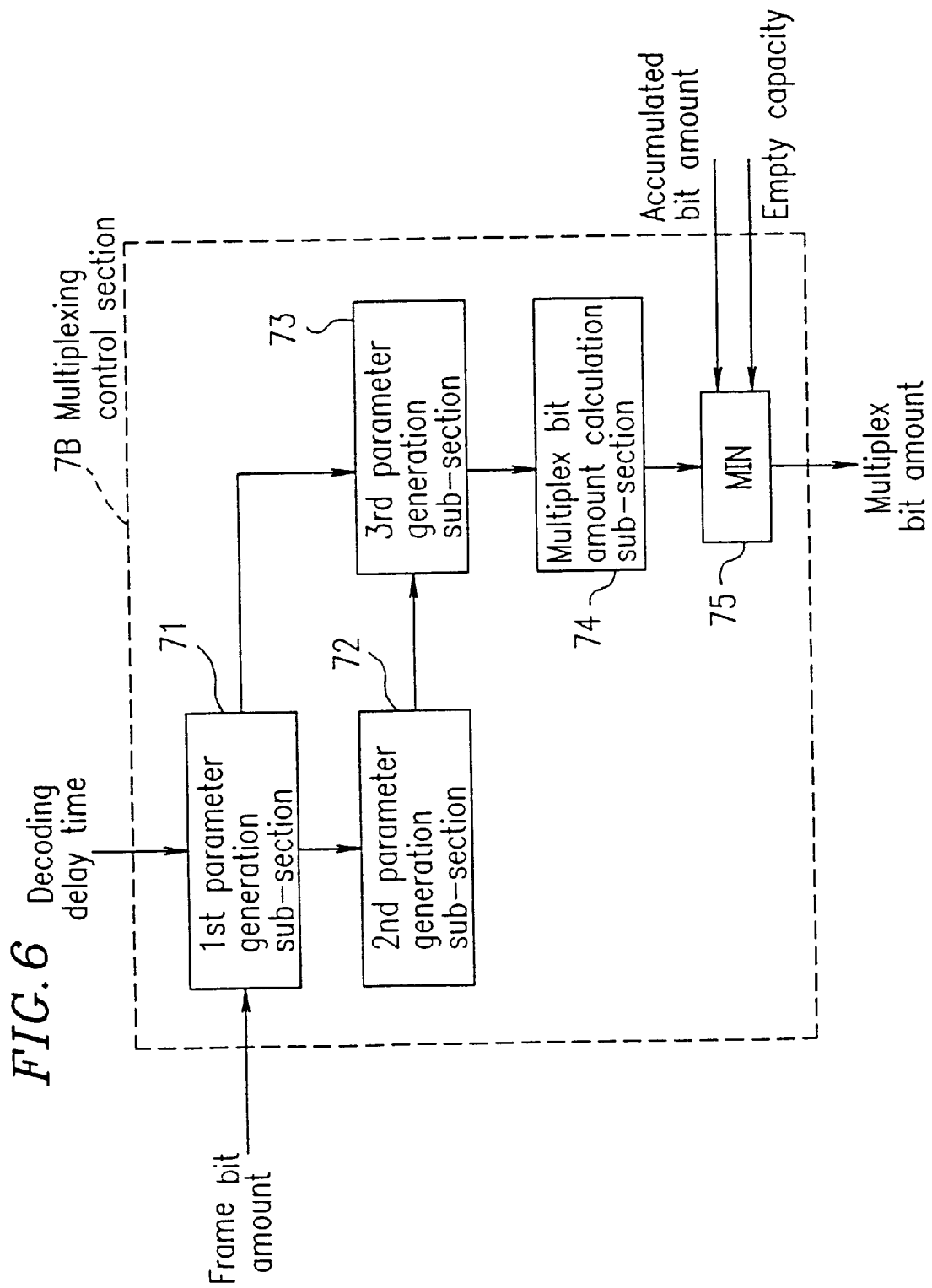
FIG. 6 is a block diagram of a multiplexing control section of the device of FIG. 5.

FIG. 6 shows an exemplified configuration of the multiplexing control section 7B. A minimum value selection sub-section 75 is additionally provided downstream of the multiplex bit amount calculation sub-section 74 of the multiplexing control section 7A of Example 1 shown in FIG. 3. The minimum value selection sub-section 75 selects the minimum value among the product obtained by the multiplex bit amount calculation section 74, the current decoder buffer empty volume obtained by the decoder buffer empty capacity calculation section 9, and the accumulated bit amount in each accumulation section obtained by the accumulated bit amount calculation section 12, and sends the resultant value to the multiplexing section 3 as the bit amount to be output from the accumulation section to the multiplexing section 3 (hereinafter, such a bit amount is referred to as the multiplex bit amount).

Figure 7:
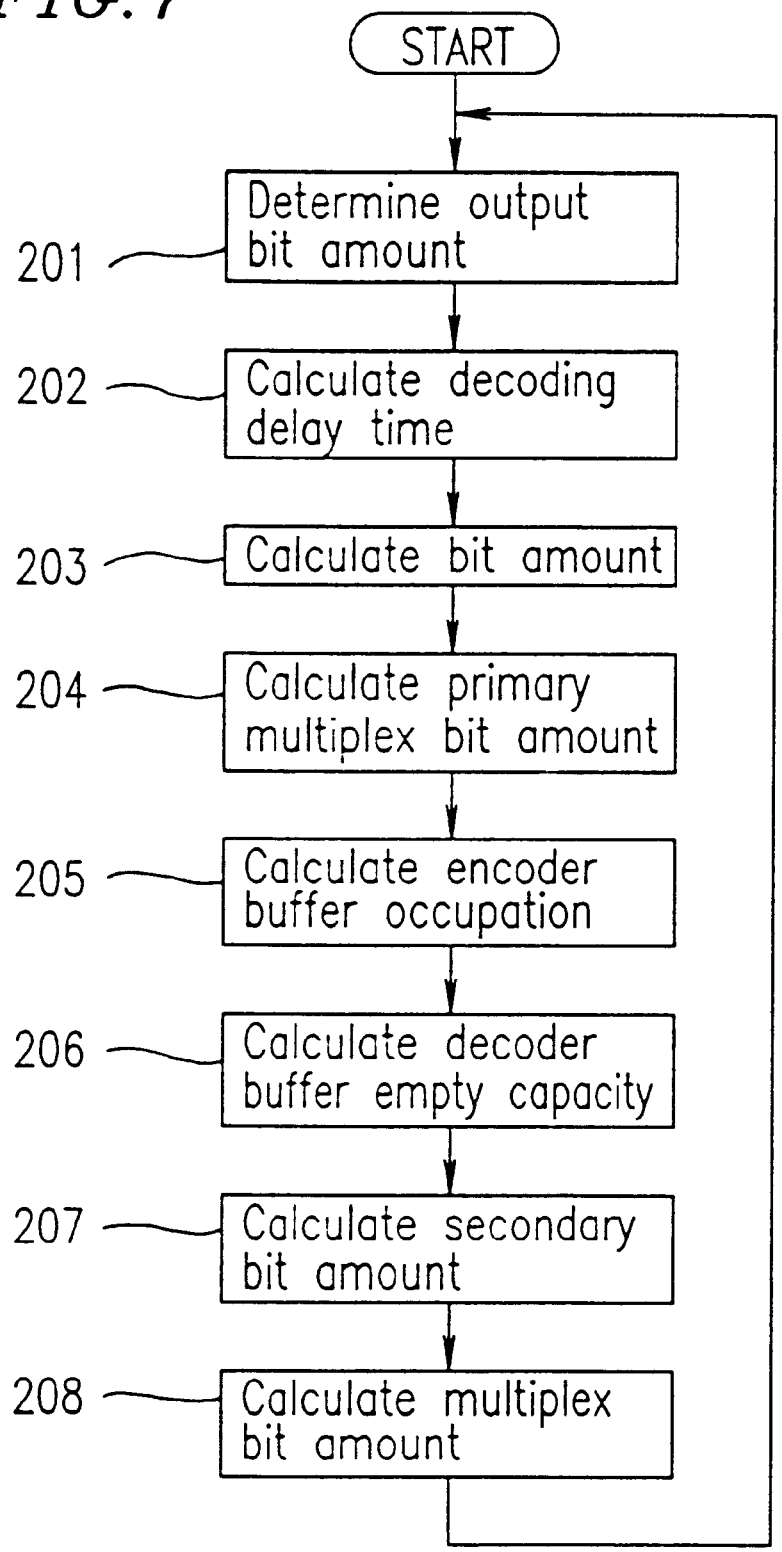
FIG. 7 is a flowchart showing the operation of the device of FIG. 5.

FIG. 7 is a flowchart showing the operation of the multiplexing control section 7B for determining the bit amount of the moving image encoded signal output from each of the accumulation sections 2-1 to 2-N to the multiplexing section 3.

First, the multiplexing control section 7B calculates a bit amount of the moving image encoded signals to be output from the multiplexing section 3 every calculation period of the multiplexing control section 7B based on a predetermined output bit rate at the multiplexing section 3 (step 201). Then, the decoding delay time for each of the accumulation sections 2-1 to 2-N is received from the decoding delay time calculation section 5 (step 202). The bit amount in each frame for each of the accumulation sections 2-1 to 2-N is obtained from the frame bit amount calculation section 6 (step 203). A primary multiplex bit amount is calculated for each of the accumulation sections 2-1 to 2-N in the procedure described later (step 204). Then, the bit amount of the moving image encoded signal accumulated in each of the accumulation sections 2-1 to 2-N is obtained from the accumulated bit amount calculation section 12 (step 205). Thereafter, the input buffer empty capacity calculated by subtracting the bit amount accumulated in the input buffer of the decoding device from the capacity of the input buffer is obtained from the decoder buffer empty capacity calculation section 9 for each of the accumulation sections 2-1 to 2-N (step 206). Subsequently, the minimum value among the primary multiplex bit amount obtained at step 204, the bit amount obtained at step 205, and the input buffer empty capacity obtained at step 206 is selected to use as a secondary multiplex bit amount (step 207). Finally, the bit amount of the moving image encoded signal output from each of the accumulation sections 2-1 to 2-N to the multiplexing section 3 is calculated in the procedure described later (step 208). The above processings are repeated.

Figure 8:
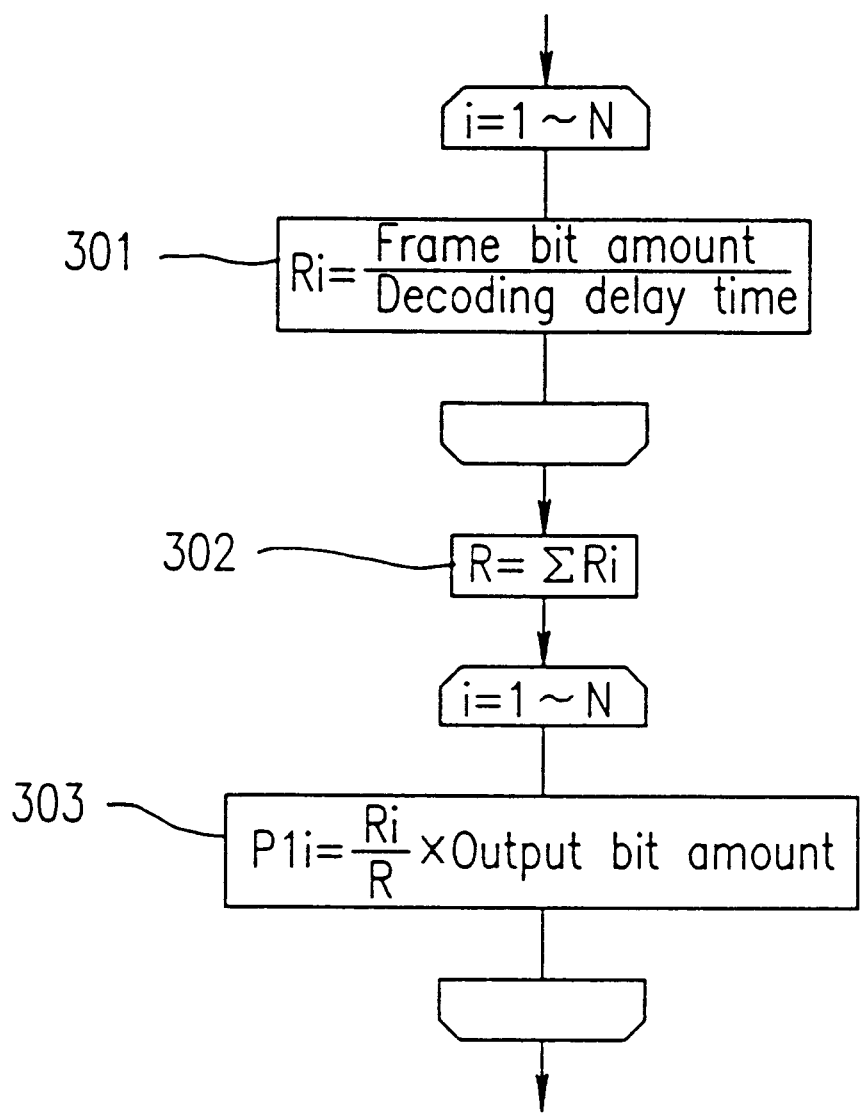
FIG. 8 is a flowchart showing the processing at step 204 in FIG. 7.

FIG. 8 is a flowchart showing the processing at step 204 for calculating the primary multiplex bit amount shown in FIG. 7 in detail.

First, the bit amount of the moving image encoded signal of a frame accumulated in each of the accumulation sections 2-1 to 2-N is divided by the decoding delay time, and the resultant value is denoted by $R_i$ (i=1 to N) (step 301). Then, the sum R of the values $R_1$, to $R_N$ is calculated (step 302). The primary multiplex bit amount $P1_i$ is then calculated by formula (1) below for each of the moving image encoded signals (step 303).

$$P1i = {}^{Ri}\!/_{R} \times \text{moving image output bit amount} \qquad (1)$$

Thereafter, the minimum value among the primary multiplex bit amount $P1_i$, the bit amount obtained at step 205, and the input buffer empty capacity obtained at step 206 is selected for each of the accumulation sections 2-1 to 2-N to use as a secondary multiplex bit amount $P2_i$.

Figure 9:
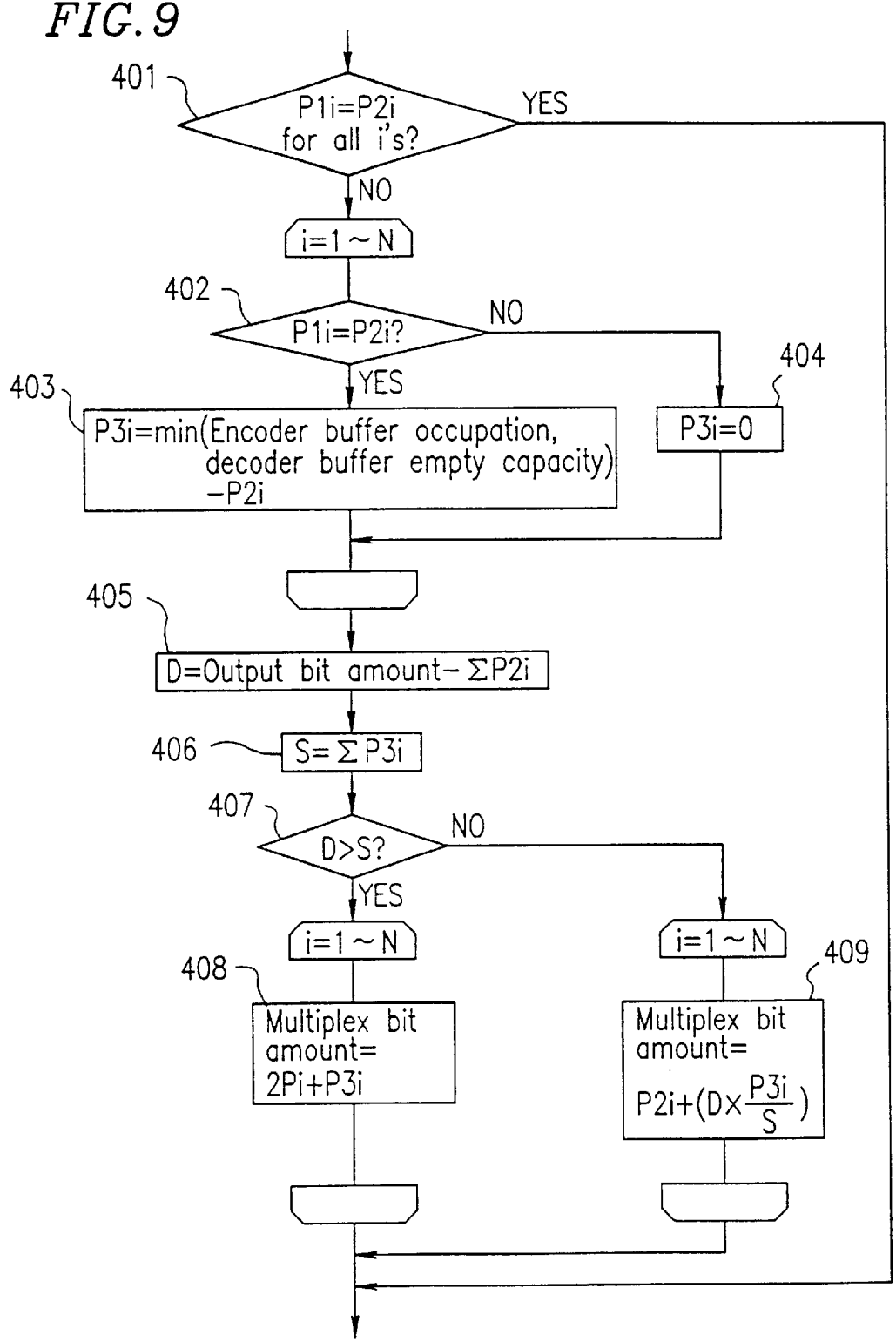
FIG. 9 is a flowchart showing the processing at step 208 in FIG. 7.

FIG. 9 is a flowchart showing the processing at step 208 for calculating the bit amount of the moving image encoded signal output from each of the accumulation section 2-1 to 2-N to the multiplexing section 3 shown in FIG. 7 in detail.

First, if the primary multiplex bit amount $P1_i$ and the secondary multiplex bit amount $P2_i$ are the same for all the moving image encoded signals accumulated in the accumulation sections 2-1 to 2-N, the process is terminated (step 401). Otherwise, whether or not the bit amounts $P1_i$ and $P2_i$ are the same is determined for each of the moving image encoded signals (step 402). If they are the same, a multiplex bit amount $P3_i$ is calculated by formula (2) below, in addition to the secondary multiplex bit amount $P2_i$ obtained at step 207 (step 403).

$$P3i = \min(\text{Encoder buffer occupation, decoder buffer empty capacity}) - P2i \qquad (2)$$

wherein min indicates that the smaller value between the bit amount obtained at step 205 and the input buffer empty capacity obtained at step 206 is used.

If the bit amounts $P1_i$ and $P2_i$ are not the same, the bit amount $P3_i$ is set at 0 (step 404). Then, a short bit amount D of the sum of the secondary multiplex bit amounts $P2_i$ for the accumulation sections 2-1 to 2-N obtained at step 207 in comparison with the bit amount output from the multiplexing section 3 is calculated by formula (3) below (step 405).

$$D = \text{Output bit amount} - \Sigma P2i \qquad (3)$$

Thereafter, the sum S of the bit amounts $P3_i$ obtained at steps 403 and 404 is calculated (step 406). Whether or not the sum S is larger than the short bit amount D is examined (step 407). If yes, the multiplex bit amount of the moving image encoded signal is set at formula (4) below (step 408). If no, it is set at formula (5) below (step 409).

$$\text{Multiplex bit amount} = P2i + P3i \qquad (4)$$

$$\text{Multiplex bit amount} = P2i + (D \times {}^{P3i}\!/_{S}) \qquad (5)$$

Thus, in Example 2, the multiplexing of the moving image encoded signals accumulated in the accumulation sections 2-1 to 2-N is controlled based on the bit amount in each frame and the time at which each frame should be input into the corresponding decoding device. Accordingly, underflow in the input buffer of the decoding device is prevented. Moreover, the bit amount accumulated in the input buffer of each decoding device is calculated to control the multiplexing so as not to transmit a bit amount exceeding the empty capacity of the input buffer. Accordingly, overflow in the input buffer is prevented.

EXAMPLE 3

Figure 10:
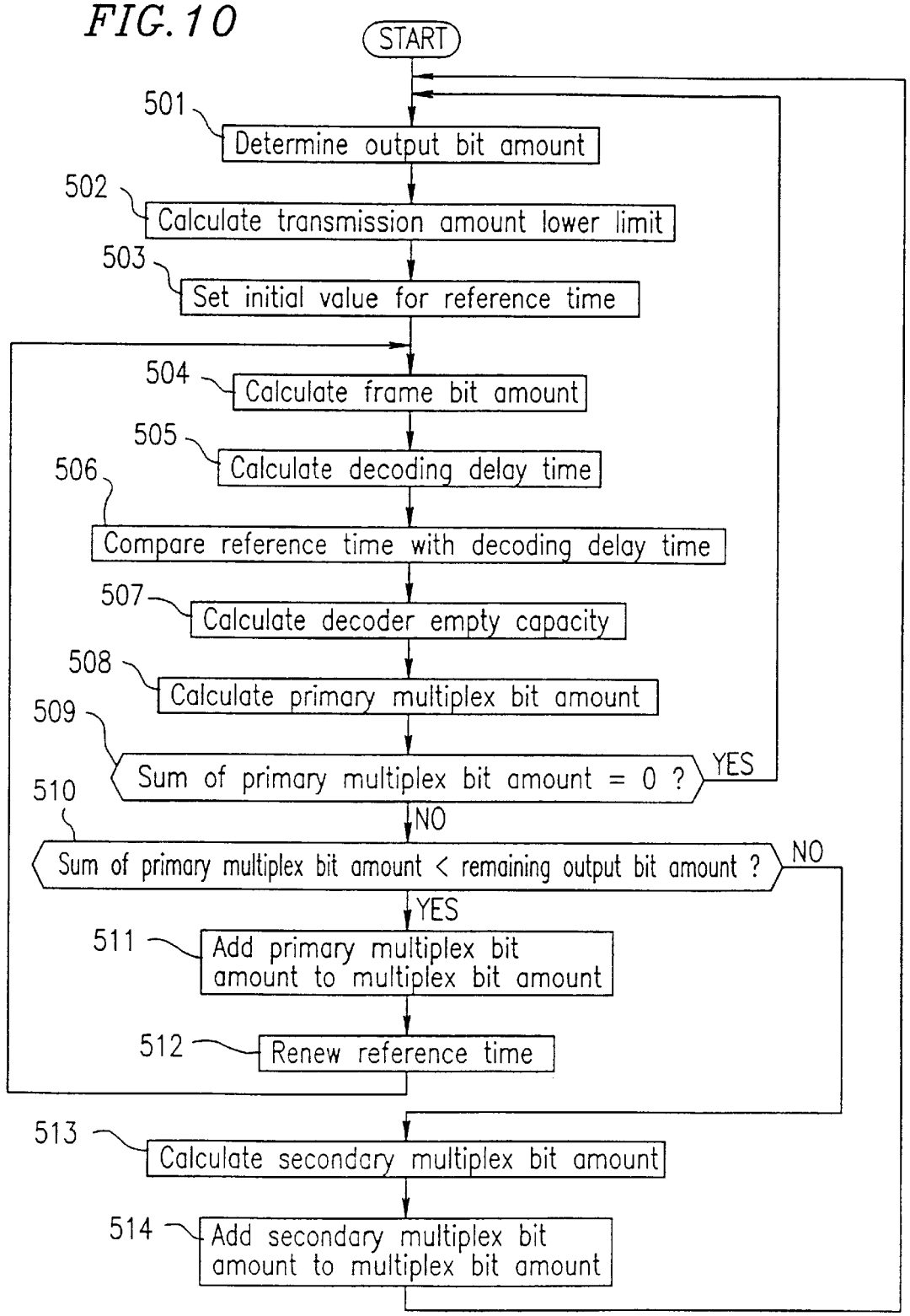
FIG. 10 is a flowchart showing the operation of a moving image encoding and multiplexing device of Example 3 according to the present invention.

FIG. 10 is a flowchart showing the operation of a moving image encoding and multiplexing device of Example 3 according to the present invention. The device of Example 3 is the same in the configuration as the device of Example 1 shown in FIG. 1, but different in the processings from the device of Example 1.

The flowchart of FIG. 10 shows the operation of the multiplexing control section 7A determining the multiplex bit amount, i.e., the bit amount of the moving image encoded signal output from each of the accumulation sections 2-1 to 2-N to the multiplexing section 3.

First, the multiplexing control section 7A calculates the total bit amount of the moving image encoded signal output from the multiplexing section 3 every calculation period of the multiplexing control section 7A based on a predetermined output bit rate at the multiplexing section 3 (step 501). Then, the lower limit of the transmission amount of the moving image encoded signal for each of the accumulation sections 2-1 to 2-N is calculated in the procedure described later (step 502), and the moving image encoded signal of the lower-limit bit amount is output from each of the accumulation sections 2-1 to 2-N to the multiplexing section 3. An initial value is set for a reference time for comparison used to select frames in each of the accumulation sections 2-1 to 2-N sequentially in such a manner that one with a smaller decoding delay time is selected earlier (step 503). The bit amount in a head frame in each of the accumulation sections 2-1 to 2-N is read from the frame bit amount calculation section 6 (step 504). The decoding delay time of the head frame in each of the accumulation sections 2-1 to 2-N is read from the decoding delay time calculation section 5 (step 505). The received decoding delay time of each frame and the reference time are compared (step 506). For the accumulation section which has accumulated the frame of which decoding delay time is shorter than the reference time, the empty capacity of the input buffer of the corresponding decoding device is first calculated (step 507). Then, the minimum value among the bit amount of the frame obtained at step 504, the input buffer empty capacity obtained at step 507, and the maximum transmission bit amount determined by the maximum output bit rate of the moving image encoded signal is selected to use as the primary multiplex bit amount. For the accumulation section which has accumulated the frame of which decoding delay time is longer than the reference time, the primary multiplex bit amount is set at 0 (step 508). Then, the sum of the resultant primary multiplex bit amounts for each of the accumulation sections 2-1 to 2-N is calculated. If the sum is 0, the period of the multiplex bit amount calculation is terminated (step 509). If the sum is smaller than the remaining bit amount after subtracting the lower limit obtained at step 502 from the total bit amount obtained at step 501, the primary multiplex bit amount obtained at step 508 is added to the multiplex bit amount for each of the accumulation sections 2-1 to 2-N (step 511), and the reference time is renewed by adding the frame period time to the reference time, for example (step 512). At this time, the moving image encoded signal of the primary multiplex bit amount is output from each of the accumulation sections 2-1 to 2-N to the multiplexing section 3. If the sum of the primary multiplex bit amounts is larger than the remaining bit amount, values obtained by the proportional distribution depending on the primary multiplex bit amounts are used as the secondary multiplex bit amounts (step. 513), and these secondary multiplex bit amounts are added to the multiplex bit amounts (step 514), thereby terminating the period of the multiplex bit amount calculation. At this time, the moving image encoded signal of the secondary multiplex bit amount is output from each of the accumulation sections 2-1 to 2-N to the multiplexing section 3. The above processings are repeated sequentially.

The processing at step 502 for calculating the lower limit of the transmission amount shown in FIG. 10 will be described with reference to the graphs of FIGS. 11A to 11C. FIG. 11C is an enlarged partial view of the graph of FIG. 11B.

Figure 11A:
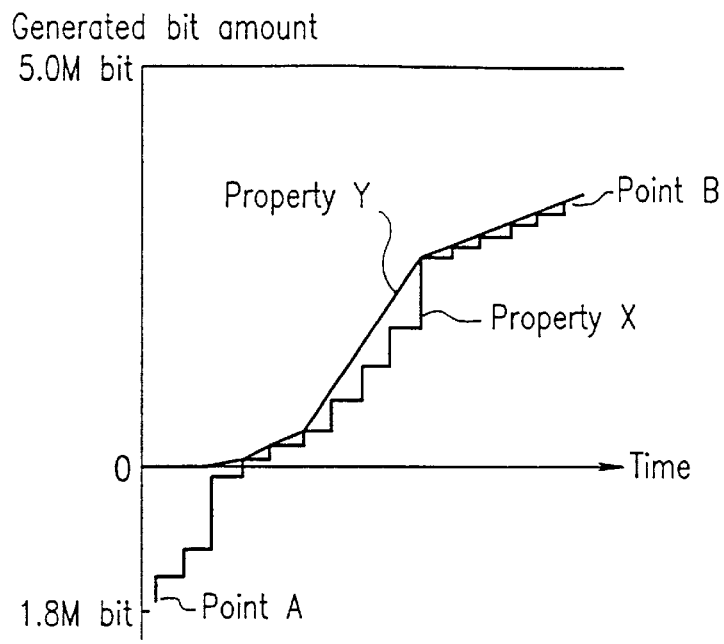
FIGS. 11A to 11C are graphs for illustrating the processing at step 502 in FIG. 10 where the lower limit of the transmission amount is calculated.
Figure 11B:
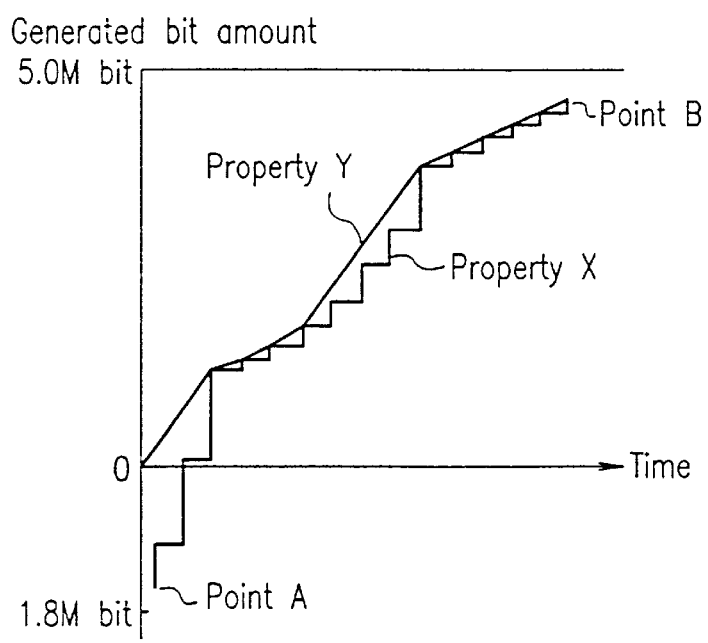
Figure 11C:
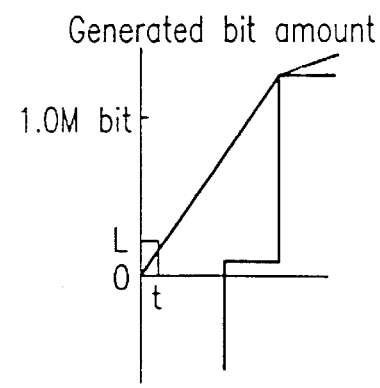

The graphs in FIGS. 11A to 11C are based on the bit amount of each frame accumulated in the buffer (the accumulation section located downstream of the coding section or the buffer of the decoding device) at a certain time. The x-axis of these graphs represents the time axis to show the time period required for a frame in the buffer to be decoded. Each flat portion of property X represents one frame period. The y-axis represents the bit amount: The value below 0 represents the bit amount of the moving image encoded signal accumulated in the buffer of the decoding device, while the value equal to or more than 0 represents the bit amount of the moving image encoded signal accumulated in the buffer of the encoding device.

The polygonal line of property X in the graphs of FIGS. 11A and 11B will be described. First, the time period required until a frame which is to be decoded earliest is decoded is determined and plotted as an x coordinate from the origin 0, and the total bit amount accumulated in the buffer of the decoding device is determined and plotted as a y coordinate located below the origin 0, so as to obtain point A. Using point A as a starting point, a straight line is drawn upward along the y-axis for a length corresponding to the bit amount of the frame. Then, a straight line is drawn along the x-axis for a length corresponding to the one frame period. Thereafter, a straight line with a length corresponding to the bit amount of a frame which is to be decoded second earliest is drawn along the y-axis, followed by a straight line with a length corresponding to one frame period. This is repeated for all the frames in the buffer in the manner that the frame to be decoded earlier is drawn earlier. For the frame which is currently being encoded, a straight line is drawn based on the bit amount which has been encoded. The end point of this polygonal line is denoted by point B.

The polygonal line of property Y will be described. This line is drawn starting from point B which indicates the generated bit amount of the frame which is currently being encoded, so that it is always located above property X and above the origin 0, and the largest tilt does not exceed the maximum bit rate for the moving image encoding and multiplexing device. Property Y represents the minimum bit amount required to be transmitted to the decoding device within a predetermined time period to avoid underflow in the decoding device. In this example, the time of x-axis is assumed to be the time which elapses from the current time. This minimum transmission bit amount corresponds to the lower limit of the transmission amount obtained at step 502 every calculation period.

The lower limit of the minimum transmission amount in the next calculation period is 0 for property Y in FIG. 11A, while it is L (L>0) for property Y in FIG. 11B.

As described above, in Example 3, a frame of which decoding delay time is shorter is output earlier, and the bit amount required to avoid underflow is preferentially output. Thus, the underflow of the bit amount in the input buffer of the decoding device can be prevented.

EXAMPLE 4

The device of Example 1 described above is effective when the maximum output bit rate and the capacity of the input buffer of the decoding device are not limited. However, when they are limited, underflow may occur in the input buffer of the decoding device since the transmission of the moving image encoded sinal is late. Assume that the bit amount generated in one encoding section suddenly increases because part of an input image is very complicated, for example. In such a case, in the decoding device which decodes the increased bit amount, the bit amount of the frame input into the input buffer becomes larger than the bit amount of the frame read from the input buffer for decoding, resulting in the input buffer being full. Therefore, the bit amount in the corresponding accumulation section located downstream of the encoding section where the bit amount has suddenly increased does not decrease. To compensate this, the bit amounts output from the accumulation sections located downstream of the other encoding sections where the bit amounts have not increased increase, resulting in the decrease in the bit amounts in these accumulation sections. As a result, the available bit amounts in all the accumulation sections decrease, causing the output bit rate at the multiplexing section 3 to become short. Since the quantization control is conducted under the premise that the output bit rate at the multiplexing section 3 is always constant, underflow occurs in the input buffer of the decoding device due to the decrease in the transmission amount. To overcome this problem, it previously required to stuff the signal with bits which do not affect the decoding.

Figure 12:
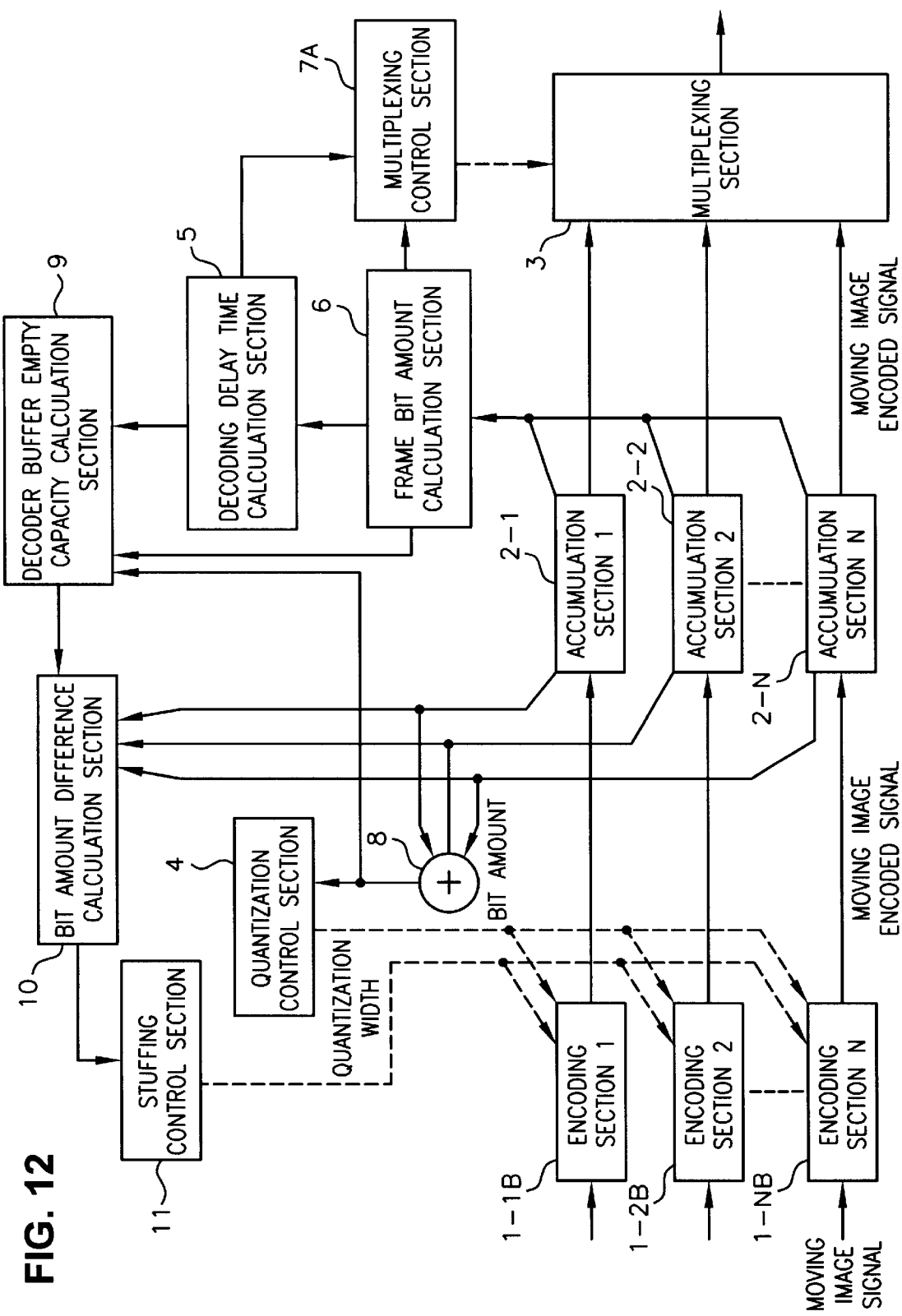
FIG. 12 is a block diagram of a moving image encoding and multiplexing device of Example 4 according to the present invention.

FIG. 12 is a block diagram of a moving image encoding and multiplexing device of Example 4 according to the present invention. The device of Example 4 is provided with the following sections additionally to the device of Example 1 shown in FIG. 1: that is, a decoder buffer empty capacity calculation section 9 for calculating the bit amount accumulated in the input buffer of the decoding device to determine the empty capacity of the input buffer; a bit amount difference calculation section which calculates the difference between the bit amount in the accumulation section and the buffer empty capacity of the decoding device corresponding to the accumulation section obtained by the decoder buffer empty capacity calculation section 9 for each of the accumulation sections 2-1 to 2-N; and a stuffing control section which controls a stuffing bit amount generated by each of encoding sections 1-1B to 1-NB based on the differential value obtained by the bit amount difference calculation section 10.

Figure 13:
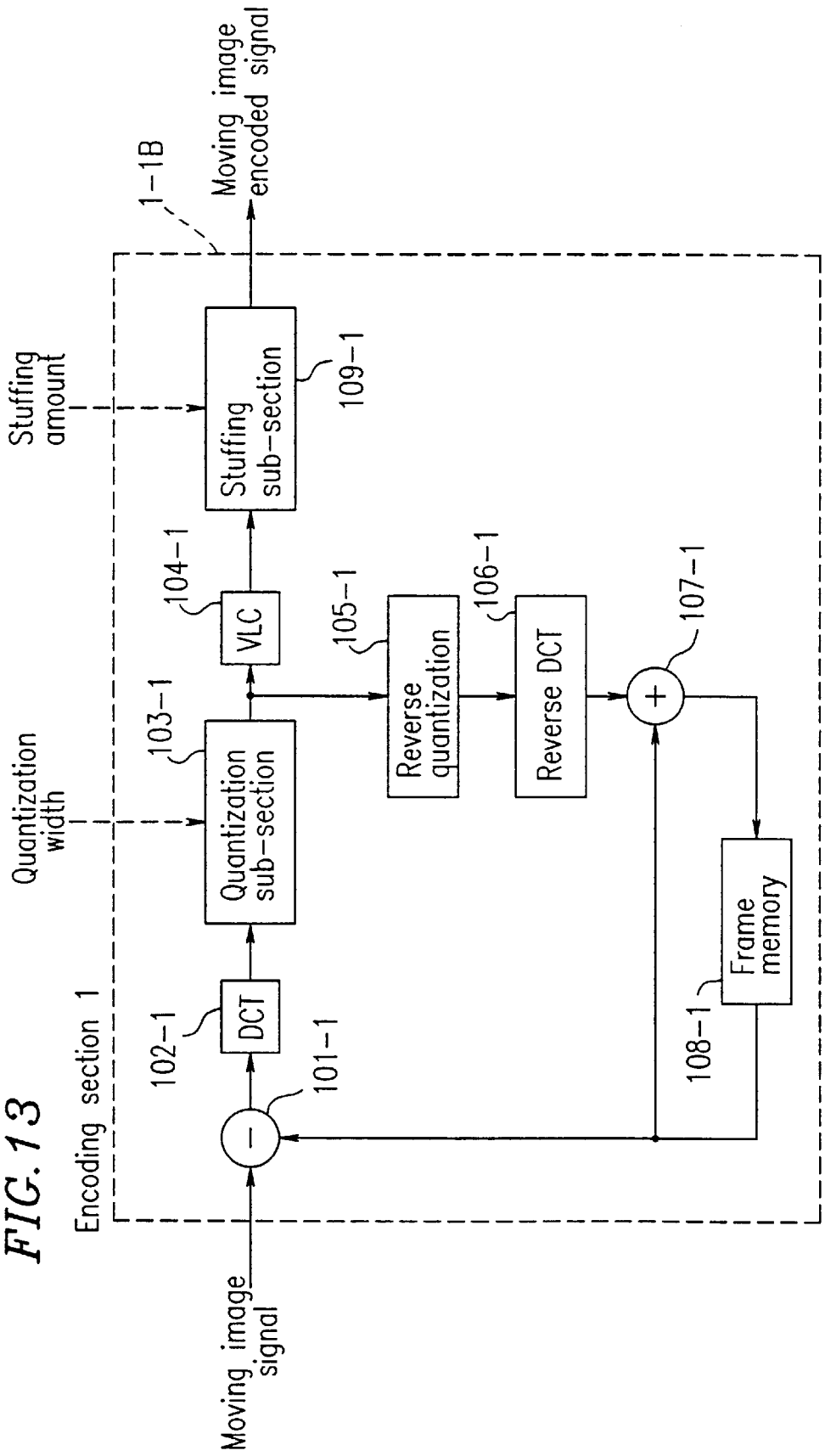
FIG. 13 is a block diagram of an encoding section of the device of FIG. 12.

FIG. 13 is an exemplified configuration of the encoding sections 1-1B to 1-NB in FIG. 12. This configuration is different from that of FIG. 2 in that a stuffing sub-section 109-1 is provided downstream of the variable length encoding sub-section 104-1.

The stuffing sub-section 109-1 inserts stuffing bits of a stuffing amount specified by the stuffing control section 11 in the signal output from the variable length encoding sub-section 104-1, and outputs the resultant signal.

In the device of this example with the above configuration, the decoding delay time calculation section 5 calculates the decoding delay time for the bit of the moving image encoded signal stored in each of the accumulation sections 2-1 to 2-N which is initially sent to the multiplexing section 3, as in Example 1, and outputs the results to the decoder buffer empty capacity calculation section 9. The frame bit amount calculation section 6 calculates the bit amount of a frame including the bit of the moving image encoded signal accumulated in each of the accumulation sections 2-1 to 2-N which is initially sent to the multiplexing section 3, as in Example 1, and the outputs the results to the decoder buffer empty capacity calculation section 9. The bit amounts of the moving image encoded signals accumulated in the accumulation sections 2-1 to 2-N are summed up by the adder 8, and the results are output to the decoder buffer empty capacity calculation section 9.

The decoder buffer empty capacity calculation section 9 is provided with a timer, and holds a moving image output bit rate as a portion of the output bit rate at the multiplexing section 3 allocated for the moving image encoded signal.

More specifically, the decoder buffer empty capacity calculation section 9 calculates the current empty capacity of the input buffer of the decoding device based on the decoding delay time and the bit amount of a frame in the accumulation section and the value indicated by the timer for each of the accumulation sections 2-1 to 2-N. Thereafter, based on the sum of the bit amounts of the moving image encoded signals accumulated in each of the accumulation sections 2-1 to 2-N and the output bit rate for the moving image encoded signals output from the multiplexing section 3, a time T at which all the moving image encoded signals accumulated in each of the accumulation sections 2-1 to 2-N are transmitted at the output bit rate is calculated by formula (6) below.

T=Sum of accumulation section bit amounts/Moving image output bit rate  (6)

Thereafter, the empty capacity of the input buffer of the decoding device after the lapse of time T is calculated under the assumption that no moving image encoded signal is input into the input buffer of the decoder from the current time until time T.

The calculation by the decoder buffer empty capacity calculation section 9 will be described with reference to FIGS. 14A and 14B. FIG. 14A shows the current states of the accumulation section and the input buffer of the decoding device, where A1 denotes the current bit amount in the accumulation section and B1 denotes the current empty capacity of the input buffer of the decoding device obtained by the decoder buffer empty capacity calculation section 9. Assume that three frames are decoded by the decoding device during the time from the current time until time T. Then, as shown in FIG. 14B, the decoder buffer empty capacity calculation section 9 outputs a value B2 corresponding to a total of the value B1 and the bit amount of the three frames at the head of the input buffer.

The bit amount difference calculation section 10 calculates the difference between the bit amount in the accumulation section and the empty capacitor of the input buffer of the decoding device corresponding to the accumulation section obtained by the decoder buffer empty capacitor calculation section 9 for each of the accumulation sections 2-1 to 2-N, and outputs the resultant N differential values to the stuffing control section 11.

FIG. 15 is a flowchart showing the operation of the stuffing control section 11.

First, the N differential values obtained by the bit amount difference calculation section 10 are denoted by $G_i$ (i=1 to N), and $S_p$ and $S_m$ for calculating the sum of the differential values are set at 0 (step 601). Then, whether or not each of the differential values $G_1$ to $G_N$ is 0 is examined (step 602). If the differential value is equal to or more than 0, the differential value is added to $S_p$ (step 603). If the differential value is smaller than 0, the absolute value thereof is added to $S_m$ (step 604). Then, whether or not $S_p$ is larger than 0 is examined. If $S_p$ is larger than 0, the process proceeds to steps 605 to 611 where the stuffing bit amount is calculated. If $S_p$ is 0, the process is terminated without stuffing (step 612). Then, whether or not $S_m$ is larger than $S_p$ is examined (step 605). If $S_m$ is equal to or larger than $S_p$, whether or not each of the differential values $G_1$ to $G_N$ is smaller than 0 is examined (step 606). If yes, the stuffing bit amount for the moving image encoded signal corresponding to the differential value $G_i$ is calculated by formula (7) below (step 607). If no, the stuffing bit amount is set at 0 (step 608).

$$\text{Stuffing bit amount} = S_p \times |G_i|/S_m \tag{7}$$

If $S_m$ is smaller than $S_p$ whether or not each of the differential values $G_1$ to $G_N$ is smaller than 0(step 609). If yes, the stuffing bit amount for the moving image encoded signal corresponding to the differential value $G_i$ is set at the absolute of $G_i$ (step 610). If no, the stuffing bit amount is set at 0 (step 611).

After obtaining the stuffing bit amount as described above, the stuffing control section 11 supplies the stuffing bit amount to the stuffing sub-section 109-1 of the encoding section. The stuffing sub-section 109-1 then stuffs the output signal with stuffing bits of the supplied stuffing bit amount.

Thus, in the device of Example 4 with the stuffing function, when the generated bit amount of part of the moving image encoded signal suddenly increases, the underflow which may occur when no stuffing is conducted is prevented.

The above-described calculation method of the stuffing bit amount is only an example. Other methods may also be employed. For example, the stuffing bit amount may be increased or decreased for byte aligning of the moving image encoded signal and the like. The total stuffing bit amount may be increased or decreased by multiplying $S_p$ by a coefficient. Alternatively, $S_p$ may be equally allocated to the moving image encoded signals where $S_m$ is smaller than 0.

In this example, whether or not the stuffing is conducted was determined by whether or not the value obtained by the bit amount differential calculation section 10 is equal to or more than 0. Any value other than 0 may be used.

EXAMPLE 5

Figure 16:
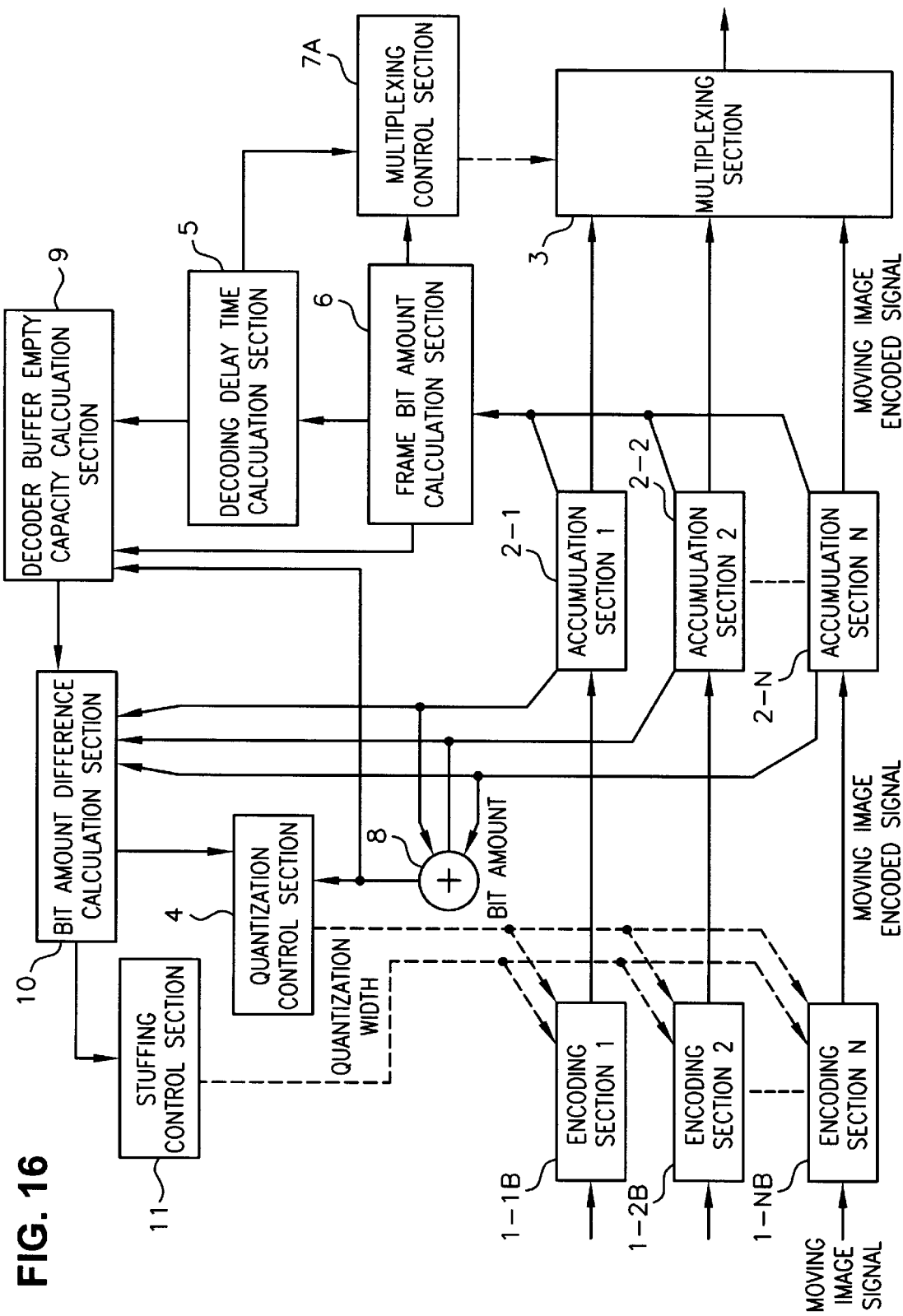
FIG. 16 is a block diagram of a moving image encoding and multiplexing device of Example 5 according to the present invention.

FIG. 16 is a block diagram of a moving image encoding and multiplexing device of Example 5 according to the present invention.

The device of this example is the same as that of Example 4 shown in FIG. 12, except that the bit amount difference calculation section 10 outputs the buffer differential value to the quantization control section 4.

The operation of the device of this example with the above configuration will be described. When the conditions for the stuffing is satisfied, the quantization control section 4 outputs a reduced quantization width to the encoding section among the encoding sections 1-1B to 1-NB where the stuffing is to be conducted. More specifically, when the quantization width calculated by the quantization control section 4 based on the bit amount output from the adder 8 is Q, a quantization width [k×Q] is supplied to the encoding section where the stuffing is conducted, wherein k is a positive number smaller than 1 and [k×Q] is the maximum integer within the range not exceeding k×Q. The quantization control section 4 receives the buffer differential value from the bit amount difference calculation section 10 and conducts an operation similar to the operation shown in FIG. 15. In this case, however, the quantization width is reduced at steps 607 and 610, while the quantization width is kept unchanged at steps 608 and 611.

Thus, in Example 5, the underflow in the decoding device can be prevented by reducing the quantization width used for the encoding to increase the bit amount, instead of the stuffing in Example 4.

EXAMPLE 6

A moving image encoding and multiplexing device of Example 6 according to the present invention will be described. The device of Example 6 is the same as that of Example 5, except that the quantization control section 4 supplies an increased quantization width for the encoding section among the encoding sections 1-1B to 1-NB where the conditions for the stuffing are not satisfied. More specifically, when the quantization width calculated by the quantization control section 4 based on the bit amount output from the adder 8 is Q, a quantization width [k×Q] is supplied to the encoding section where the stuffing is not conducted, wherein k is a positive number larger than 1 and [k×Q] is the maximum integer within the range not exceeding k×Q.

The quantization control section 4 receives the buffer differential value from the bit amount difference calculation section 10 and conducts an operation similar to the operation shown in FIG. 15. In this case, however, the quantization width is increased at steps 607 and 610, while the quantization width is kept unchanged at steps 608 and 611.

Thus, in Example 6, as opposed to the case of Example 5, the quantization width for the encoding section where the stuffing is not conducted is increased to reduce the bit amount, so as to obtain the same effect as that described in Example 4. The operations of Examples 5 and 6 may be combined so that the quantization width is increased for the encoding section where the bit amount is increased and it is reduced for the other encoding sections.

EXAMPLE 7

Figure 17:
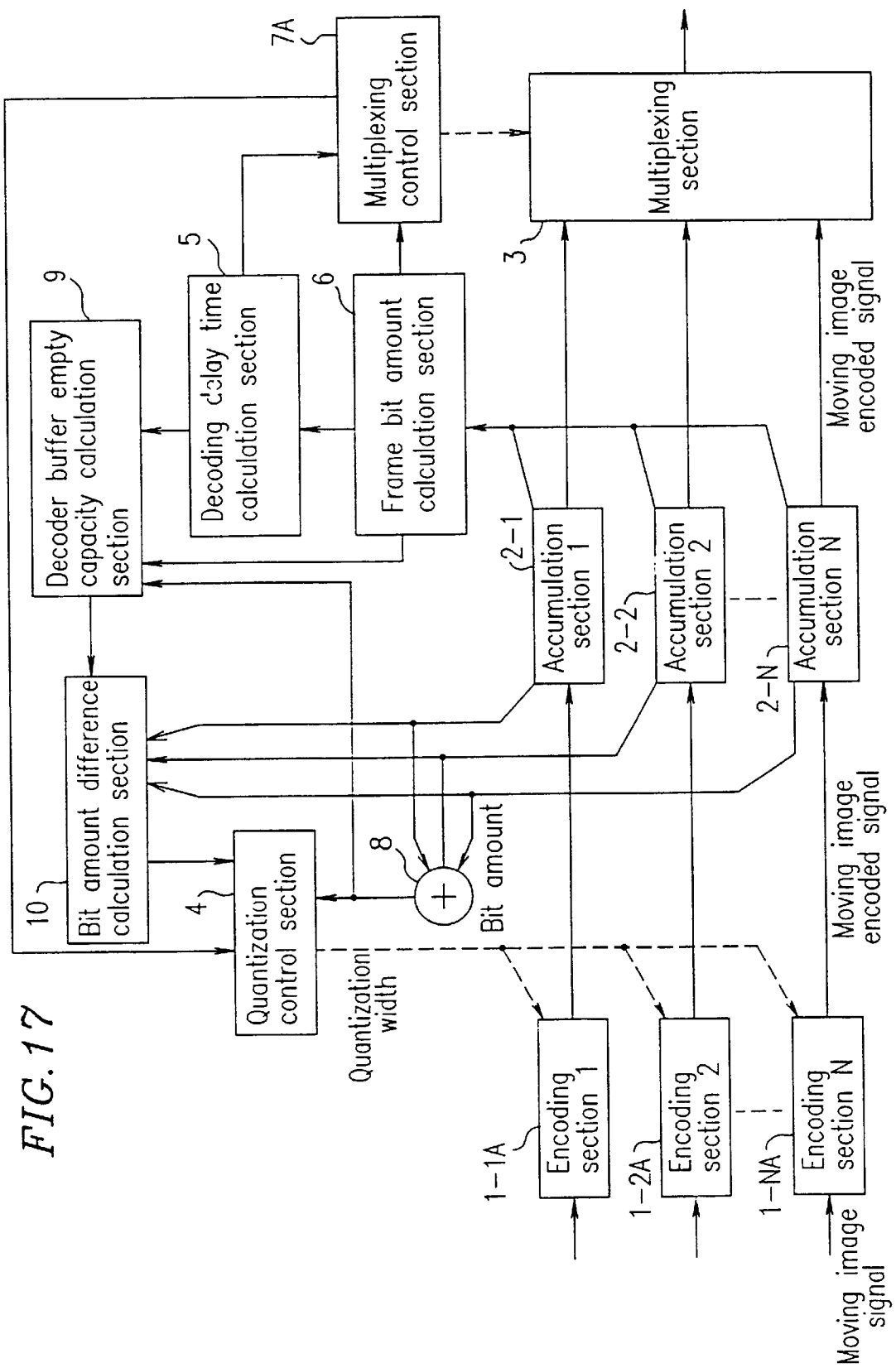
FIG. 17 is a block diagram of a moving image encoding and multiplexing device of Example 7 according to the present invention.

FIG. 17 is a block diagram of a moving image encoding and multiplexing device of Example 7 according to the present invention. The device of this example is the same as that of FIG. 16, except that the stuffing control section 11 is not provided and that the multiplexing control section 7A conducts the required control of the stuffing bit amount for the multiplexing section 3, as well as outputting to the quantization control section 4 the stuffing bit amount which the stuffing control section 11 has instructed the multiplexing section 3 to insert.

In the device of this example with the above configuration, the quantization control section 4 calculates the quantization width based on the bit amounts in the accumulation sections 2-1 to 2-N added together by the adder 8 and the calculation results by the bit amount difference calculation section 10. In this example, the quantization control section 4 executes the processings at steps 601 to 604 in FIG. 15 to calculate $S_p$, and adds the resultant $S_p$ to the sum of the bit amounts in the accumulation sections 2-1 to 2-N. In other words, the sum of the stuffing bit amounts which have been controlled to be inserted at the encoding sections in Example 4 is added to the bit amount of the actually generated moving image encoded signals. Then, the quantization width is d determined as in Example 1. The required stuffing is conducted by the multiplexing section 3 under the control of the multiplexing control section 7A. The stuffing is effected to compensate a short bit amount when the sum of the total multiplex bit amounts is short of the bit amount to be output from the multiplexing section 3 due to the prevention of overflow in the buffer of the decoding device or the shortage of the bit amounts accumulated in the accumulation sections 2-1 to 2-N.

In this example, the multiplexing control section 7A performs the stuffing of the required bit amount. The quantization control section 4 predicts the stuffing bit amount and adjusts the quantization size so as to avoid underflow in the decoding device. This generates an error between the predicted stuffing bit amount and the actual bit amount, and thus the predicted amount should be adjusted. In order to adjust the predicted amount, the quantization control section 4 receives the stuffing bit amount from the multiplexing control section 7A to compare it with $S_p$. Then, $S_p$ is adjusted so that the error between the accumulated value of $S_p$ and the accumulated value of the stuffing bit amount is within a predetermined range.

Thus, in the device of Example 7, the same effect can be obtained by a simpler configuration compared with the device of Example 4.

EXAMPLE 8

When the number of pixels constituting an input moving image is large, the processing speed by one encoding device may be insufficient. Screen division encoding is one of the methods for encoding a moving image signal representing such a moving image composed of a large number of pixels.

In Examples 1 to 6, the respective encoding sections mainly encode individual moving images. The present invention is also applicable for screen division encoding.

Figure 18:
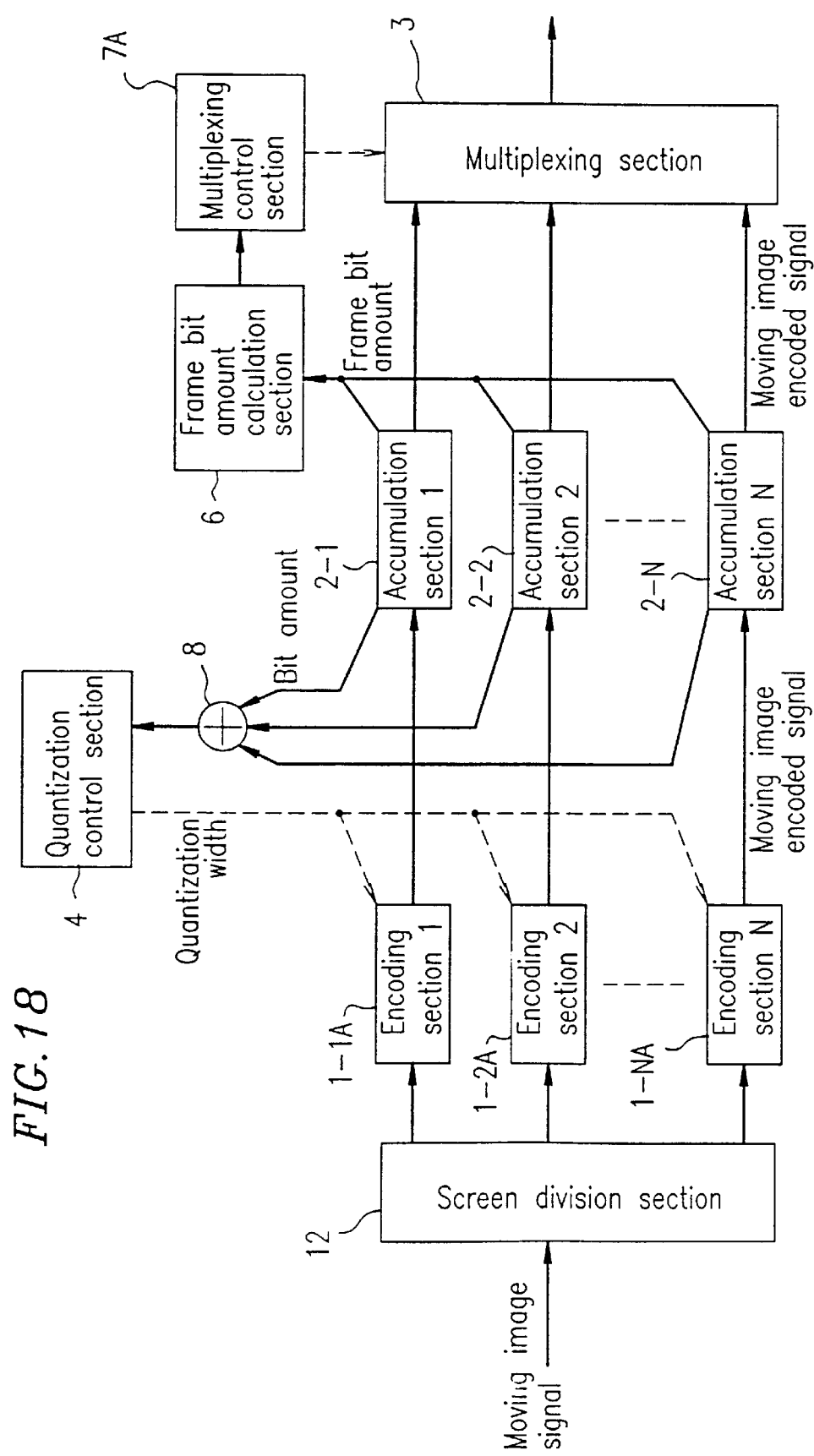
FIG. 18 is a block diagram of a moving image encoding and multiplexing device of Example 8 according to the present invention.

FIG. 18 is a block diagram of a moving image encoding and multiplexing device of Example 8 according to the present invention. The device of this example is provided with a screen division section 12 upstream of the encoding sections 1-1A to 1-NA of the device of Example 1 shown in FIG. 1. The decoding delay time calculation section 5 in Example 1 is not provided in this example.

Figure 19:
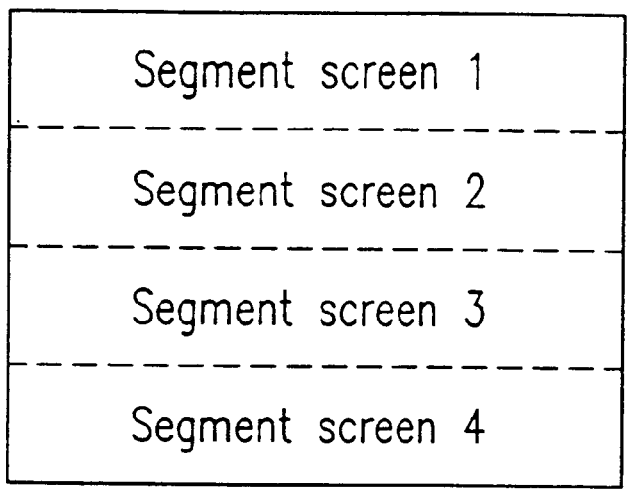
FIG. 19 is a schematic view showing a screen division method employed by the device of FIG. 18.

The screen division section 12 divides an input moving image into a plurality of segment screens as shown in FIG. 19., and allocates moving image signals representing the respective segment screens to the encoding sections 1-1A to 1-NA. The encoding sections 1-1A to 1-NA encode the received moving image signals based on the quantization width supplied from the quantization control section 4. The same quantization width is supplied to the encoding sections 1-1A to 1-NA. The resultant moving image encoded signals output from the encoding sections 1-1A to 1-NA are temporarily accumulated in the accumulation sections 2-1 to 2-N. The bit amounts in each of the accumulation sections 2-1 to 2-N are added together by the adder 8, and the added bit amount is output to the quantization control section 4. The quantization control section 4 calculates the quantization width based on the bit amount received from the adder 8.

The frame bit amount calculation section 6 calculates the bit amount of a frame including the bit of the moving image encoded signal accumulated in each of the accumulation sections 2-1 to 2-N which is initially sent to the multiplexing section 3. The multiplexing control section 7A controls the multiplexing section 3 so that the moving image encoded signal of the bit amount calculated by the frame bit amount calculation section 6 is sent from each of the accumulation sections 2-1 to 2-N to the multiplexing section 3 in the order corresponding to the adopted screen division method. The multiplexing section 3 multiplexes the moving image encoded signal based on the control by the multiplexing control section 7A so that the encoded signals construct one screen, and outputs the multiplexed signals at a constant bit rate.

Thus, in this example, moving images are encoded with the same quantization width for all the segment screens at the screen division encoding. This suppresses the variation in image quality on one screen.

In this example, one screen was divided into four segments in the horizontal direction. Alternatively, the screen may be divided into segments in the vertical direction or in the combination of horizontal and vertical directions. Also, the number of segments is not limited to four but may be any natural number.

EXAMPLE 9

Figure 20:
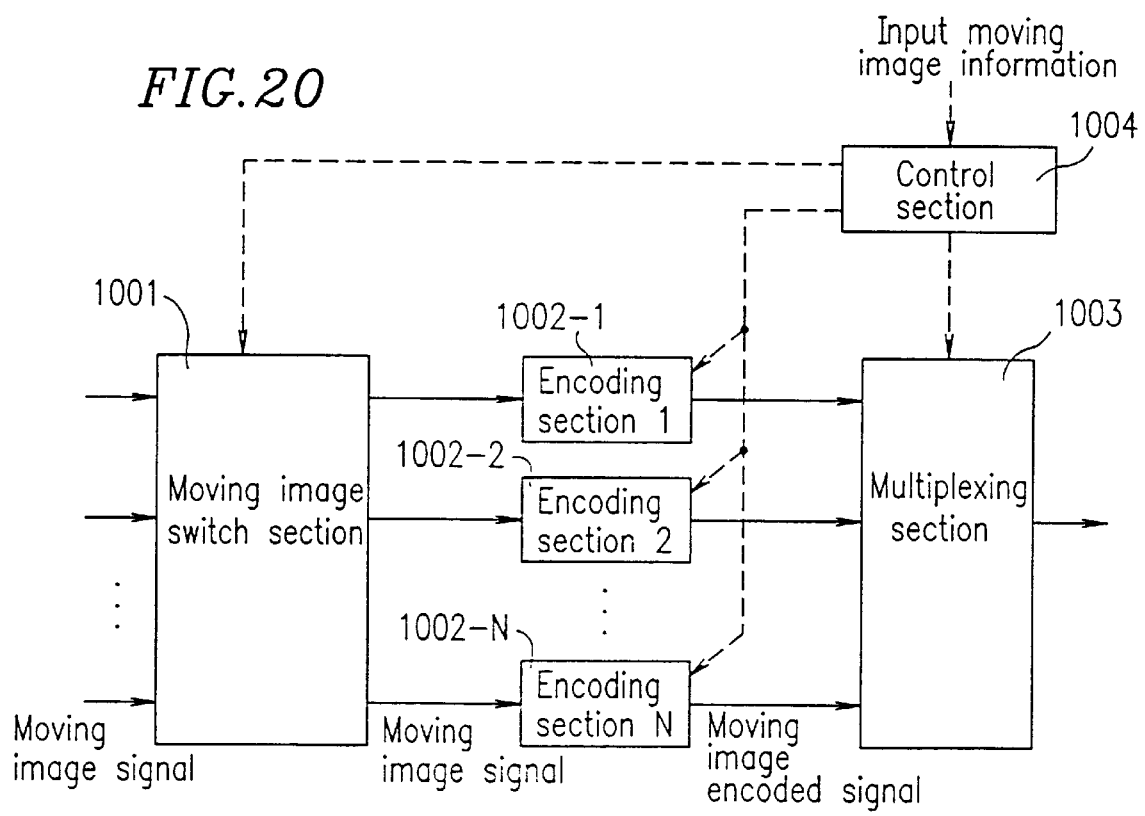
FIG. 20 is a block diagram of a moving image encoding and multiplexing device of Example 9 according to the present invention.

FIG. 20 is a block diagram of a moving image encoding and multiplexing device of Example 9 according to the present invention.

Referring to FIG. 20, the device includes: a moving image switch section 1001 for selecting one from a plurality of input moving image signals and switching the destination of the selected moving image signal; encoding sections 1002-1 to 1002-N (N is an integer equal to or more than 1) for encoding the input moving image signal; a multiplexing section 1003; and a control section 1004 for switching the switching state of the moving image switch section 1001, the encoding method of the encoding sections 1002-1 to 1002-N, and the multiplexing method of the multiplexing section 1003.

In the device with the above configuration, the moving image switch section 1001 receives moving image signals or partial moving image signals representing a plurality of segment screens obtained by dividing one screen of a high-precision moving image. The control section 1004 determines whether or not each of the moving image signals input into the moving image switch section 1001 should be output and, if output, to which encoding section the moving image signal should be output, and controls the moving image switch section 1001 based on the determination. When the partial moving image signals are input, all the partial moving image signals originating from the same moving image signal are selected and output. The control section 1004 determines which signal, the moving image signal or the partial moving image signal, is to be encoded for each of the encoding sections 1002-1 to 1002-N based on the switching control by the moving image switch section 1001. The encoding sections 1002-1 to 1002-N encode the input moving image signals or partial moving image signals and output resultant encoded signals to the multiplexing section 1003. The control section 1004 controls the multiplexing section 1003 based on the switching control by the moving image switch section 1001, to multiplex the input moving image signals. In the case of the screen division encoding, the multiplexing section 1003 multiplexes the partial moving image signals originating from the same moving image signal, then multiplexes the resultant multiplexed signals with other plurality of moving image signals, and outputs the resultant signals.

Figure 21:
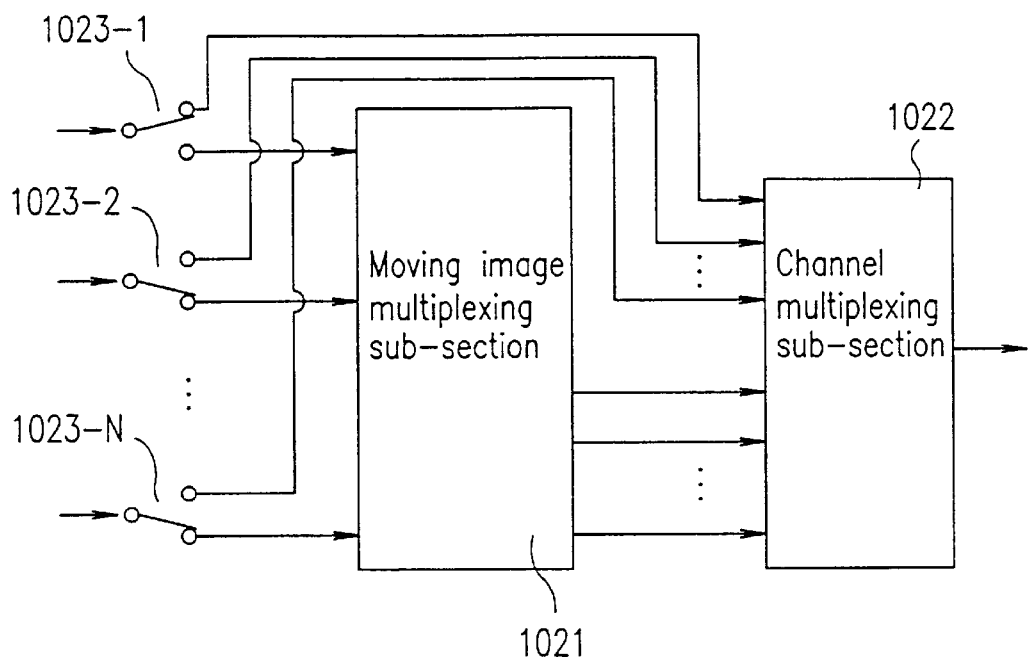
FIG. 21 is a block diagram of a multiplexing section of the device of FIG. 20.

FIG. 21 is a block diagram of the multiplexing section 1003 of the device of this example shown in FIG. 20.

Referring to FIG. 21, the multiplexing section 1003 includes: a moving image multiplexing sub-section 1021 for multiplexing partial moving image encoded signals obtained by encoding the partial moving image signals; a channel multiplexing sub-section 1022 for multiplexing a plurality of moving image encoded signals; and switches 1023-1 to 1023-N (N is an integer equal to or more than 1) for switching the destination of the moving image encoded signals input into the multiplexing section 1003.

The control section 1004 switches the switches 1023-1 to 1023-N based on the switching control by the moving image switch section 1001. That is, the switches 1023 which have received the partial moving image signal are switched to the moving image multiplexing sub-section 1021, while the other switches 1023 are switched to the channel multiplexing sub-section 1022. The moving image. multiplexing sub-section 1021 multiplexes the partial moving image encoded signals obtained by encoding the partial moving image signals originating from the same moving image signal, and outputs the results. The channel multiplexing sub-section 1022 multiplexes the moving image encoded signals output from the moving image multiplexing sub-section 1021 and from the switches 1023, and outputs the results.

Thus, in this example, a plurality of different moving image signals and a plurality of partial moving image signals generated by dividing one high-precision moving image signal are encoded simultaneously and multiplexed. In the device of this example, the encoding and multiplexing can be conducted even when all the input signals are individual moving image signals or they are partial moving image signals generated by screen division.

In this example, a plurality of moving image signals are individually divided and encoded, and the moving image multiplexing sub-section 1021 multiplexes the partial moving image encoded signals corresponding to one moving image signal for all the moving image signals. Alternatively, a plurality of moving image multiplexing sub-sections may be provided so that each moving image multiplexing sub-section multiplexes one set of partial moving image encoded signals.

EXAMPLE 10

Figure 22:
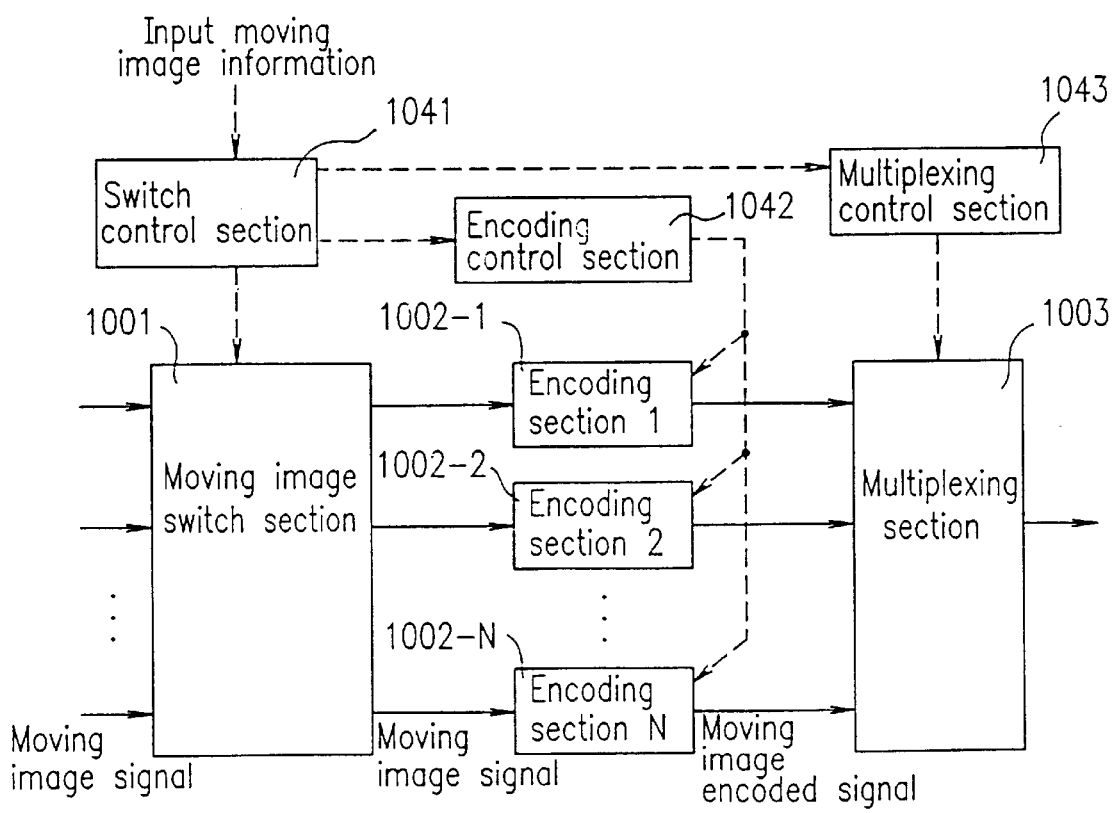
FIG. 22 is a block diagram of a moving image encoding and multiplexing device of Example 10 according to the present invention.

FIG. 22 is a block diagram of a moving image encoding and multiplexing device of Example 10 according to the present invention. In the device of Example 10, the control section 1004 in Example 9 shown in FIG. 20 is divided into a switch control section 1041, an encoding control section 1042, and a multiplexing control section 1043.

The switch control section 1041 determines whether or not each of the moving image signals input into the moving image switch section 1001 should be output and, if output, to which encoding section the moving image signal should be output, thereby to control the moving image switch section 1001. The switch control section 1041 simultaneously outputs a signal representing the switching state to the encoding control section 1042 and the multiplexing control section 1043.

The encoding control section 1042 determines which signal, the moving image signal or the partial moving image signal, is to be encoded for each of the encoding sections 1002-1 to 1002-N based on the signal supplied from the switch control section 1041, as in Example 9. The multiplexing control section 1043 controls the multiplexing section 1003 to multiplex the input moving image signals based on the signal supplied from the switch control section 1041, as in Example 9.

EXAMPLE 11

Figure 23:
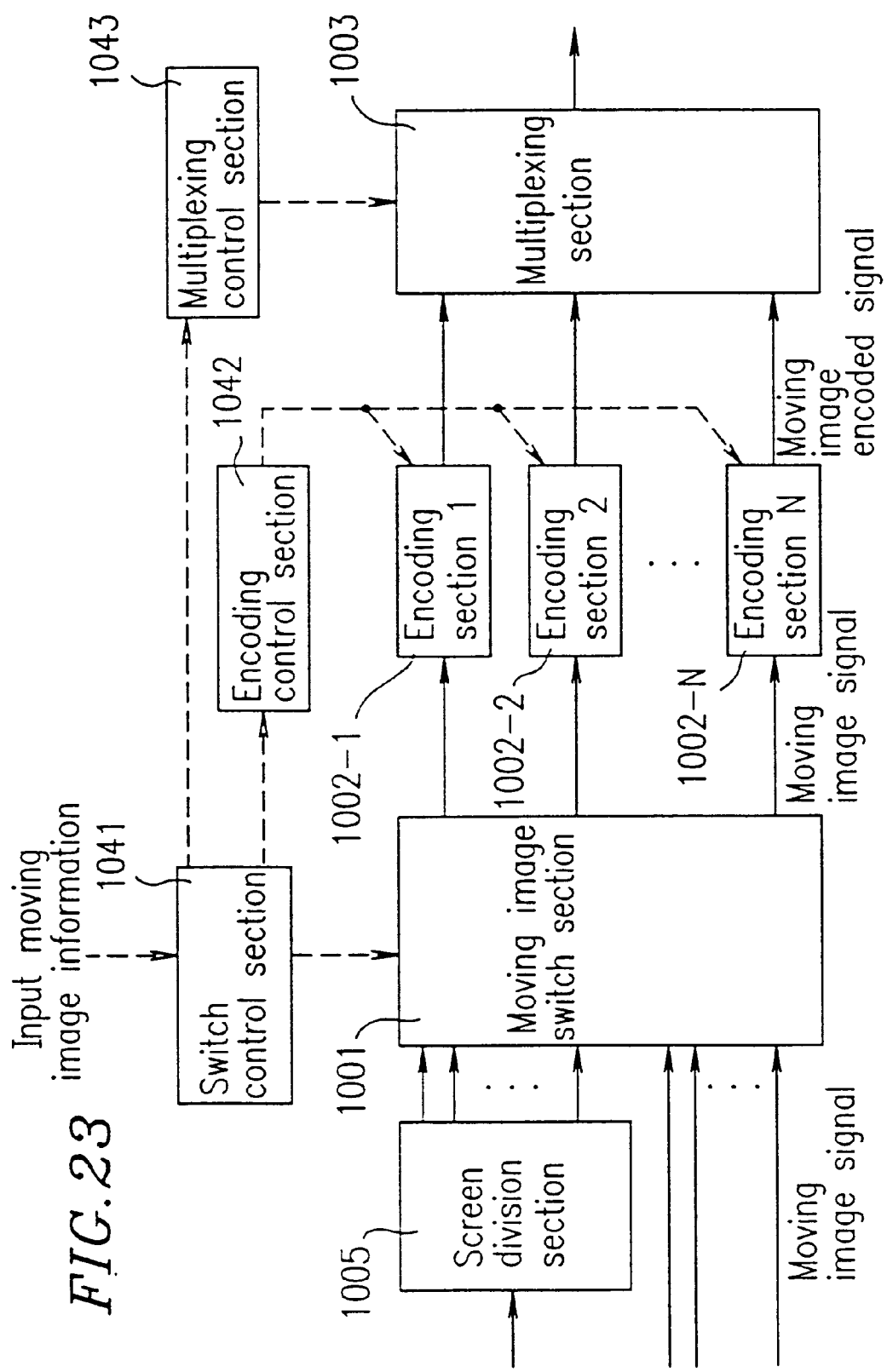
FIG. 23 is a block diagram of a moving image encoding and multiplexing device of Example 11 according to the present invention.

FIG. 23 is a block diagram of a moving image encoding and multiplexing device of Example 11 according to the present invention.

In the device of Example 11, a screen division section 1005 is provided upstream of the moving image switch section 1001 shown in FIG. 22. The screen division section 1005 divides an input moving image signal into a plurality of segment screens, to generate partial moving image signals corresponding to the segment screens, and outputs the partial moving image signals to the moving image switch section 1001. Thus, in this example, a high-precision moving image can be directly input into the moving image encoding and multiplexing device without any previous screen division processing.

Thus, in this example, a plurality of individual moving image signals and a plurality of partial moving image signals generated by dividing one high-precision moving image signal are encoded simultaneously and multiplexed. In the device of this example, the encoding and multiplexing can be conducted even when all the input signals are individual moving image signals or they are partial moving image signals generated by screen division.

In this example, one screen division section is provided. Alternatively, a plurality of screen division sections may be provided in parallel to receive a plurality of moving image signals for screen division simultaneously. Alternatively, instead of providing the screen division section which conducts the screen division for the input moving images, a moving image time division section which divides a moving image signal every several frames and outputs the results to the moving image switch section.

EXAMPLE 12

Figure 24:
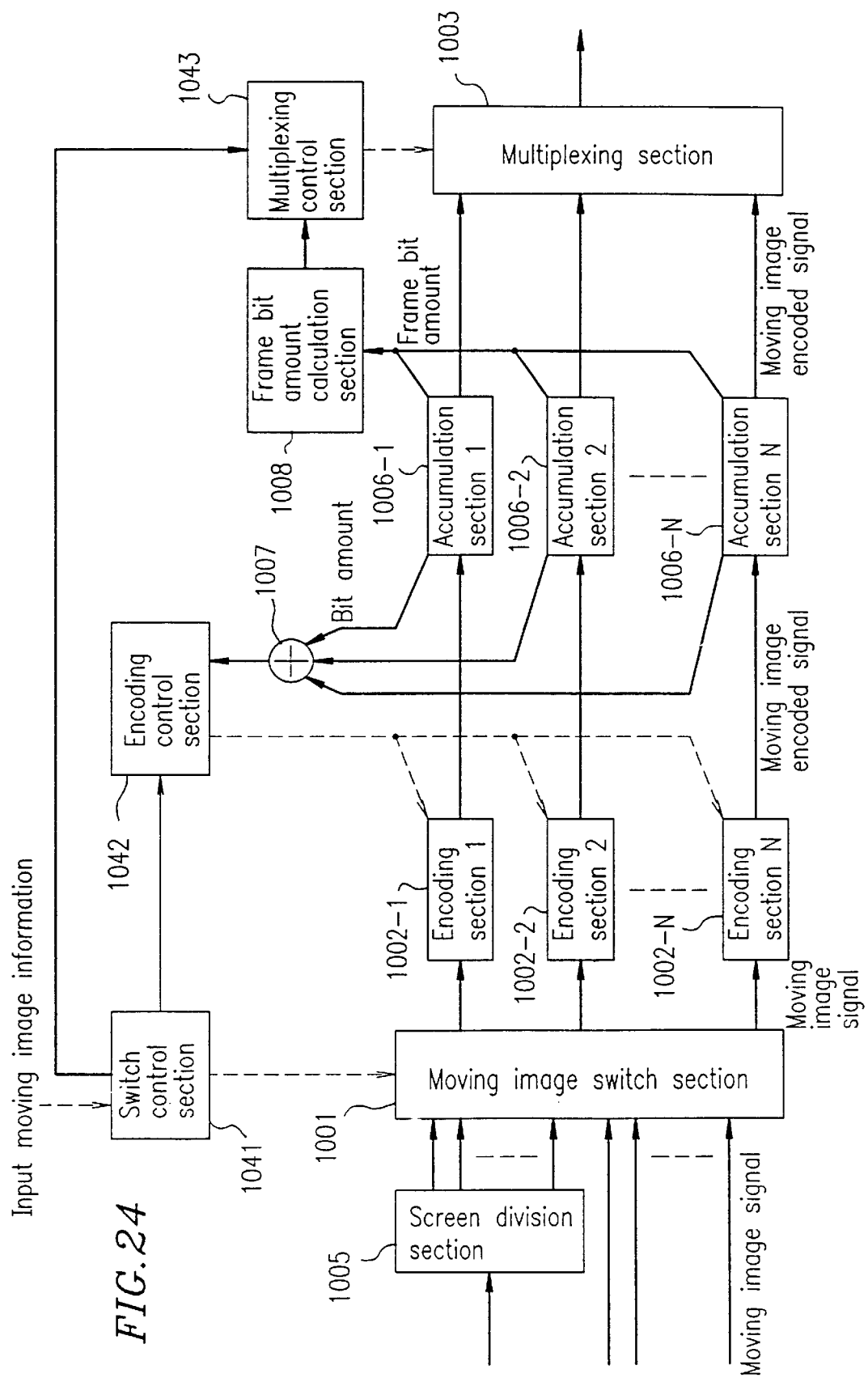
FIG. 24 is a block diagram of a moving image encoding and multiplexing device of Example 12 according to the present invention.

FIG. 24 is a block diagram of a moving image encoding and multiplexing device of Example 12 according to the present invention.

In the device of Example 12, a plurality of accumulation sections 1006-1 to 1006-N, an adder 1007, and a frame bit amount calculation section 1008 are additionally provided to the device of Example 11 shown in FIG. 23.

The accumulation sections 1006-1 to 1006-N accumulate the moving image encoded signals output from the encoding sections 1001-2 to 1002-N. The adder 1007 adds together the bit amounts of the moving image encoded signals accumulated in each of the accumulation sections 1006-1 to 1006-N. The frame bit amount calculation section 1008 calculates the bit amount of each frame of the moving image encoded signals accumulated in the accumulation sections 1006-1 to 1006-N.

In the device with the above configuration, the moving image encoded signals output from the encoding sections 1002-1 to 1002-N are temporarily accumulated in the accumulation sections 1006-1 to 1006-N. The bit amounts of the moving image encoded signals in each of the accumulation sections 1006-1 to 1006-N are added together up by the adder 1007, and the added bit amount is output to the encoding control section 1042. The encoding control section 1042 calculates the quantization width based on the bit amount received from the adder 1007.

In this example, the quantization width is set larger as the bit amount is larger, and smaller as the bit amount is smaller, in accordance with the constant output bit rate at the multiplexing section 1003. The encoding control section 1042 outputs one quantization width obtained in this way to each of the encoding sections 1002-1 to 1002-N. The encoding sections 1002-1 to 1002-N encode the received moving image signals based on the quantization width.

Thus, in this example, the input signals can be encoded in accordance with the output bit rate at the multiplexing section 1003 though the output bit rate is constant. Moreover, since the same quantization width is used for the compression/encoding of input moving images with different precisions, the quality of the plurality of output moving images can be always made uniform. Furthermore, since the quantization control is conducted based on the sum of the bit amounts of the moving image encoded signals accumulated in each of the accumulation sections 1006-1 to 1006-N, the output bit rate can be effectively used.

In this example, the quantization width is set for the encoding sections 1002-1 to 1002-N. Alternatively, other values such as the bit rate may be set.

Thus, in this example, a plurality of partial moving image signals generated by dividing one moving image by screen division can be encoded simultaneously and multiplexed.

In Examples 9 to 12, one moving image switch section is provided upstream of the encoding sections. Alternatively, two or more moving image switch sections may be provided in parallel. Also, in these examples, only moving image signals are encoded and multiplexed. Alternatively, the device may be configured so that other signals such as sound signals are also multiplexed.

EXAMPLE 13

An image transmission device of Example 13 according to the present invention will be described with reference to FIGS. 25 to 27.

Figure 25:
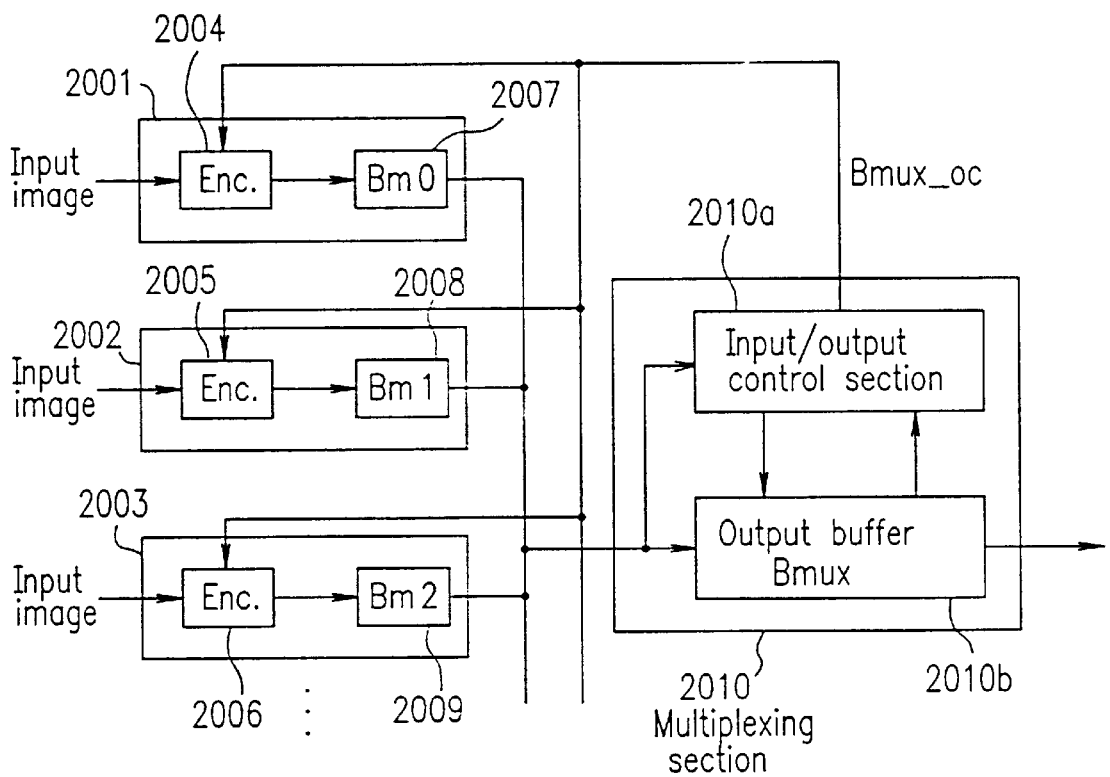
FIG. 25 is a block diagram of an image transmission device of Example 13 according to the present invention.

FIG. 25 is a block diagram of an image transmission device of Example 13. Referring to FIG. 25, the image transmission device includes image encoding sections 2001, 2002, 2003, . . . and a multiplexing section 2010. The image encoding sections 2001, 2002, 2003, . . . include encoding sub-sections 2004, 2005, 2006, . . . and intermediate buffers 2007, 2008, 2009, . . . respectively. The multiplexing section 2010 includes an input/output control sub-section 2010a and an output buffer 2010b.

The operation of the device with the above configuration will be described.

The image encoding sections 2001, 2002, 2003, . . . compress/encode respective input image signals. The encoding sub-sections 2004, 2005, 2006, . . . of the image encoding sections 2001, 2002, 2003, . . . employ MPEG2encoding, i.e., encode the input image signals into image signals conforming to the ISO/IEC 13818-2 (generally called MPEG2 video) MP@ML, and, every predetermined constant multiplexing period, output an amount of encoded data which is desired to be multiplexed in the next multiplexing period to the respective intermediate buffers 2007, 2008, 2009, . . . The multiplexing section 2010 receives and takes all the encoded data accumulated in the intermediate buffers 2007, 2008, 2009, . . . of the image encoding section 2001, 2002, 2003, . . . in the output buffer 2010b every multiplexing period based on the control of the input/output control sub-section 2010a. Then, in accordance with the order of the taking-in of the encoded data, the encoded data is sequentially output to a transmission route at a transmission rate of the transmission route. The order of the taking-in of the encoded data from the intermediate buffers of the image encoding sections is not limited as far as the encoded data can be taken in the output buffer within the taking-in period. Thereafter, the multiplexing section 2010 determines a buffer occupation Bmux_oc of the encoded data in the output buffer 2010b at the completion of the taking-in, and outputs the results to the image encoding sections 2001, 2002, 2003, . . . By calculating Bmux_oc/R wherein R denotes the transmission rate at the transmission route, the encoding sub-sections 2004, 2005, 2006, . . . can relatively estimate the transmission delay time of each encoded data when the encoded data is output from the multiplexing section 2010. The image encoding sections 2001, 2002, 2003, . . . encode the input images using the estimated value.

The image encoding sections 2001, 2002, 2003, . . . compress/encode the input image signals into MPEG2 video data. In the MPEG2 encoding, inter-frame prediction encoding is conducted for the image signals, and a prediction error component generated by the prediction encoding is encoded by DCT. The bit amount of the encoded data is determined by increasing or decreasing the quantization width used at the quantization of a DCT coefficient. When the quantization width is small, the generated bit amount is large, but the image is compressed and encoded to obtain an image closer to the original image. On the contrary, when the quantization width is large, the generated bit amount is small, but the resultant image is degraded due to a distortion caused by a quantization error. Accordingly, in order to encode the image signals so as to obtain an image with a uniform quality closer to the original image, the quantization width needs to be controlled so as to be as small as possible, as constant as possible, and have a variation as small as possible. In this example, the image quality and the generated bit amount is controlled based on the quantization width. The operation of the encoding sections other than the control with the quantization width is based on known techniques (see "Latest MPEG Textbook", Ascii Publishing, 1995, pp. 103–105, for example). Hereinbelow, therefore, the control of the quantization width will be described in detail.

Figure 26:
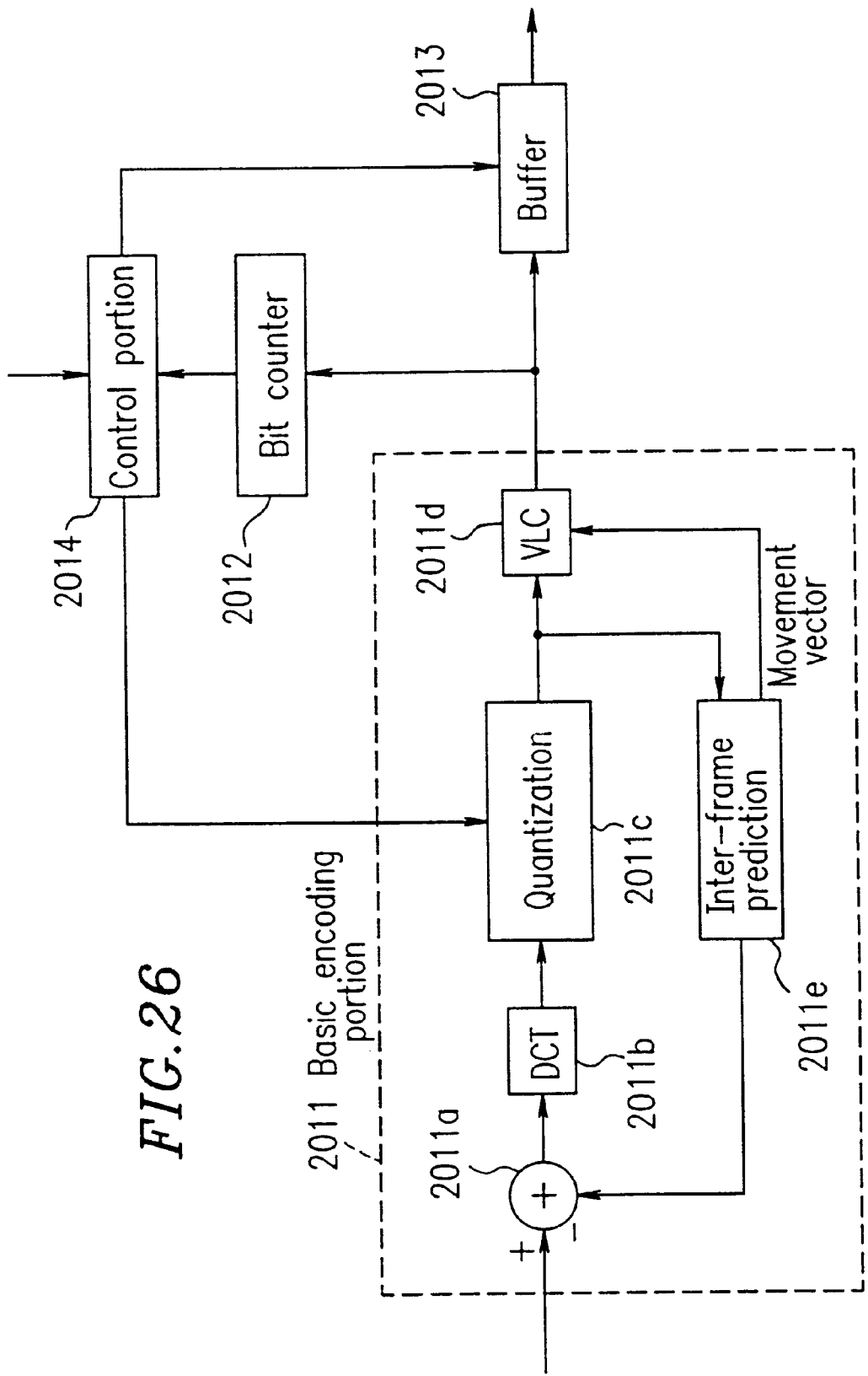
FIG. 26 is a block diagram of an encoding sub-section of an image encoding section of the device of FIG. 25.

FIG. 26 shows a configuration of the encoding sub-section of the image encoding section. Referring to FIG. 26, the encoding sub-section includes a basic encoding portion 2011, a bit counter 2012, a buffer 2013 for temporarily storing encoded data, and a control portion 2014. The basic encoding portion 2011 includes a difference processor 2011a, a DCT processor 2011b, a quantization processor 2011c, a variable length encoder 2011d, and an inter-frame predictor 2011e.

The basic encoding portion 2011 encodes an image signal into the MPEG2 video format. More specifically, the inter-frame predictor 2011e determines a prediction value, the difference processor 2011a calculates a prediction error of the prediction value, the DCT processor 2011b processes the prediction error by DCT, the quantization processor 2011c quantizes the DCT-processed value, and the variable length encoder 2011d encodes the quantized value. The quantization processor 2011c receives a quantization width from the control portion 2014. The input image signal is quantized and encoded in accordance with the quantization width. The resultant encoded data is transmitted to the buffer 2013. The bit counter 2012 counts the bit amount of the encoded data, and the generated bit amount is sent to the control portion 2014 every multiplexing period. The control portion 2014 determines the quantization width based on the buffer occupation Bmux_oc in the output buffer 2010b sent from the multiplexing section 2010 and the generated bit amount sent from the bit counter 2012, and supplies the quantization width to the basic encoding portion 2011. The control portion 2014 also calculates the bit amount to be sent to the corresponding intermediate buffer of the image encoding section, and supplies the bit amount to the buffer 2013. The buffer 2013 outputs the encoded data sent from the basic encoding portion 2011 to the corresponding intermediate buffer in accordance with the bit amount specified by the control portion 2014.

Figure 27:
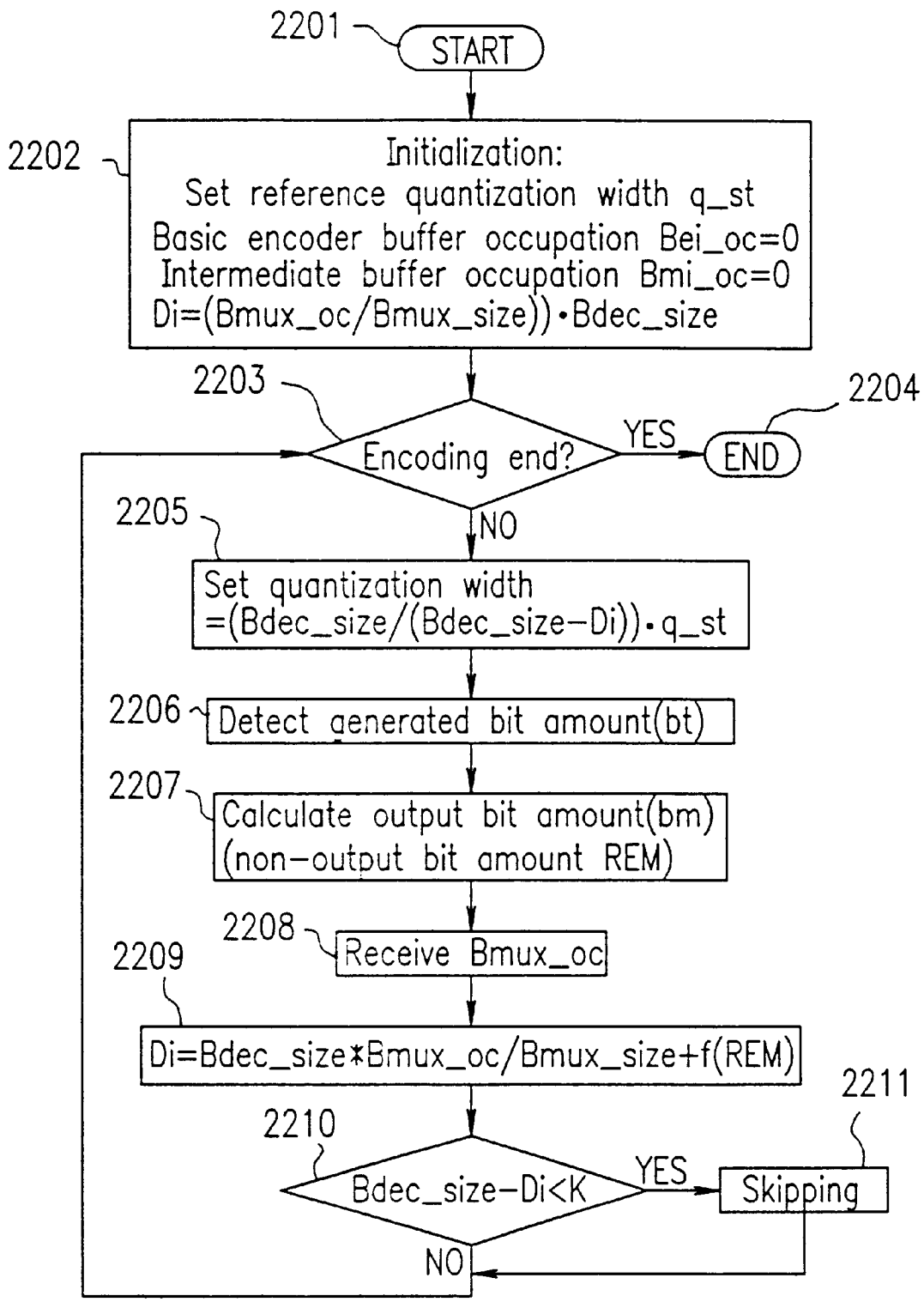
FIG. 27 is a flowchart showing the operation of the encoding sub-section of FIG. 26.

FIG. 27 is a flowchart showing the calculation of the quantization width by the control portion 2014 of the encoding sub-section. Referring to FIG. 27, the process is started at step 2201. A reference quantization width q_st, an encoding sub-section buffer occupation Bei_oc, an intermediate buffer occupation Bmi_oc, and a parameter Di are initialized at step 2202. Whether or not the encoding is completed is examined at step 2203. If yes, the process is terminated at step 2204. If no, the quantization width is calculated at step 2205. The generated bit amount is detected at step 2206. The bit amount to be output is calculated at step 2207. The output buffer occupation Bmux_oc is received at step 2208, and the parameter Di is calculated at step 2209. Then, the processing for preventing the underflow in the output buffer (step 2210) and the encoding skipping (step 2211) are conducted.

The above operation is conducted for all the encoding sub-sections shown in FIG. 25. Hereinbelow, the operation of the i-th encoding sub-section as an example will be described in detail.

After the initialization (step 2202), the control portion 2104 calculates the quantization width every multiplexing period by setting the buffer size of a presumed decoding device on the receiver side which is to reproduce data encoded by the i-th encoding sub-section as Bdec_size by formula (8) below (step 2205) until the encoding is completed (step 2203).

$$qi = (Bdec\_size/(Bdec\_size-Di)) \cdot q\_st \quad (8)$$

wherein q_st denotes the reference quantization width which is preset at the initialization so that a desired image quality can be obtained. Di denotes the variable which varies every multiplexing period. The calculation of this variable will be described. The encoding sub-section outputs encoded data to the intermediate buffer in the image encoding section every multiplexing period. More specifically, the control portion 2014 detects the bit amount generated during the multiplexing period from the bit counter 2012. When the sum of the generated bit amount and a non-output remaining bit amount REMi is smaller than the size of the intermediate buffer, the control portion 2014 sends to the buffer 2013 an instruction output amount Bmi which indicates that all the encoded data (i.e., the sum of REMi and the generated bit amount) should be output to the intermediate buffer within the range not exceeding an upper limit specified in a standard (e.g., 15 Mbps under MP@ML). When the sum is larger than the size of the intermediate buffer, the control portion 2014 sends to the buffer 2013 an instruction output amount Bmi which indicates that an amount equal to the capacity of the intermediate buffer should be output while holding the remainder in the buffer 2013 as non-output remaining data (steps 2206 and 2207).

Then, when the amount of the encoded data which has been encoded by the encoding sub-section but has not been reproduced is larger than the buffer size Bdec_size of the decoding device after the encoded data has been multiplexed at a multiplexing period capable of calculating from the output buffer occupation Bmux_oc and arrived at the receiver side, the instruction output amount Bmi is determined so that the value obtained by subtracting the buffer size Bdec_size from the non-reproduced encoded data amount is equal to the remaining non-output data bit amount REMi. In other words, the buffer of the decoding device is prevented from overflowing by keeping the amount of data which arrives at the receiver side equal to the buffer size Bdec_size. More specifically, the upper limit of the encoded data amount is set at a value obtained by subtracting the buffer occupation from the buffer size of the decoding device. The non-reproduced encoded data amount mentioned above is determined as follows, for example. In the case where the reproduction time is specified to the decoding device by a time stamp added to the encoded data so that the encoded data is reproduced by the decoding device at a delay time of 0 when the buffer occupation Bmux_oc in the output buffer 2010b becomes equal to the buffer size Bmux_size, bit amounts bT generated in the respective encoding sub-sections during the time (Bmux_size-Bmux_oc)/R are calculated and summed up.) Then, the bit amount of the non-output data is calculated by formula (9) below:

$$REMi = REMi + bT - Bmi \quad (9)$$

wherein bT is the bit amount generated during one multiplexing period.

Thereafter, the control portion 2104 receives the current data occupation Bmux_oc of the output buffer 2010b of the multiplexing section 2010, and calculates the parameter Di by formula (10) below under the premise of formula (11) below (steps 2208 and 2209).

$$Di = Bdec\_size \cdot Bmux\_oc/Bmux\_size + f(REMi) \quad (10)$$

$$f(REMi) = REMi \quad (11)$$

The quantization width is calculated from the thus-obtained parameter Di by formula (8).

In order to prevent the value obtained by subtracting the parameter Di from the decoder buffer size (Bdec_size-Di) from becoming 0, the control portion 2014 instructs the basic encoding portion 2011 to conduct skipping when (Bdec_size-Di) is equal to or less than a threshold K. The basic encoding portion 2011 then skips the encoding of the image signal (steps 2210 and 2211).

The multiplexing section 2010 takes in the encoded data stored in the intermediate buffer of each of the image encoding sections every multiplexing period, multiplexes the encoded data into a packet in accordance with the ISO/IEC 13818-1 (normally called the MPEG2 TS stream), and outputs the packet to the transmission route. At this time, the reproduction time indicated by the time stamp for specifying the reproduction timing of each image to the encoding device is determined based on the buffer occupation Bmux_oc of the output buffer 2010b. That is, the reproduction of the encoded data should be started at a delay time of 0 when the output buffer 2010b has become full. Using this timing as the reference, the reproduction time is determined and the time stamp indicating this reproduction time is added to each packet to be transmitted.

With the above configuration, the initial transmission start time at the multiplexing section 2010, the output buffer size Bmux_size of the multiplexing section 2010, and the like should actually be changed depending on the number of image encoding sections N connected with the multiplexing section 2010, the transmission rate, and the like. In this example, however, when Bmux_size=N×Bdec_size is set, it is assumed that the encoded data immediately after encoding is multiplexed and arrives at the decoding device when the output buffer occupation Bmux_oc is 0 and that this encoded data is reproduced after X pictures (i.e., there is a possibility that data corresponding to X pictures at maximum is accumulated in the decoding device). Using the case of the output buffer occupation Bmux_oc being 0 as the reference, the relative delay time of the encoded data which is multiplexed when the output buffer occupation Bmux_oc is an arbitrary value is calculated as Bmux_oc/R. Accordingly, the data amount of pictures held in the decoding device when the data arrives at the decoding device is $x \cdot (Bmux_{size}-Bmux\_oc(t))/Bmux\_size$ (when the non-output data amount is 0). In such a case, the encoded data is received by the receiver side without underflowing.

More specifically, first, when REMi=0, formula (12) below is obtained from formulae (8) and (9).

$$qi=(Bmux\_size/(Bmux\_size-Bmux\_oc)) \cdot q\_st \qquad (12)$$

As is apparent from formula (12), the quantization width is larger as the output buffer occupation Bmux_oc is closer to the output buffer size Bmux_size. Thus, the generated bit amount is suppressed to prevent underflow from occurring. Even if an extremely complicated image is input, Bmux_oc is always controlled to be smaller than Bmux_size by the skipping at step 2211 in FIG. 27. This also prevents underflow from occurring.

When REMi≠0, formula (13) below is obtained.

$$qi=q\_st/(1-(Bmux\_oc/Bmux\_size)-REMi/Bdec\_size) \qquad (13)$$

As is apparent from formula (13), the image encoding section is controlled so that REMi is smaller than Bdec_size×(Bmux_size−Bmux_oc)/Bmux_size. Even if an extremely complicated image is input, the image encoding section is controlled so that REMi is smaller than Bdec_size×(Bmux_size−Bmux_oc)/Bmux_size by reducing the generated bit amount by the skipping at step 2211 in FIG. 27. Even if all the other image encoding sections request to multiplex their encoded data of the maximum bit amount, the encoded data can be at least multiplexed at an average rate obtained by dividing the transmission rate by the number of image encoding sections. Since Bdec_size× (Bmux_size−Bmux_oc)/Bmux_size corresponds to the bit amount of the encoded data which can be transmitted at the average rate within the time (Bmux_size−Bmux_oc)/R, no underflow occurs on the receiver side.

Since the encoded data exceeding the buffer capacity of the decoding device is left as non-output data, no overflow occurs and thus all the encoded data which have been encoded by the image encoding sections are remained reproducible.

With the above configuration, the image encoding sections determine the quantization width in accordance with the same reference. Accordingly, when no non-output data is left, the quantization widths used in all the image encoding sections are the same irrespective of the input images, and thus the input images can be encoded so as to render substantially the same image quality. Even when a scene change is included in a series of input images, since the quantization width is controlled in accordance with the generated bit amount in all the image encoding sections, bits are allocated depending on the increase in the complexity without extremely degrading the image quality at the point of the scene change, while the influence of the bit increase and the change in the image quality are kept small. Each of the image encoding sections controls the generated bit amount and the bit amount of the encoded data to be multiplexed so that the encoded data does not overflow or underflow on the receiver side. Accordingly, the multiplexing section 2010 only serves to multiplex the received encoded data regularly, not being required to process information on the entire images as conventionally required. Thus, since the processings are dispersed, the device can be easily configured.

In this example, the quantization width is calculated by formula (8). Another formula may be used as far as Bdec_size−Di>0 is maintained.

Another function may be used for f(REMi)=REMi of formula (11). Alternatively, the decision characteristics for determining the quantization width for a specific image encoding section and f(REMi) may be changed intentionally so as to keep high the image quality of a specific image signal. For example, when the capacity of the intermediate buffer of the j-th encoding section is made M times as large as that of the other intermediate buffers, f(REMi) may be made REMi/M. By doing this, the amount of the non-output encoded data can be increased to an amount closer to M times of REMi which is allowable in this example. Normally, when an image more complicated than the average of all images is being input, the size of data corresponding to x·(Bmux_size−Bmux_oc(t))/Bmux_size pictures which have been encoded when the encoded data multiplexed at the time of Bmux_oc arrives at the decoding device is limited to Bdec_size+REMi. Thus, having more non-output data makes it possible to allocate relatively more bits for a complicated image of which encoding is difficult.

In this example, as the multiplexing period is shorter, the control is more precise. However, several macro-blocks or several slices (several lines of image signals) of MPEG2 data are appropriate for the multiplexing period. A long period of one picture and the like may also be used.

In this example, the encoding method and the data transmission method are the same for all the image encoding sections. Alternatively, a specific basic encoding portion may be processed under an image quality control different from the standard one. For example, any value may be used as the decision function for the quantization width in Formula (8) as far as the function increases the quantization width with the increase in Di. The image quality may be made uniform by reducing the change rate of the quantization width. Alternatively, while almost all the image encoding sections are operated as described above, in a specific image encoding section, the quantization width may be fixed to make the image quality uniform, or the data may be encoded at a fixed rate in the image encoding section to generate bits. In such a case, the generated bit amount tends to decrease with the increase in Di as a whole. Thus, the entire bit rate can be within the bit rate at the transmission route.

EXAMPLE 14

An image transmission device of Example 14 according to the present invention will be described with reference to FIGS. 28 to 34.

Figure 28:
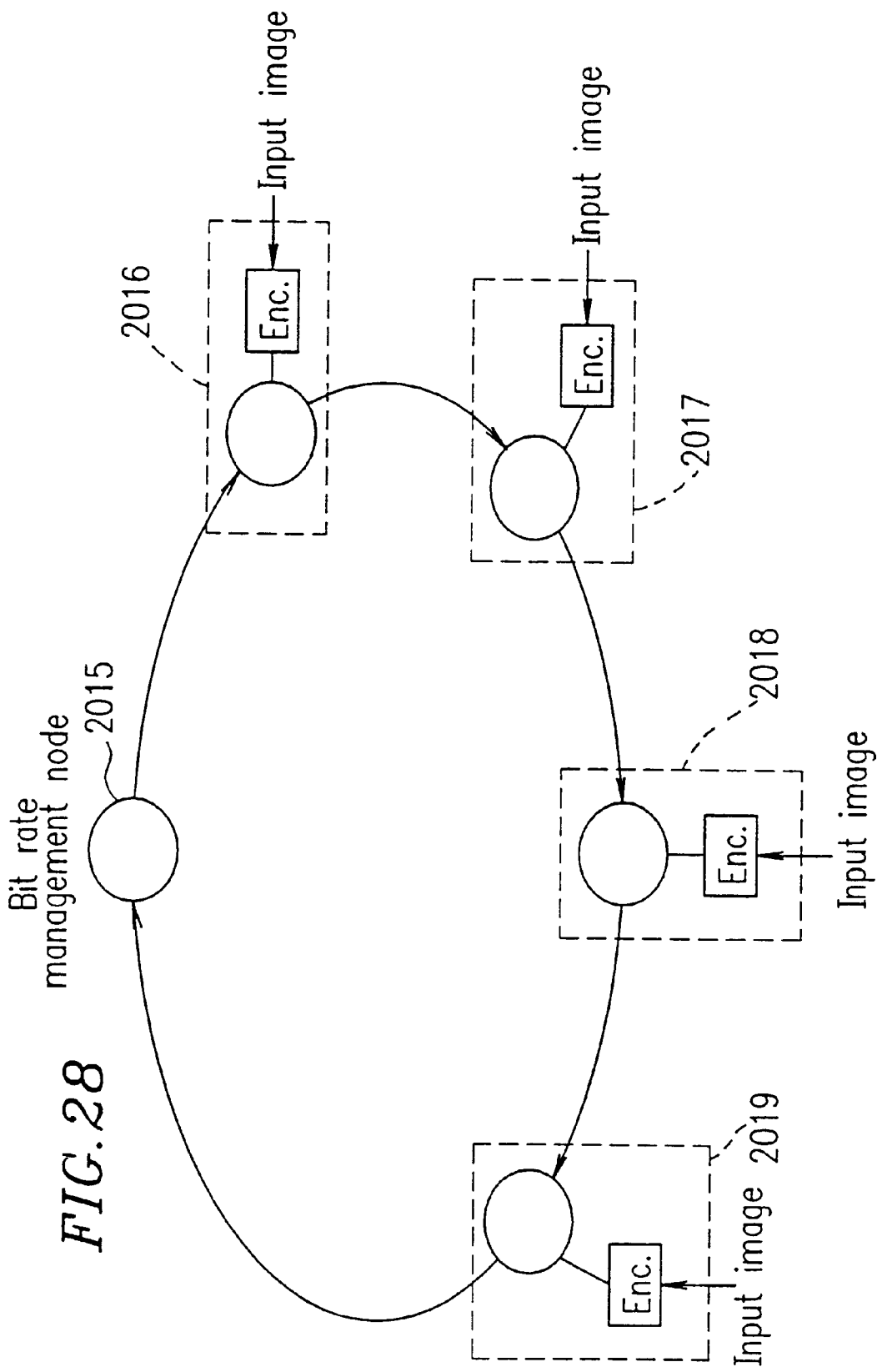
FIG. 28 is a schematic block diagram of an image transmission device of Example 14 according to the present invention.

FIG. 28 schematically shows the image transmission device of Example 14. Referring to FIG. 28, the image transmission device includes a bit rate management node 2015 for controlling the bit rate on a LAN (local area network), and nodes 2016 to 2019 connected to the LAN which have image encoding sections. Each of the nodes 2016 to 2019 includes an image reproduction section as well as the image encoding section. The image encoding section encodes images in consideration of the buffer size Bdec_size and the buffer occupation of a decoding device of the image reproduction section of a destination node.

With the above configuration, one of the image encoding sections which are disposed in the nodes connected with one another via the LAN transmits encoded data to another image encoding section on the LAN as a packet. The packet is composed of header information required for the transmission and the encoded data.

FIG. 29 shows a header format. The header information includes information required for correct transmission of the encoded data, i.e., presumably known information required on the LAN. In this example, the description on such information is omitted, and only a sender address, a receiver address, an image packet flag, and a transmission period number are described. In the network, a one-way transmission route extends between every adjacent nodes, forming a ring. The bit rate management node 2015 controls the generation of packets. That is, the bit rate management node 2015 secures the bit rate in response to the requests from the nodes and generates the packets for transmission.

Figure 30:
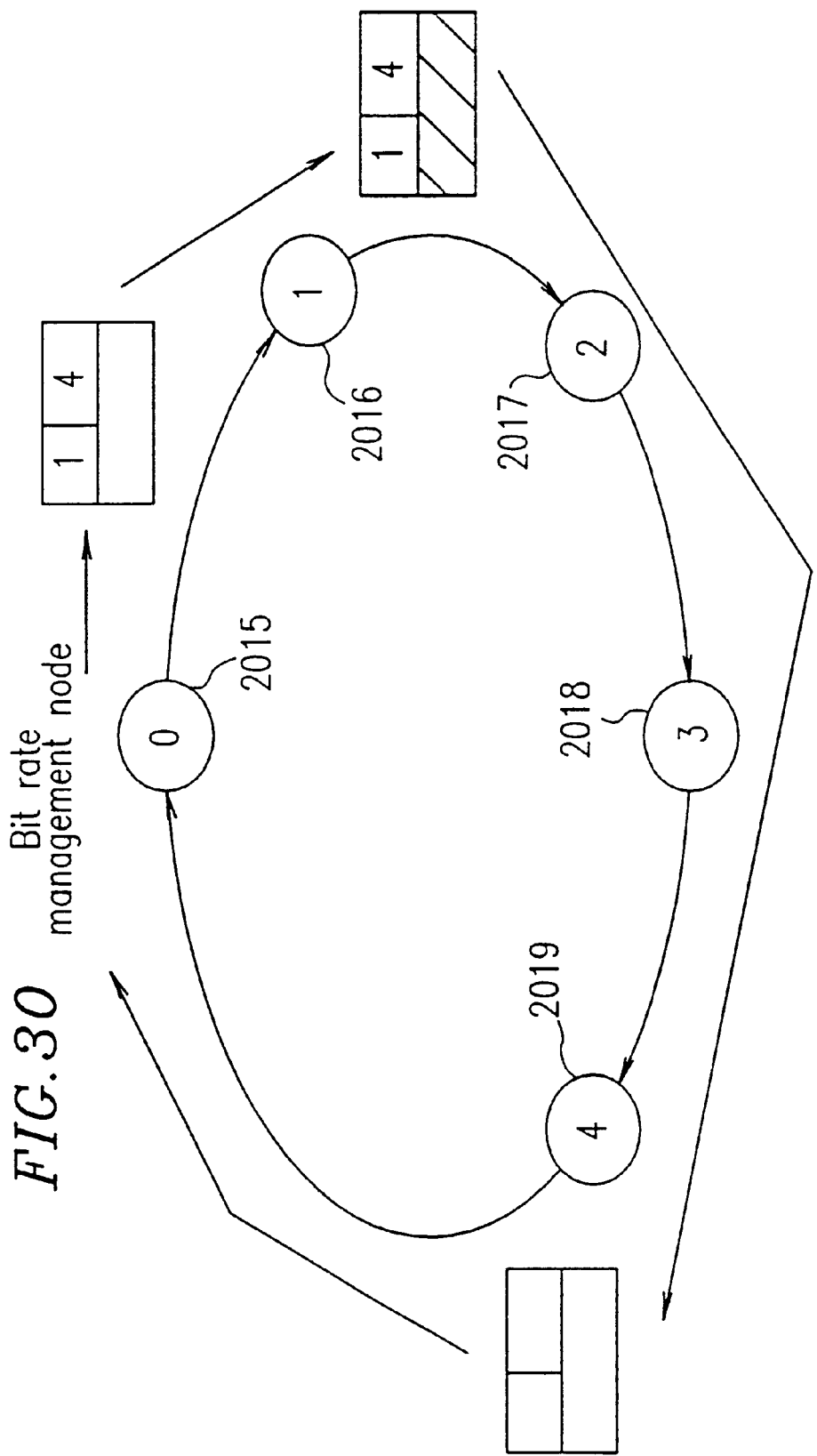
FIG. 30 is a view for illustrating a communication method between nodes of the device of FIG. 28.

FIG. 30 is a view for describing the communication method between the nodes. In the communication between the nodes 2016 and 2019, for example, the bit rate management node 2015 generates a packet having the sender address of 1 and the receiver address of 4, and outputs the packet onto the network at a vacant packet timing. Each node passes a packet which is not related to itself to the adjacent node as it is. On receipt of the packet having the sender address of 1, the node 2016 puts the encoded data which the node 2016 desires to transmit in the packet and transmits the packet to the next node 2017. The nodes 2017 and 2018 pass this packet to the next node as it is. The node 2019 detects its own address, i.e., address 4, as the receiver address in the packet, receives the encoded data in the packet, and then release the packet.

Hereinbelow, the transmission of encoded data representing images will be described with reference to FIGS. 31 to 36.

The bit rate management node 2015 secures the entire bit rate for the encoded data to be transmitted in the network. For example, assume that the number of nodes which transmit encoded data in the network is four and the average bit rate for each node is about 3 Mbps. In such a case, the bit rate management node 2015 secures a 12 Mbps bit rate and outputs packets for image transmission corresponding to 12 Mbps. Each of the respective packets for image transmission is provided with a multiplexing period number which is renewed every multiplexing period. Each node identifies the multiplexing period number of each received packet and outputs the packet during the multiplexing period indicated by the multiplexing period number. Prior to the output of the packet, each node notifies of the number of packets to be output during each multiplexing period.

Figure 31:
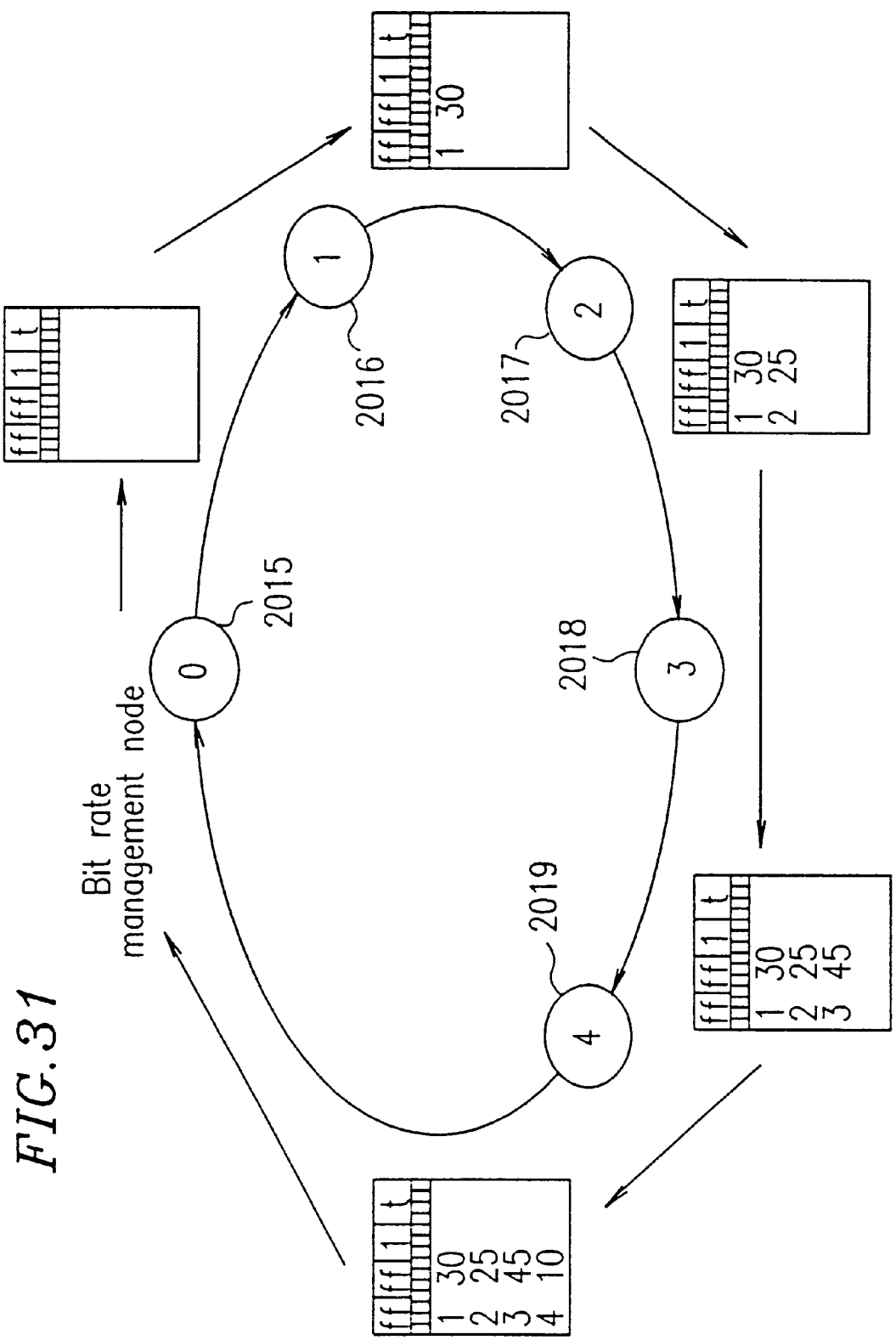
FIG. 31 is a view for illustrating the transmission of a packet for notifying the number of packets used in the device of FIG. 28.

FIG. 31 is an example of the transmission of the packet for notification of the number of packets. In this packet, both the sender and receiver addresses are ff and the image packet flag is 1 so that each node identifies that this is the packet for notification of the number of packets. On receipt of such a packet, each node enters the number of packets to be transmitted by the node during the multiplexing period corresponding to the indicated multiplexing period number. The bit rate management node 2015 reads the packet for notification of the number of packets which has been circulated through the network, and outputs the packets for image transmission having the same multiplexing period number by the number equal to the total number of packets notified.

Figure 32:
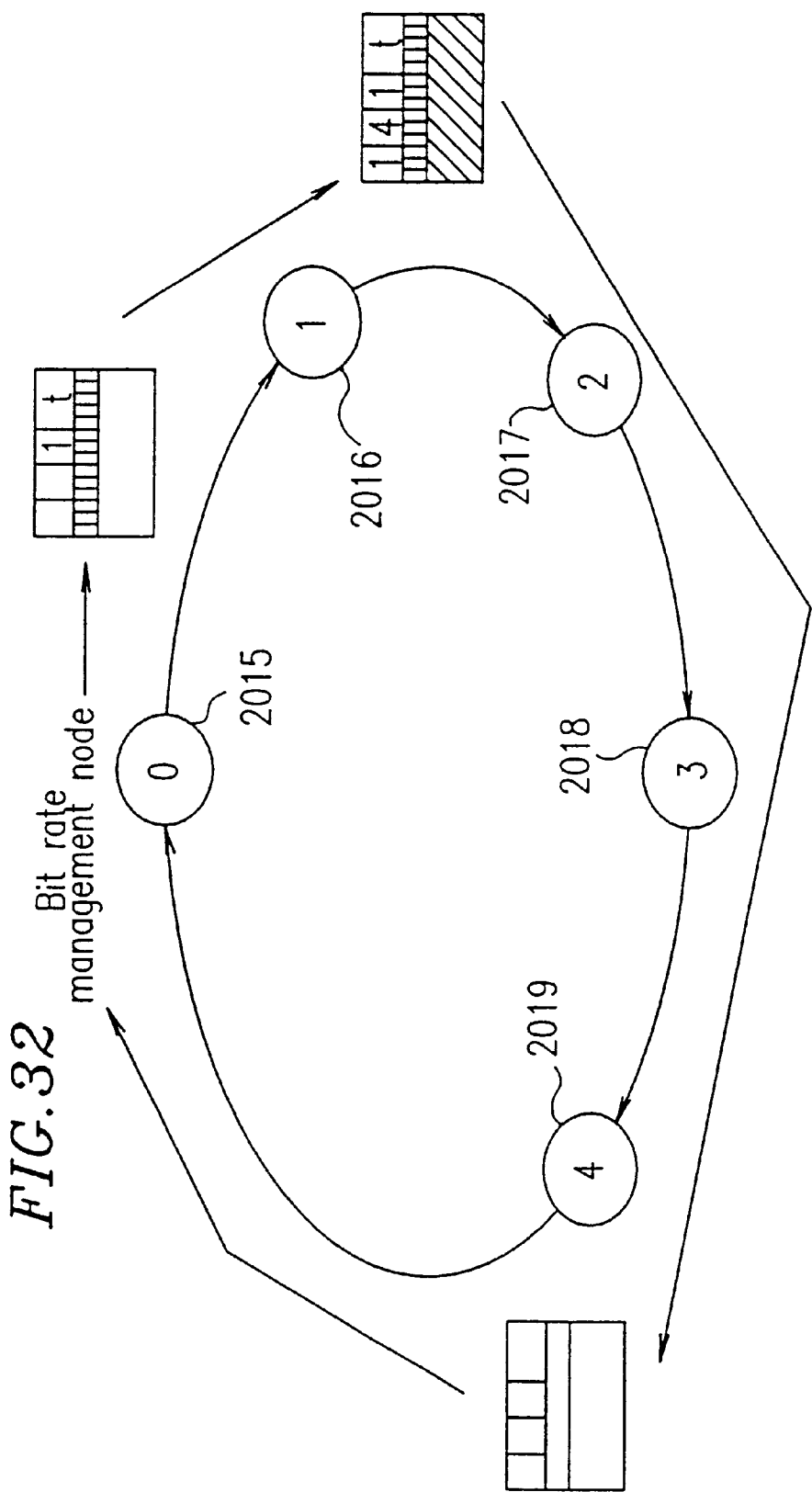
FIG. 32 is a view for illustrating the transmission of a packet for image transmission used in the device of FIG. 28.

FIG. 32 is an example of the transmission of encoded data using the packet for image transmission. The bit rate management code 2015 generates a packet for image transmission having the image packet flag of 1 and a certain multiplexing period number, and outputs the packet on the network. This packet is available for any node which has notified of image transmission. Therefore, any node which desires to transmit its encoded data during the indicated multiplexing period writes its own address and the receiver address on the header of the packet, puts the encoded data in the packet, and transmits the packet to the destination node. In the example shown in FIG. 32, the transmission from the node 2016 to the node 2019 is shown. The node 2019 receives this packet, resets the data in the packet, and outputs the packet on the network. After the node 2016 located closest to the bit rate management node 2015 has transmitted all the packets which the node 2016 intended to transmit during the indicated multiplexing period, the node 2016 passes subsequent packets having the same multiplexing period number to the next node as it is. The node 2017 located second closest to the bit rate management node 2015 puts its encoded data to be transmitted during the indicated multiplexing period in the packet and transmits the packet, as described above for the node 2015.

In this way, each of the respective nodes receives the number of packets equal to the number of packets notified by the node, put its encoded data to be transmitted during the indicated multiplexing period in the packets, and outputs the packets on the network in such a manner that the nodes closer to the bit rate management node 2015 conduct this operation earlier. Since the bit rate management node 2015 generates the number of packets having the same multiplexing period equal to the total number of packets notified by the nodes, the packets are neither short nor excessive. Thereafter, packets for the next multiplexing period are generated in accordance with the notifications by the nodes.

The multiplexing period used in this example corresponds to the multiplexing period described in Example 11, and is actually determined by calculating the delay time taken until the bit rate management node 2015 generates packets having the multiplexing period number based on the total number of packets notified.

For example, assuming that the multiplexing period is T and the delay data amount after T×k is DD(kT), the delay data amount after T×(k+1), i.e., DD((k+1)T), is calculated by formula (14) below.

$$DD((k+t)T)=DD(kT)+Pn \cdot P\_DATA-RT \qquad (14)$$

wherein Pn denotes the total number of packets which had been notified at that time, P_DATA denotes the data amount per packet, and R is the bit rate for image transmission secured by the bit rate management node 2015.

Then, the virtual output buffer size of all the encoding sections (hereinbelow, referred to as the multiplex virtual buffer size), Bmux_size, is calculated based on formula (15) below, and the relative delay parameter delay_mux is calculated based on formula (16) below. The resultant multiplex virtual buffer size and the relative delay parameter are put in the packet for image transmission in accordance with the format shown in FIG. 29.

$$Bmux\_size=N \times Bdec\_size \qquad (15)$$

$$delay\_mux=Bmux\_size-(delay\_init \times R)+DD \qquad (16)$$

wherein delay_init denotes the delay time from the arrival of the data transmitted when the delay data amount DD is 0 until the reproduction of the data, which is shared by the nodes in the network. The calculated values are put in the header of the packet generated immediately after the calculation, and transmitted.

Figure 33:
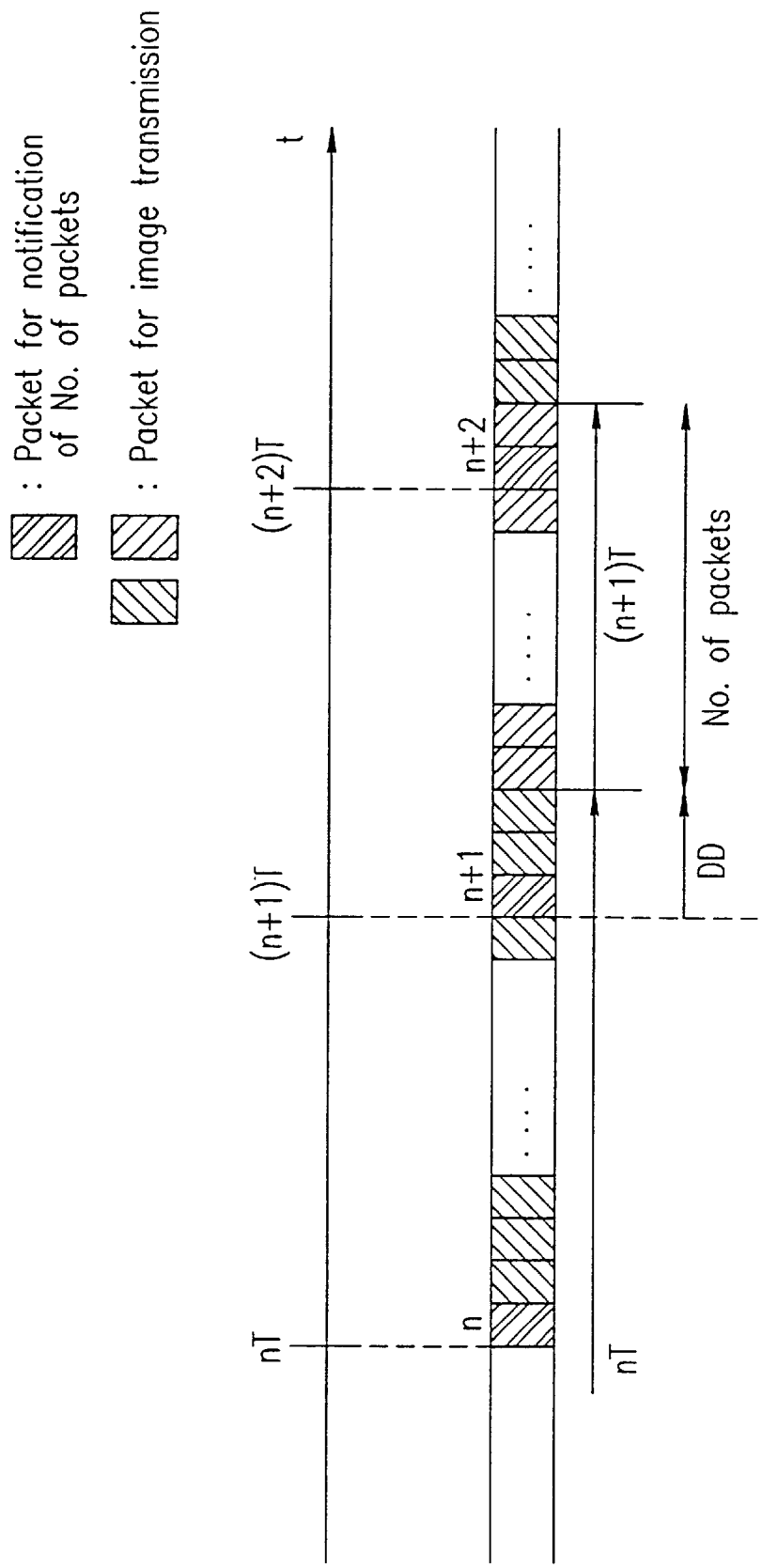
FIG. 33 is a view for illustrating the transmission of packets generated by a bit rate management node of the device of FIG. 28.

FIG. 33 shows the transmission of the packets generated by the bit rate management node 2015.

The packets for notification of the number of packets are generated every predetermined period. The packets for image transmission are generated by the number notified in the packet for notification of the number of packets, based on the rate R secured by the bit rate management node 2015 for the transmission of all the encoded data representing images. However, in the case where the delay data amount DD increases to be equal to delay_init×R during one multiplexing period, the generation of the packets in this multiplexing period is terminated and the multiplexing period number is renewed even if the number of generated packets is short of the number of packets notified. In the case where the generation of packets of the notified number is complete within one multiplexing period, packets having the renewed multiplexing period number are generated in the next multiplexing period. Thus, the encoded data of the number of packets notified by the nodes are transmitted so that the multiplex delay amount DD does not exceed delay_init×R.

Figure 34:
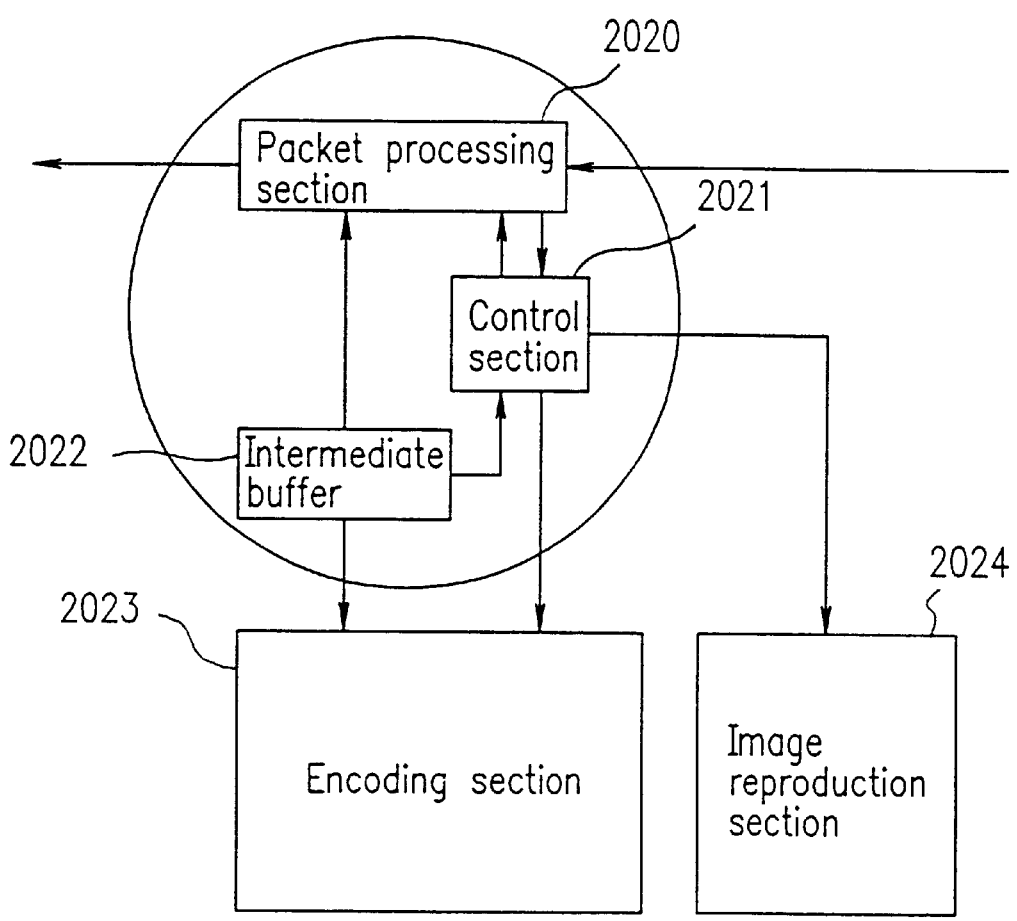
FIG. 34 is a block diagram of nodes of the device of FIG. 28.

FIG. 34 shows a configuration of each node. Referring to FIG. 34, the node includes a packet processing section 2020 for processing input/output of packets, a control section 2021, an intermediate buffer 2022, and an encoding section 2023, and an image reproduction section 2024.

The packet processing section 2020 receives a packet transmitted via the network and detects the header of the packet. When the receiver address of the header is its own address, the packet processing section 2020 passes the contents of the packet to the control section 2021 and simultaneously outputs the packet after resetting the sender address and the receiver address of the packet. When the transmitted data in the packet is encoded data representing images, the control section 2021 passes the encoded data to the image reproduction section 2024 for reproduction of the images.

When the sender address of the received packet is its own address, the packet processing section 2020 rewrites the encoded data in the packet based on information from the control section 2021 or the intermediate buffer 2022, and outputs the resultant packet.

When the header information indicates that the packet is for notification of the number of packets, the packet processing section 2020 sends to the control section 2021 a detection signal indicating that the packet is for notification of the number of packets, together with the multiplexing period number in the packet. The control section 2021 sends the number of packets to be notified for the indicated multiplexing period to the packet processing section 2020. The number of packets to be notified for this multiplexing period corresponds to the data amount to be sent from the encoding section 2023 to the intermediate buffer 2022 during the indicated multiplexing period. This data amount is counted by the intermediate buffer 2022, and the counted value is determined as the value to be notified by the control section 2021. The packet processing section 2020 writes the value to be notified in the packet and outputs the resultant packet onto the network.

When the header information of the packet indicates that the packet is for image transmission, the packet processing section 2020 sends a detection signal indicating that the packet is for image transmission to the control section 2021. The control section 2021 then reads the multiplexing period number of the packet. If the number of packets already output during the indicated multiplexing period is short of the number of packets notified, the control section 2021 instructs the packet processing section 2020 to write encoded data representing images together with the receiver address. The packet processing section 2020 writes its own address as the sender address and the specified receiver address as the destination address, reads encoded data corresponding to one packet from the intermediate buffer 2022, writes the encoded data in the packet, and outputs the resultant packet onto the network. After the notified number of packets have been output during this multiplexing period, the control section 2021 renews the multiplexing period number. The control section 2021 also sends an output instruction signal to the packet processing section 2020 to allow a subsequent packet having the old multiplexing period number before the renewal to be output without any processing.

On receipt of the packet for image transmission, also, the control section 2021 receives the multiplex virtual buffer size Bmux_size and the relative delay parameter delay_mux of the packet from the packet processing section 2020, and passes these values to the encoding section 2023. These values are always detected irrespective of the transmission timing.

Hereinbelow, the operation of the encoding section 2023 will be described. The operation of the encoding section 2023 is substantially the same as that of the encoding sub-section in Example 13 shown in FIG. 26.

In this example, the control portion 2014 shown in FIG. 26 receives the multiplex virtual buffer size Bmux_size and the relative delay parameter delay_mux from the control section 2021 in FIG. 34, and conducts the same processing as that described in Example 13, using these values instead of the buffer size Bmux_size and the buffer occupation Bmux_oc of the multiplexing section 2010 in Example 13 (see FIG. 25). In this example, since the transmission rate R set by the bit rate management node 2015 is equivalent to the transmission rate at the multiplexing section 2010 in Example 13, the encoded data to be transmitted and received between the encoding sections of the nodes is transmitted at a timing at which the encoded data can be reproduced without overflow or underflow on the receiver side.

Figure 35A:
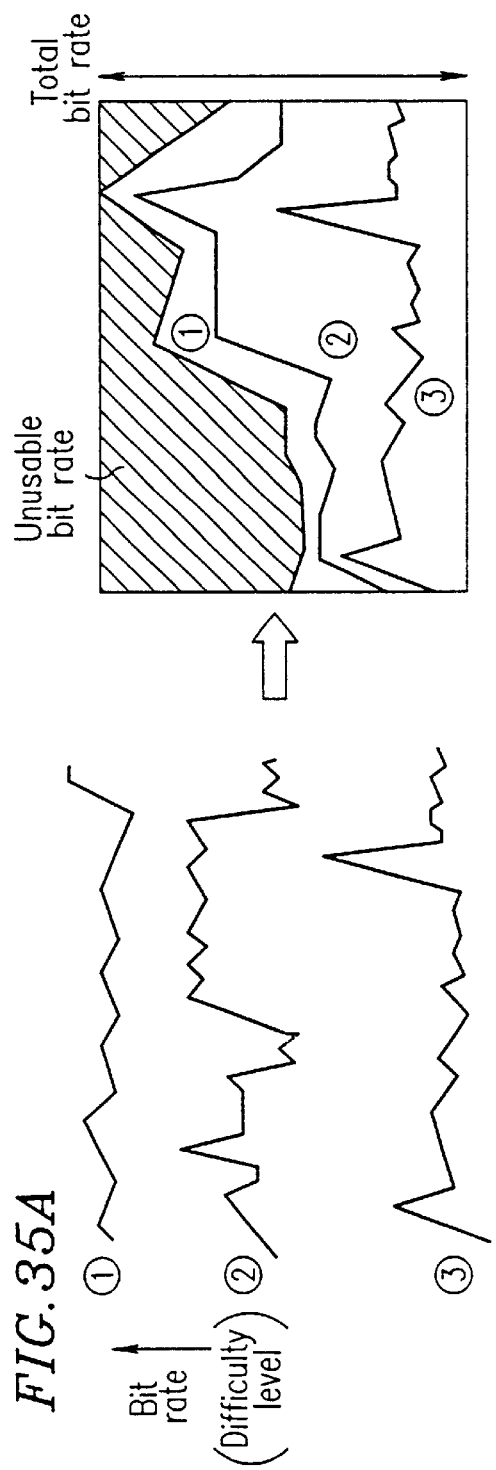
FIGS. 35A and 35B are graphs comparing the utilization of the bit rate between a conventional device and the device of FIG. 28.
Figure 35B:
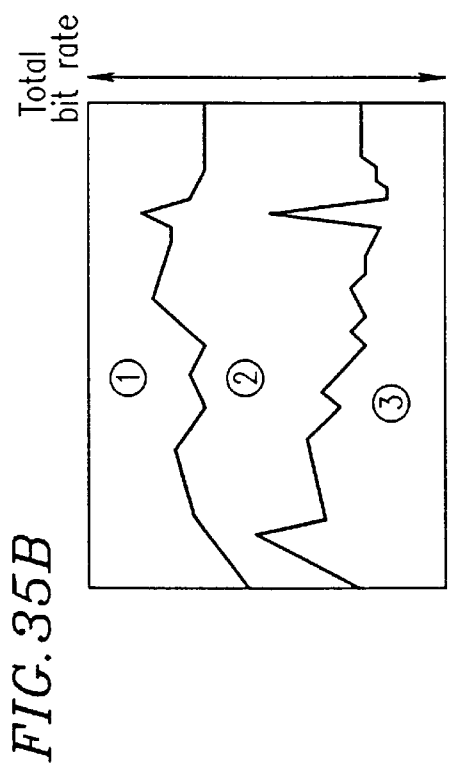

Thus, according to this example, images can be transmitted on a network keeping the image quality substantially uniform. FIGS. 35A and 35B show the comparison between the conventional transmission of encoded data on a network with a variable bit rate and the transmission of encoded data in this example in the aspect of the utilization of the bit rate. In the conventional case, the transmission bit rate for the encoded data encoded depending on the complexity of the image is secured on the transmission route. In this case, as shown in FIG. 35A, when three pieces of encoded data are to be transmitted, for example, all the bit rate at the transmission route fails to be effectively used. In this example, however, as shown in FIG. 35B, since all the bit rate at the transmission route is always used for encoding, the bit rate can be effectively used. Since data is encoded using a large bit amount, high-quality images can be reproduced. When the image quality is not made high, more images can be transmitted on the network.

In this example, the network connecting the nodes in a ring was described. The present invention is also applicable to a network of another shape or a network with a different transmission protocol as far as the bit rate allocated for an image on the transmission route is secured, the delay amount at the transmission is supplied to each node, and encoded data generated by the encoding section can be transmitted.

The delay time denoted by delay_init may be arbitrarily set within the range of Bmux_size−(delay_init×R)≧0. Especially, when Bmux_size−(delay_init=R)=0 is satisfied, the most effective variable length encoding is possible. As in Example 13, only a specific image can be encoded to obtain high quality by changing the setting of a specific encoding section. Moreover, in this example, at least the average rate obtained by dividing the entire bit rate by the number of entries can be secured every multiplexing period by multiplexing the allowable maximum data amount. Accordingly, it is possible to transmit the image signal encoded at an average rate.

In this example, the case where the number of images which are being transmitted is not changed was described. Alternatively, the number of images may be changed during the transmission. In such a case, Bmux_size and delay_mux should be renewed. In the case where the relative delay parameter delay_mux becomes negative due to the change in the number of images during the transmission, delay_mux should be renewed to a value smaller than the value obtained based on formula (16) before the addition of a new image, to reduce delay_mux to such an extent that delay_mux will not become negative by the addition of a new image.

Figure 36:
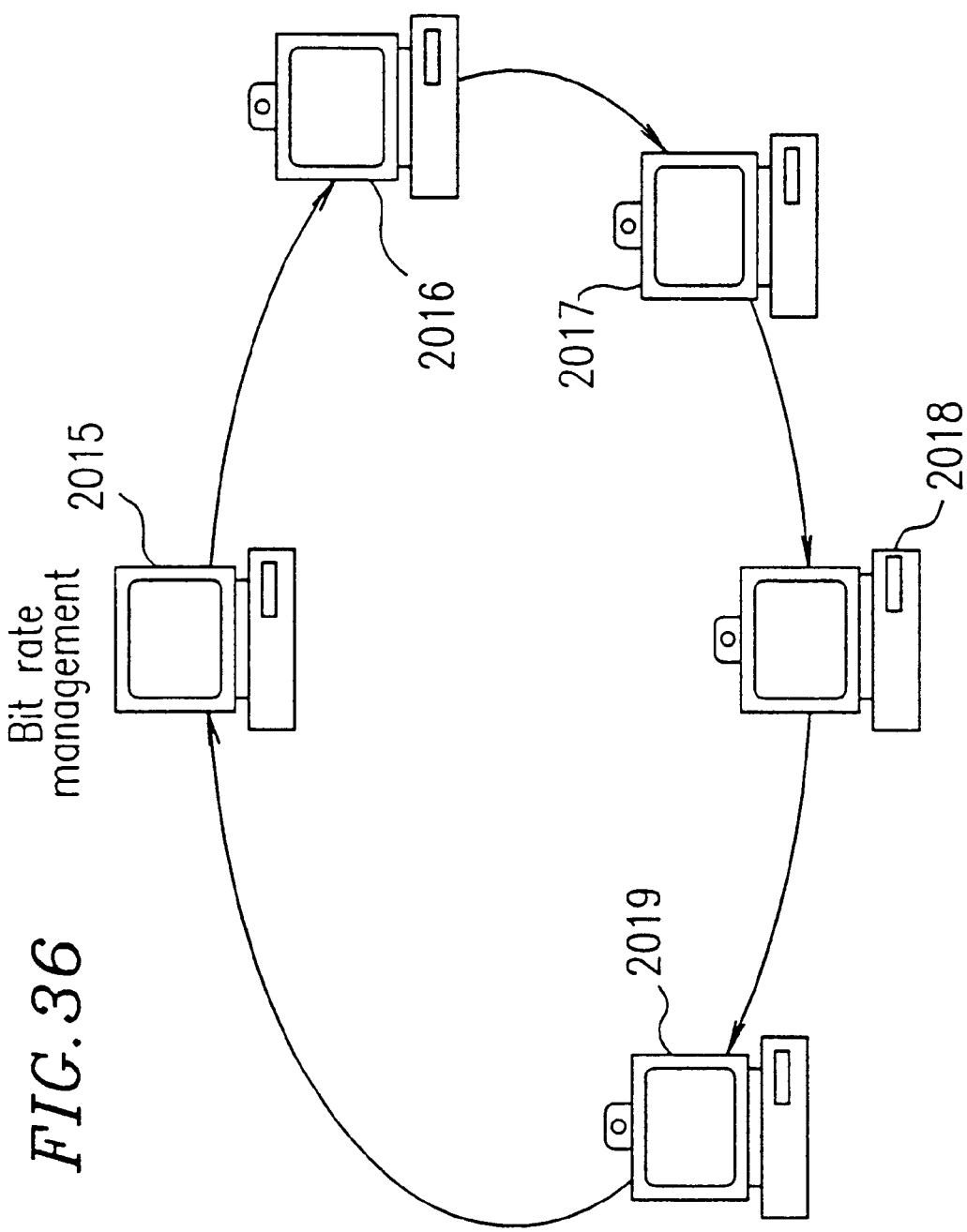
FIG. 36 schematically shows an implementation of the present invention by using general computers.
Figure 37:
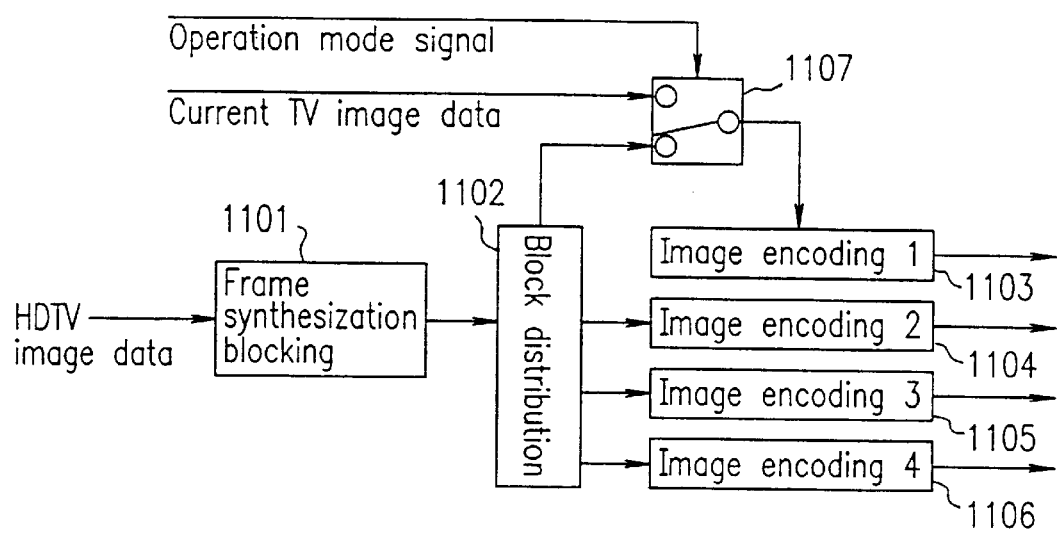
FIG. 37 is a block diagram of a conventional moving image encoding device.
Figure 38:
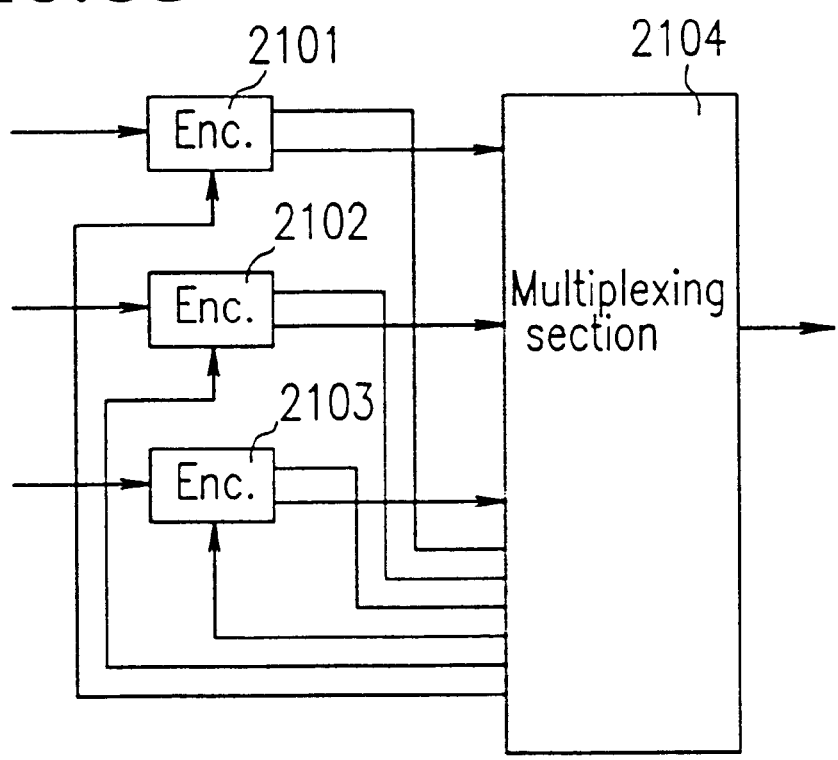
FIG. 38 is a block diagram of a conventional image transmission device.

As shown in FIG. 36, the nodes in this example may be implemented by general computers by incorporating the algorithm described in this example as a software. This invention is applicable to the encoding of image signals obtained from a camera or image signals in a memory such as a hard disk of a general computer.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A moving image encoding and multiplexing device for encoding a plurality of moving image signals and multiplexing the encoded signals, comprising:

a moving image switch section for switching a destination of a plurality of input moving images to a plurality of outputs;

a plurality of encoding sections having inputs coupled to the outputs of the moving image switch section for encoding the plurality of input moving images output from the moving image switch section;

a multiplexing section for multiplexing the encoded signals output from the plurality of encoding sections; and a control section for switching a switching state of the moving image switch section, an encoding mode of the encoding sections, and a multiplexing mode of the multiplexing sections;

wherein the control section switches the encoding mode of the encoding sections and the multiplexing mode of the multiplexing sections depending on the switching state of the moving image switch section.

2. A moving image encoding and multiplexing device according to claim 1, wherein the control section comprises: a switch control sub-section for switching the switching state of the moving image switch section; an encoding control sub-section for switching the encoding mode of the encoding section; and a multiplexing control sub-section for switching the multiplexing mode of the multiplexing section, and the encoding control sub-section switches the encoding mode depending on the switching state of the moving image switch section, and the multiplexing control sub-section switches the multiplexing mode depending on the switching state of the moving image switch section.

3. A moving image encoding and multiplexing device according to claim 1, further comprising a screen division section upstream of the moving image switch section.

4. A moving image encoding and multiplexing device according to claim 1, further comprising a moving image time-division section upstream of the moving image switch section.

5. A moving image encoding and multiplexing device according to claim 1, further comprising accumulation sections for temporarily accumulating moving image encoded signals output from the encoding sections, wherein the encoding control sub-section determines a parameter for controlling each of the encoding sections based on a sum of bit amounts of the moving image encoded signals accumulated in the accumulation sections.

6. A moving image encoding and multiplexing device according to claim 1, wherein the multiplexing section comprises: a moving image multiplexing sub-section for multiplexing the plurality of moving image encoded signals and outputting a moving image encoded signal; a channel multiplexing sub-section for multiplexing a plurality of input signals input into the multiplexing section and the output signal output from the moving image multiplexing sub-section; and a switch sub-section for switching the destination of the moving image encoded signals input into the multiplexing section between the moving image multiplexing sub-section and the channel multiplexing sub-section.

7. An image transmission device comprising a plurality of image encoding sections and a transmission processing section, wherein the transmission processing section multiplexes encoded data specified by the image encoding sections every multiplexing timing, transmits the encoded data to a predetermined route, and sends to the image encoding sections multiplexing information which is calculated based on encoded data amount in the image encoding sections and can be used for calculation of a delay amount taken until the encoded data is transmitted to a decoding device, and the plurality of image encoding sections determine quantization widths used at quantization in an image encoding processing based on the multiplexing information sent from the transmission processing section, encode the images, and transmit the encoded data to the transmission processing section every multiplexing timing to specify the encoded data.

8. An image transmission device according to claim 7, wherein the transmission processing section comprises a transmission buffer, and the transmission processing section takes the encoded data specified by the image encoding sections in the transmission buffer every multiplexing timing, and outputs the encoded data at a predetermined transmission rate in the order of the taking-in of the encoded data, as well as outputting an occupation of the encoded data in the transmission buffer as multiplexing information.

9. An image transmission device according to claim 7, wherein each of the image encoding sections includes: a quantization width determination sub-section; and a basic encoding processing sub-section for encoding images by quantizing the images with a quantization width specified by the quantization width determination sub-section, and the quantization width determination sub-section calculates a buffer occupation in each of a plurality of decoding devices which receive the encoded data transmitted from each of the image encoding sections via the transmission processing section based on the multi plexing information, and sets the quantization width based on the calculated buffer occupation in the decoding device and an amount of encoded data which has not been transmitted.

10. An image transmission device according to claim 7, wherein each of the image encoding sections further includes an encoded data memory sub-section for temporarily storing the encoded data, and the encoded data memory sub-section temporarily stores non-transmitted data which has not been transmitted to the transmission processing section among the encoded data every transmission timing, and transmits the encoded data to the transmission processing section using as an upper limit a value preset by each of the image encoding sections or a value obtained by subtracting the buffer occupation in the decoding device calculated based on the multiplexing information from a buffer size of the decoding device predicted by the receiver side.

* * * * *